US008561069B2

(12) United States Patent
Masuoka et al.

(10) Patent No.: US 8,561,069 B2
(45) Date of Patent: Oct. 15, 2013

(54) TASK COMPUTING

(75) Inventors: Ryusuke Masuoka, Potomac, MD (US); Yannis Labrou, Baltimore, MD (US); Zhexuan Song, Belstville, MD (US)

(73) Assignee: Fujitsu Limited, Kawasaki (JP)

( * ) Notice: Subject to any disclaimer, the term of this patent is extended or adjusted under 35 U.S.C. 154(b) by 1497 days.

(21) Appl. No.: 10/733,328

(22) Filed: Dec. 12, 2003

(65) Prior Publication Data

US 2004/0230636 A1 Nov. 18, 2004

Related U.S. Application Data

(60) Provisional application No. 60/434,432, filed on Dec. 19, 2002, provisional application No. 60/501,012, filed on Sep. 9, 2003, provisional application No. 60/511,741, filed on Oct. 17, 2003.

(51) Int. Cl.
*G06F 9/46* (2006.01)

(52) U.S. Cl.
USPC .......................................................... 718/100

(58) Field of Classification Search
USPC .......................................................... 718/100
See application file for complete search history.

(56) References Cited

U.S. PATENT DOCUMENTS

| | | | |
|---|---|---|---|
| 5,224,205 | A | 6/1993 | Dinkin et al. |
| 5,530,861 | A | 6/1996 | Diamant et al. |
| 5,815,811 | A | 9/1998 | Pinard et al. |
| 5,968,116 | A | 10/1999 | Day, II et al. |
| 5,979,757 | A | 11/1999 | Tracy et al. |
| 6,002,918 | A | 12/1999 | Heiman et al. |
| 6,067,297 | A | 5/2000 | Beach |
| 6,084,528 | A | 7/2000 | Beach et al. |
| 6,101,528 | A | 8/2000 | Butt |
| 6,173,316 | B1 | 1/2001 | De Boor et al. |
| 6,178,426 | B1 | 1/2001 | Klein et al. |
| 6,188,681 | B1 | 2/2001 | Vesuna |
| 6,199,753 | B1 | 3/2001 | Tracy et al. |
| 6,216,158 | B1 | 4/2001 | Luo et al. |
| 6,286,047 | B1 | 9/2001 | Ramanathan et al. |
| 6,324,567 | B2 | 11/2001 | Chidambaran et al. |
| 6,430,395 | B2 | 8/2002 | Arazi et al. |
| 6,446,096 | B1 | 9/2002 | Holland et al. |

(Continued)

FOREIGN PATENT DOCUMENTS

JP 2004-318809 11/2004

OTHER PUBLICATIONS

Carole Goble et al., "Semantic Web and Grid Computing", Retrieved from Internet URL: http://www.semanticgrid.org/documents/swgc/swgc-final.pdf Sep. 5, 2002, 23 pages.

(Continued)

*Primary Examiner* — Mengyao Zhe
(74) *Attorney, Agent, or Firm* — Staas & Halsey LLP

(57) ABSTRACT

A computer-based system includes task computing enabling users to define tasks by combining available functionality and to execute such tasks. The computer-based system of includes available functionality which originates in devices, computing applications and electronic services available through local and remote procedure calls including Web Services, UPnP, CORBA, RMI, RPC, DCE, DCOM or comprises previously defined tasks. All available functionality is abstracted to the user as a service and each service is expressed in a service description language, and the services have a semantic description associated with them.

67 Claims, 76 Drawing Sheets

Semantic Service Instance Mapping and Grounding 1200

(56) References Cited

U.S. PATENT DOCUMENTS

| | | | | |
|---|---|---|---|---|
| 6,456,892 | B1 | 9/2002 | Dara-Abrams et al. | |
| 6,466,971 | B1 | 10/2002 | Humpleman et al. | |
| 6,502,000 | B1 | 12/2002 | Arnold et al. | |
| 6,509,913 | B2 | 1/2003 | Martin, Jr. et al. | |
| 6,556,875 | B1 * | 4/2003 | Nagasaka et al. | 700/19 |
| 6,560,640 | B2 | 5/2003 | Smethers | |
| 6,757,902 | B2 | 6/2004 | Katz | |
| 6,792,605 | B1 | 9/2004 | Roberts et al. | |
| 6,859,803 | B2 | 2/2005 | Dagtas et al. | |
| 6,901,596 | B1 | 5/2005 | Galloway | |
| 6,910,037 | B2 | 6/2005 | Gutta et al. | |
| 6,947,404 | B1 | 9/2005 | Zalka | |
| 6,956,833 | B1 | 10/2005 | Yukie et al. | |
| 6,983,227 | B1 | 1/2006 | Thalhammer-Reyero | |
| 7,065,058 | B1 | 6/2006 | Korus | |
| 7,079,518 | B2 | 7/2006 | Park et al. | |
| 7,170,857 | B2 | 1/2007 | Stephens et al. | |
| 7,376,571 | B1 | 5/2008 | Racine et al. | |
| 7,406,660 | B1 | 7/2008 | Sikchi et al. | |
| 7,424,701 | B2 | 9/2008 | Kendall et al. | |
| 7,548,847 | B2 | 6/2009 | Acero et al. | |
| 7,577,910 | B1 | 8/2009 | Husemann et al. | |
| 7,596,754 | B2 | 9/2009 | Wessling et al. | |
| 7,610,045 | B2 | 10/2009 | Little et al. | |
| 2002/0078255 | A1 | 6/2002 | Narayan | |
| 2002/0107939 | A1 * | 8/2002 | Ford et al. | 709/218 |
| 2002/0116225 | A1 | 8/2002 | Morse et al. | |
| 2003/0036917 | A1 * | 2/2003 | Hite et al. | 705/1 |
| 2003/0204645 | A1 | 10/2003 | Sharma et al. | |
| 2004/0054690 | A1 | 3/2004 | Hillerbrand et al. | |
| 2004/0083205 | A1 | 4/2004 | Yeager | |
| 2004/0204063 | A1 | 10/2004 | Van Erlach | |
| 2004/0207659 | A1 | 10/2004 | Goodman et al. | |
| 2004/0230636 | A1 | 11/2004 | Masuoka et al. | |
| 2005/0021560 | A1 | 1/2005 | Yoon et al. | |
| 2005/0060372 | A1 | 3/2005 | DeBettencourt et al. | |
| 2005/0080768 | A1 | 4/2005 | Zhang et al. | |
| 2005/0160362 | A1 | 7/2005 | Obradovic et al. | |
| 2006/0195411 | A1 | 8/2006 | Knight et al. | |
| 2007/0157096 | A1 | 7/2007 | Keren et al. | |

OTHER PUBLICATIONS

Ankolekar, Anupriya, et al., "DAML-S: Web Service Description for the Semantic Web", The Semantic Web—ISWC 2002. First International Web Conference Proceedings (Lecture Notes in Computer Science vol. 2342), The Semantic Web—ISWC 2002; XP-002276131; Sardinia, Italy; Jun. 2002; (pp 348-363).

Bader, Gary D., et al., BioPAX—Biological Pathways Exchange Language, Level 1, Version 1.0 Documentation; © 2004 BioPAX Workgroup, BioPAX Recommendation [online] Jul. 7, 2004; Retrieved from the Internet:.

De Roure, David, et al., "E-Science", Guest Editors' Introduction, IEEE Intelligent Systems; Published by the IEEE Computer Society, © Jan./Feb. 2004 IEEE, pp. 24-63.

"Gene Ontology Consortium" OBO—Open Biological Ontologies; [online] [Retrieved on Oct. 22, 2004] Retrieved from the Internet (6 pages).

Handschuh S., et al. "Annotation for the deep web", IEEE Intelligent Systems, IEEE Service Center, New York, NY, US, vol. 18, No. 5, Sep. 1, 2003; pp. 42-48; XP011101996 ISSN: 1094-7167—Abstract (1 page).

Zhexuan Song, et al. "Dynamic Service Discovery and Management in Task Computing,"pp. 310-318, MobiQuitous 2003, Aug. 22-26, 2004, Boston, pp. 1-9.

MaizeGDB, "Welcome to MaizeGDB!", Maize Genetics and Genomics Database; [online] [Retrieved on Oct. 22, 2004] Retrieved from the Internet <http://www.maizegdb.org/>.

Marenco et al., "QIS: A framework for biomedical database federation" Journal of the American Medical Informatics Association, Hanley and Belfus, Philadelphia, PA, US, vol. 11, No. 6, Nov. 1, 2004; pp. 523-534, XP005638526; ISSN: 1067-5027.

Ramey, Chet; "Bash Reference Manual", Version 2.02, Apr. 1, 1998; XP-002276132; pp. i-iv; p. 1; and pp. 79-96.

Trellis, "Capturing and Exploiting Semantic Relationships for Information and Knowledge Management", The Trellis Project at Information Sciences Institute (ISI), [online] [Retrieved on Oct. 22, 2004] Retrieved from the Internet.

Information Sciences Institute; USC Viterbi School of Engineering; [online] [Retrieved on Oct. 22, 2004] Retrieved from the Internet 2 pages.

Mindswap—Maryland Information and Network Dynamics Lab Semantic Web Agents Project; SWOOP—Hypermedia-based OWL Ontology Browser and Editor; [online] [Retrieved on Oct. 22, 2004] Retrieved from the Internet (3 pages).

Mindswap—Maryland Information and Network Dynamics Lab Semantic Web Agents Project; OntoLink; Semantic Web Research Group; [online] [Retrieved on Oct. 22, 2004] Retrieved from the Internet (2 pages).

Mindswap—Maryland Information and Network Dynamics Lab Semantic Web Agents Project; Pellet OWL Reasoner; [online] [Retrieved on Oct. 22, 2004] Retrieved from the Internet (3 pages).

Haarslev, Volker, "Racer", RACER System Description; News: New Racer Query Language Available; [online] [Retrieved on Oct. 22, 2004] Retrieved from the Internet (10 pages).

Jambalaya, the Chisel group; CH/SEL—Computer Human Interaction & Software Engineering Lab, Home; [online] [Retrieved on Oct. 22, 2004] Retrieved from the Internet (1 page).

Malik, Ayesha, "XML, Ontologies, and the Semantic Web", XML Journal, Openlink Virtuoso; [online] [Retrieved on Oct. 22, 2004] Retrieved from the Internet (7 pages).

Altschul, SF, et al., "Basic local alignment search tool", National Center for Biotechnology information, National Library of Medicine, National Institutes of Health, Bethesda, Maryland 20894; [online] [Retrieved on Oct. 22, 2004] Retrieved from the Internet <URL:> (3 pages).

NCBI BLAST *Information*; [online] [Retrieved on Oct. 22, 2004] Retrieved from the Internet <URL:> (1 page).

Example of Terrorism Ontology; [online] [Retrieved on Dec. 16, 2004] Retrieved from the Internet <URL> (7 pages).

Guttman, E., et al., "Service Location Protocol, Version 2", Network Working Group; @ Home Network; Vinca Corporation; Jun. 1999 (pp. 1-55).

Masuoka, Ryusuke, et al., "Task Computing—The Semantic Web meets Pervasive Computing—" Fujitsu Laboratories of America, Inc., [online] vol. 2870, 2003, pp. 866-881, <URL: XP-002486064.

Rysuke Masuoka, et al. "Semantic Web and Ubiquitous Computing-Task Computing as an Example-" *AIS SIGSEMIS* Bullentin, vol. 1 No. 3, Oct. 2004, pp. 21-24.

Rysuke Masuoka, et al. Ontology-Enabled Pervasive Computing Applications, *IEEE Intelligent Systems,* vol. 18, No. 5, Sep./Oct. 2003, pp. 68- 72.

Rysuke Masuoka, et al. Task Computing—Semantic-web enabled, user driven, interactive environments, WWW Based Communities for Knowledge Presentation, Sharing, Mining and Protection (The PSMP workshop) within CIC 2003, Jun. 23-26, 2003, pp. 1.

Rysuke Masuoka, et al. "Task Computing—Filling the Gap Between Tasks and Services, " Fujitsu, vol. 55;No. 4; pp. 376-383 (2004) (in Japanese) (English Abstract) (1 page).

Masuoka Ryusuke, DAML Program and the Semantic Web : Toward a More Ontological World, Journal of Japanese Society for Artificial Intelligence, Japan 2002.7 17(4) pp. 392-399 (pp. 397-398 "6. The future of DAML").

Goble, C., et al., Semantic Web and Grid Computing, [online], 2002. 9.5., pp. 1-23, [H20.8.27. search], Internet<URL: (pp. 16-17 "8.1 My Grid (www.mygrid.org.uk)" and Figure 5).

Preece, A., et al., Intelligent Web Services, Intelligent Systems, IEEE, 2002.1., vol. 17, Issue 1, pp. 15-17 (p16, Column right and p17, Column left).

The Semantic Grid, [online], 2002.10., [H21.1.5. search] , Intemet<U.

The Semantic Web—ISWC 2002, First International Semantic Web Conference, Sardinia, Italy, Jun. 9-12, 2002, Proceedings, Springer, 2002.6.9., [H21.1.6. search], Internet.

(56) References Cited

OTHER PUBLICATIONS

U.S. Appl. No. 11/014,904, filed Dec. 20, 2004, Patrick Joseph Armstrong, Fujitsu Limited Kawasaki, Japan.
U.S. Appl. No. 11/115,403, Apr. 27, 2005 Yannis Labrou, et al., Fujitsu Limited Kawasaki, Japan.
European Search Report Communication issued May 7, 2004 in related Europeans Application No. 03257974.0-1243 (4 pages).
European Patent Office Communication issued Sep. 5, 2005 in related European Application No. 03257974.0-1243 (12 pages).
European Patent Office Communication issued Jan. 22, 2007 in related European Application No. 03257974.0-1243.
First Notification of Office Action issued by the State Intellectual Property Office of China on Jul. 27, 2007 in related China Application No. 200310123963.2, including the Text of the First Office Action (28 pages).
First Notification of Office Action (PCT Application Entry Into the National Phase) issued by the State Intellectual Property Office of China on Dec. 7, 2007, in the related Chinese Patent Application No. 200580013453.7 (22 pages).
Second Notification of Office Action issued by the State Intellectual Property Office of China on Jan. 4, 2008, in related Chinese Patent Application No. 200310123963.2 (2 pages).
First Notification of Office Action issued b the State Intellectual Propery Office of China on Mar. 14, 2008 in corresponding Chinese Patent Application No. 200510132687.5 (9 pages).
Second Notification of Office Action Issued by th State Intellectual Property Office of China on Sep. 5, 2008 in corresponding Chinese Patent Application No. 200510132687.5, including the Text of the Second Office Action (8 pages).
Third Notification of Office Action issued by the State Intellectual Property Office of China on May 9, 2008 in related China Application No. 200310123963.2, including the Text of the Third Office Action (8 pages).
Rejection Decision issued by the State Intellectual Property Office of China on Sep. 5, 2008 in related China Application No. 200310123963.2, including the Text of the Decision for Rejection (8 pages).
Extended European Search Report Communication issued Aug. 11, 2008 in corresponding European Application No. 05027181.6-1527/1672537.
Notice of Completion of Formalities for Patent Registration with the Notice of Decision of Granting Patent Right for Invention, dated Oct. 10, 2008, issued in related China Application No. 200580013453.7.
Notification of Transmittal of the International Search Report and the Written Opinion of the International Searching Authority, or the Declaration issued Jun. 27, 2006 in related Intenational Application No. PCT/US05/14557.
D14 Notification Concerning Transmittal of Copy of International Preliminary Report on Patentability (Chapter I of the Patent Cooperation Treaty) mailed Nov. 9, 2006 in related international Application No. PCT/US2005/014557.
Supplementary European Search Report issued by the EPC on Jul. 18, 2008 in related European Application No. 05739051.0-1243.
Notice Requesting Submission of Opinion filed Nov. 15, 2007 in related Korean Application No. 10-2006-7017143.
U.S. Office Action mailed Jun. 9, 2009 in co-pending related U.S. Appl. No. 11/115,403 (4 pages).
U.S. Office Action mailed Oct. 27, 2009 in co-pending related U.S. Appl. No. 11/115,403 (27 pages).
U.S. Office Action mailed Oct. 13, 2009 in co-pending related U.S. Appl. No. 11/014,904 (6 pages).
Japan Office Action mailed on Sep. 9, 2008 and issued in related Japanese Patent Application 2003-422759 (4 pages).
Japanese Office Action mailed on Jan. 13, 2009 and issued in related Japanese Patent Application 2003-422759 (2 pages).
Ryusuke Masuoka, et al., "Policy-based Access Control for Task Computing Using Rei", *WWW* 2005, May 10-14, 2005, Chiba, Japan.
Yannis Labrou, et al., "Task Computing: Semantics-Oriented Middleware for Ubiquitous Computing", *WWW* 2005, May 10-14, 2005, Chiba, Japan.
U.S. Appl. No. 11/014,904, filed Dec. 20, 2004, Patrick Armstrong et al., Fujitsu Limited.
U.S. Appl. No. 11/115,403, filed Apr. 27, 2005, Yannis Labrou, Fujitsu Limited.
U.S. Appl. No. 11/512,405 Aug. 30, 2006, Ryusuke Masuouka et al., Fujitsu Limited.
U.S. Office Action mailed Mar. 31, 2010 in related co-pending U.S. Appl. No. 11/691,807.
U.S. Notice of Allowance mailed Feb. 23, 2010 in related co-pending U.S. Appl. No. 11/115,403.
U.S. Supplemental Notice of Allowance mailed Apr. 8, 2010 in related co-pending U.S. Application No. 11/115,403.
U.S. Office Action mailed Jan. 26, 2010 in related co-pending U.S. Appl. No. 11/512,405.
U.S. Office Action mailed May 24, 2010 in related co-pending U.S. Appl. No. 11/014,904.
U.S. Office Action mailed Jul. 22, 2010 in related co-pending U.S. Appl. No. 11/512,405.
U.S. Office Action mailed Oct. 4, 2010 in related co-pending U.S. Appl. No. 11/691,807.
U.S. Notice of Allowance mailed Feb. 16, 2011 in co-pending related U.S. Appl. No. 11/014,904.
The Semantic Grid [Online], 2002.10., [H21.1.5. search], The Semantic Grid: A Future e-Science Infrastructure, David De Roure, et al.
Tallis, M., et al., The Briefing Associate: Easing Authors into the Semantic Web, Intelligent Systems, IEEE, IEEE, 2002 1 vol. 17, Issue 1 pp. 26-32 (Abstract only—1 page).
Summons to Attend Oral Proceedings pursuant to Rule 115(1) EPC mailed Dec. 15, 2010 in counterpart European Application No. 03257974.0-1243/1431875.
U.S. Office Action mailed Nov. 4, 2010 in co-pending application U.S. Appl. No. 11/014,904.
U.S. Office Action issued Mar. 28, 2011 in co-pending U.S. Appl. No. 11/691,807.
Japanese Office Action issued on Mar. 8, 2011 in related Japanese Patent Application No. 2005-365377 (3 pages) (4 pages English Translation).
Yukinori Morita, et al., "Tool of semantic Web", Information Processing, Japan, Information Processing Society Japan, Jul. 15, 2002, vol. 43, No. 7, pp. 734-741 (10 pages) (2 page English Translation).
U.S. Supplemental Notice of Allowance issued Jun. 2, 2011 in related U.S. Appl. No. 11/014,904.
Tadashige lwao and Ryusuke Masuoka, "Service Compositions and Access Control for Ubiquitous Computing Environments," vol. 49, No. 4, pp. 217-224, Journal of the Operations Research Society of Japan, 2004 (4 pages Of Partial English Translation (p. 217, line 1-line 7/p. 219, left line 23-right line 16/p. 220, left line 2-p. 221 left line 21).
Japanese Office Action issued Aug. 18, 2011 in related Japanese Patent Application No. 2006-244780 (3 pages) (2 pages Of English Translated Office Action (p. 1, line 12-line 16/p. 2, line 21-line 31/p. 3, line 1-line 13) of Office Action from JP Application No. 2006-244780).
Japanese Office Action mailed May 21, 2013 in related Japanese Patent X.
"Task Computing," Computer & Network Lan, 2004-10-01, (pp. 97-103).
Nikkei Internet Solutions, 2003, Aug. 21, 2003 (pp. 104-109).
U.S. Office Action mailed Jan. 17, 2013 in related co-pending U.S. Appl. No. 11/691,807 (11 pages).
U.S. Office Action mailed Sep. 11, 2012 in related co-pending U.S. Appl. No. 11/691,807 (20 pages).
Tadashige Iwao and Ryusuke Masuoka, "Service Compositions and Access Control for Ubiquitous Computing Environments," vol. 49, No. 4, pp. 217-224, Journal of the Operations Research Society of Japan, 2004.
Japanese Office Action issued Aug. 18, 2011 in related Japanese Patent Application No. 2006-244780 (3 pages).
Notice of Allowance issued Jul. 13 ,2011 in co-pending U.S. Appl. No. 11/014,904.

(56) References Cited

OTHER PUBLICATIONS

Notice of Allowance Issued Sep. 28, 2011 in related co-pending U.S. Appl. No. 11/512,405.

Official Communication issued Jul. 19, 2012 in related European Patent application No. 05 739 051.0-1243 (4 pages).

Japanese Office Action mailed May 21, 2013 in related Japanese Patent Application No. 2006-244780 (3 pages) (1 page English Translation).

"Task Computing for freely associating information devices, Computer & Network LAN", Masanobu Yuhara, Japan, Ohmsha,Ltd, Oct. 1, 2004, vol. 22, No. 10 (pp. 97-103) (1 page English Translation).

"Introduction to "Semantic Web", a new technique to create a smart Web", $6^{th}$, Itaru Hosomi, Nikkei Internet Solutions, Japan, Nikkei Business Publications, Inc, Aug. 21, 2003 No. 74, (pp. 104-109), (2 pages English Translation).

Chinese Patent Office Action, mailed Jul. 27, 2007 and issued in corresponding Chinese Patent Application No. 200310123963.2.

* cited by examiner

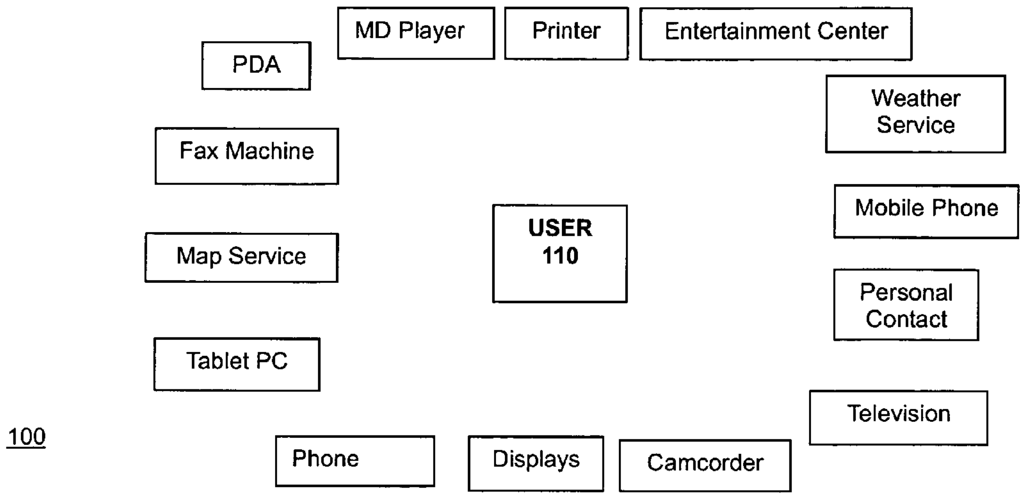
Figure 1 User Surrounded by Devices and Services

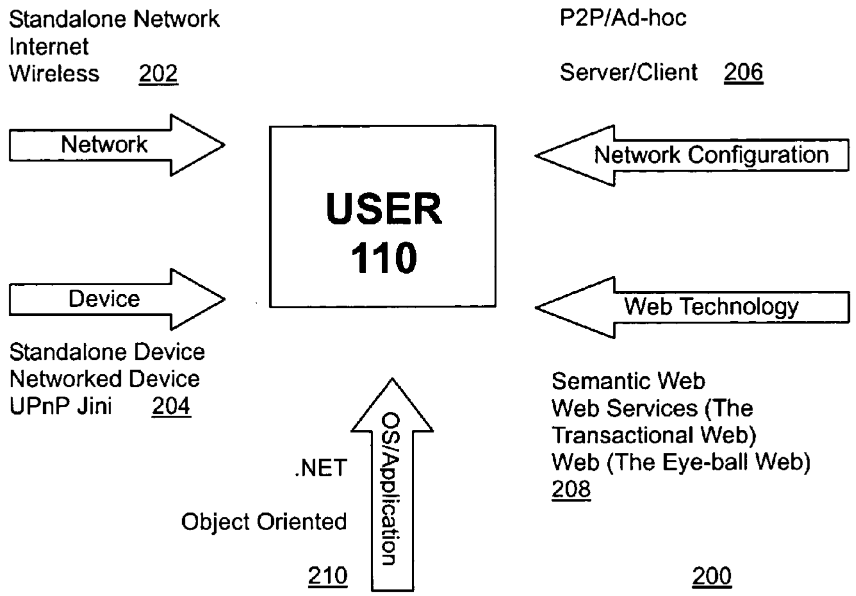
Figure 2 User-centered View (I)

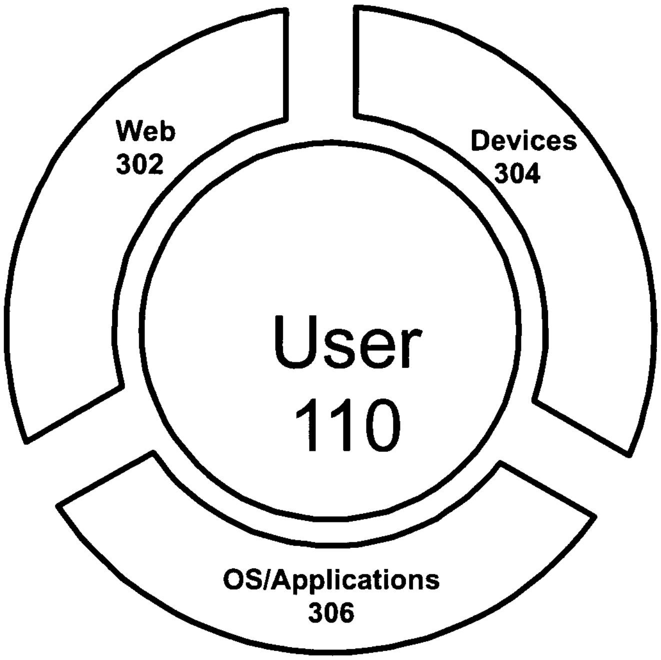
Figure 3 User-centered View (II)
300

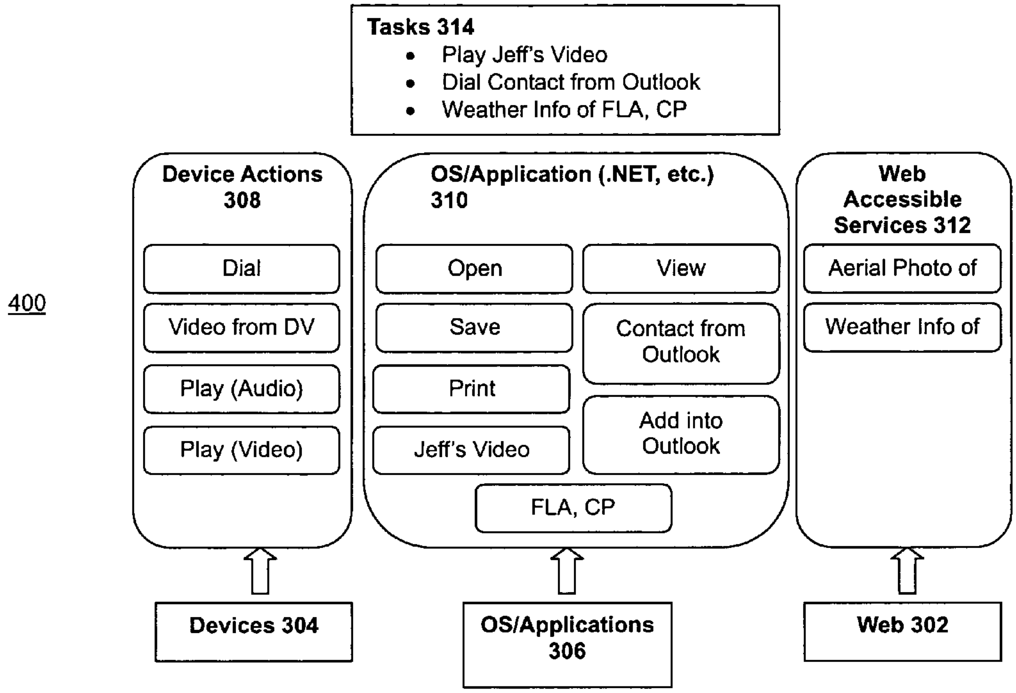
Figure 4 Tasks and Services

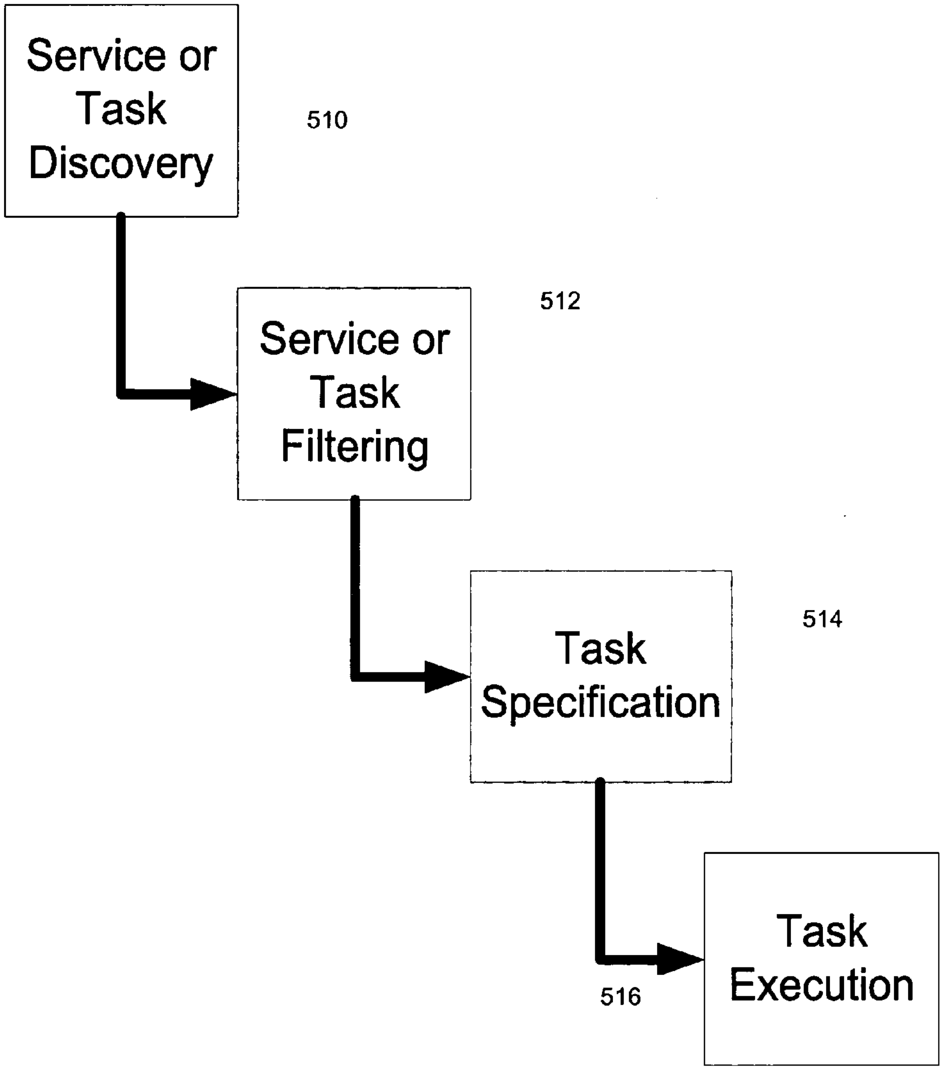
Figure 5 Task Computing Workflow Variation (I) 500

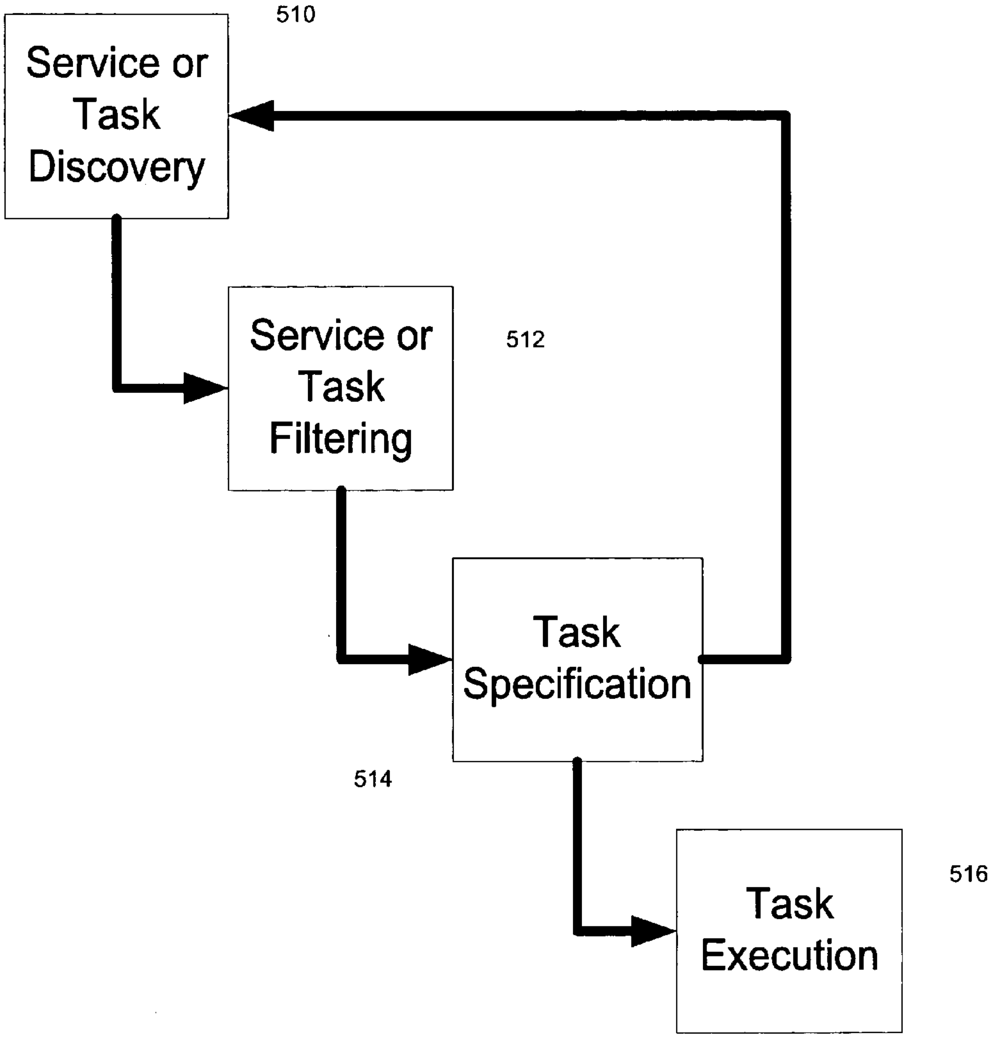
Figure 6 Task Computing Workflow Variation (II) 600

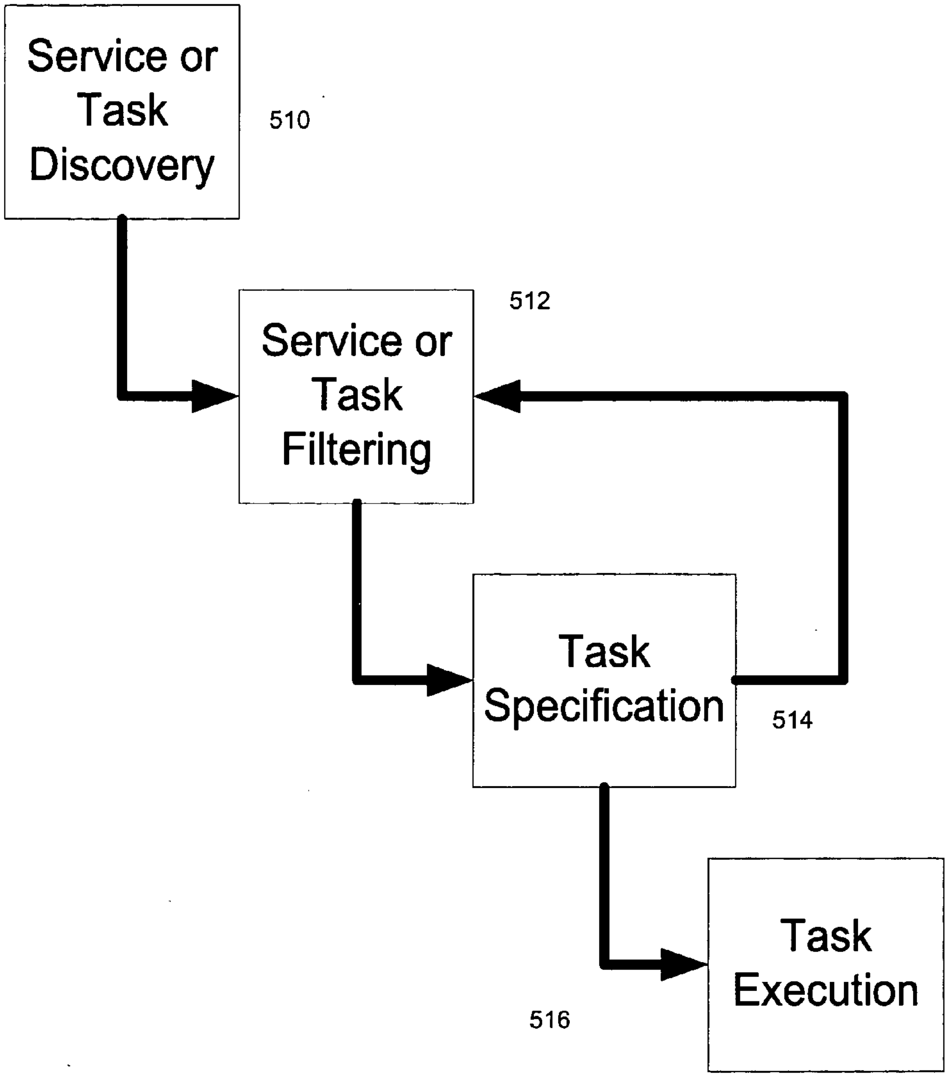
Figure 7 Task Computing Workflow Variation (III) 700

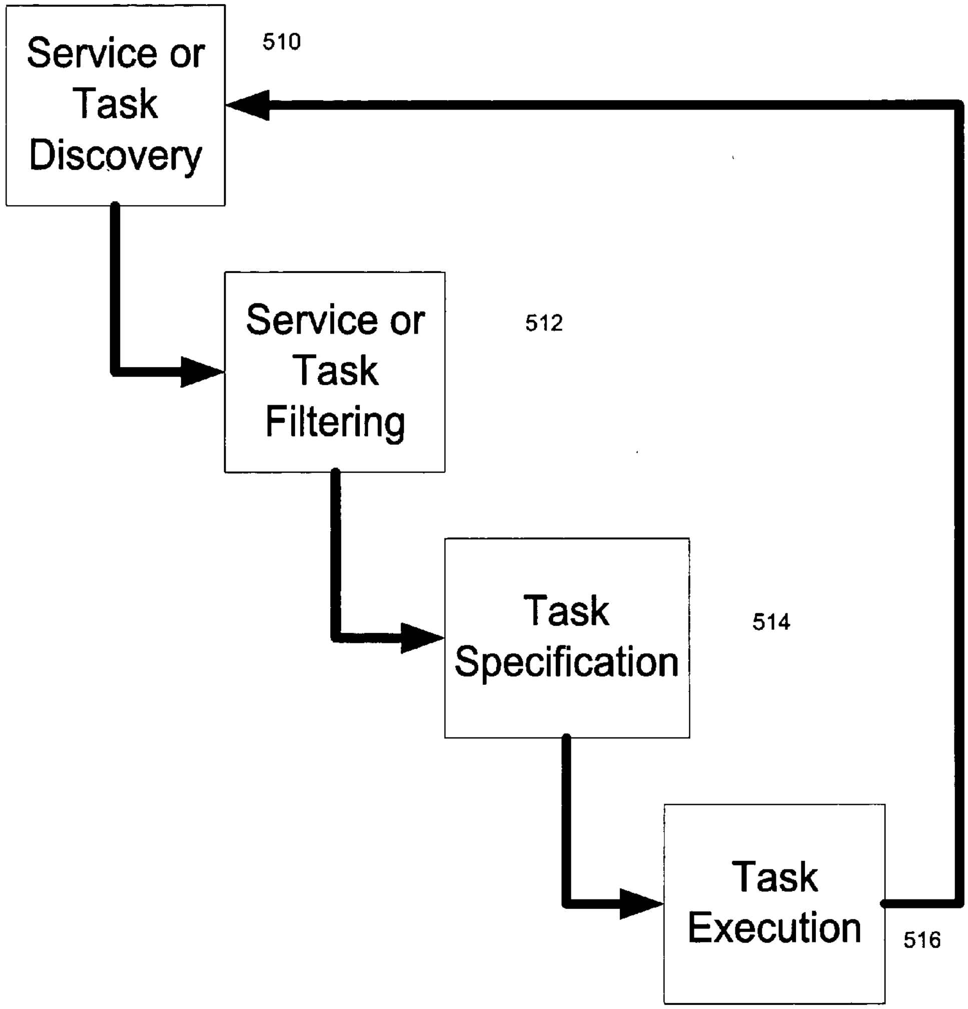
Figure 8 Task Computing Workflow Variation (IV) 800

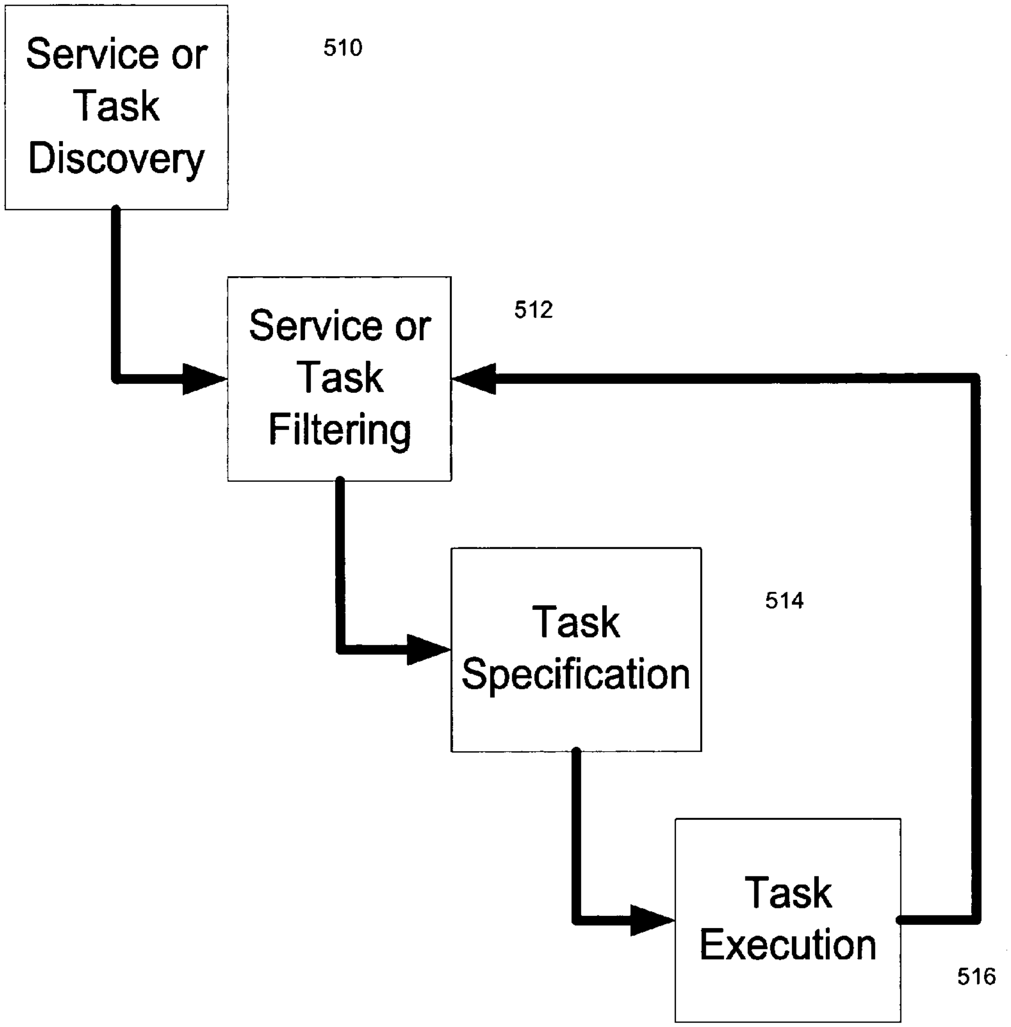
Figure 9 Task Computing Workflow Variation (V) 900

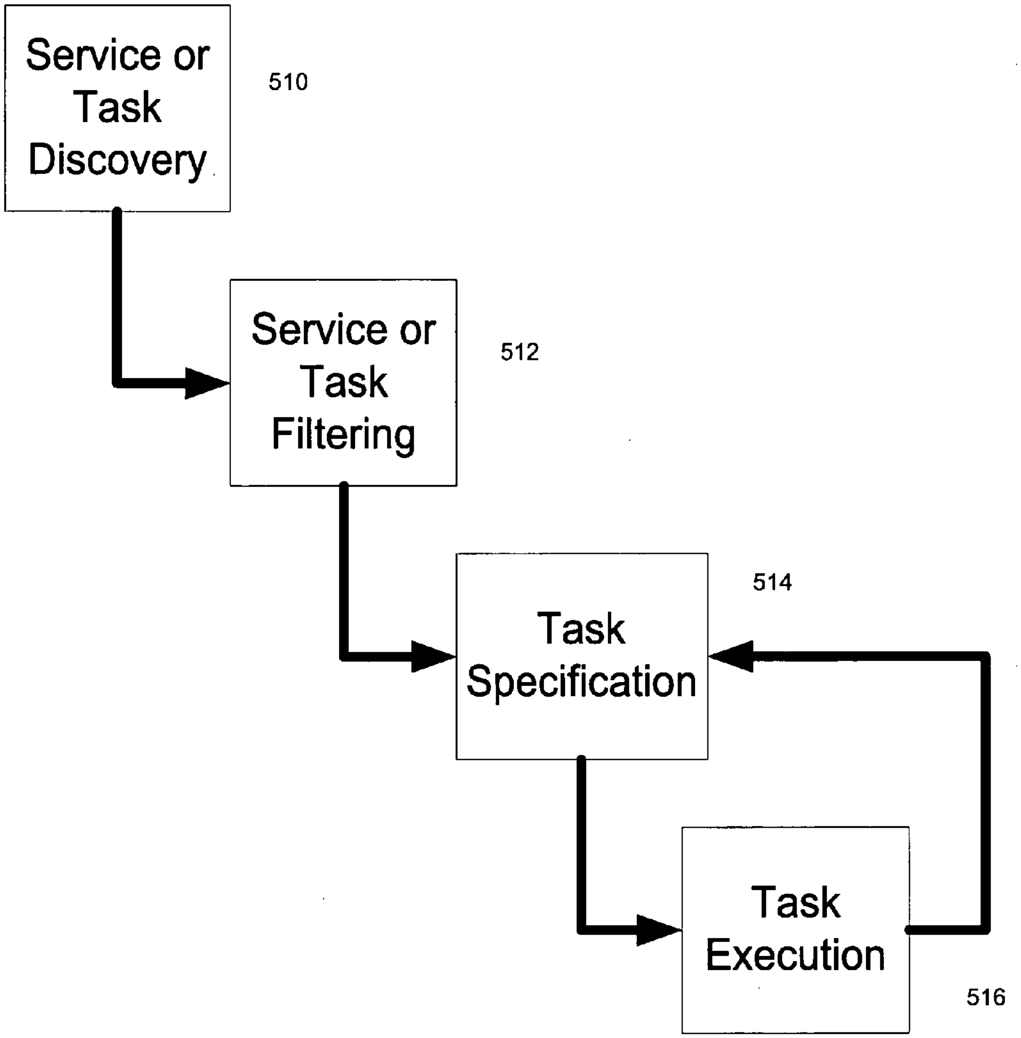
Figure 10 Task Computing Workflow Variation (VI) 1000

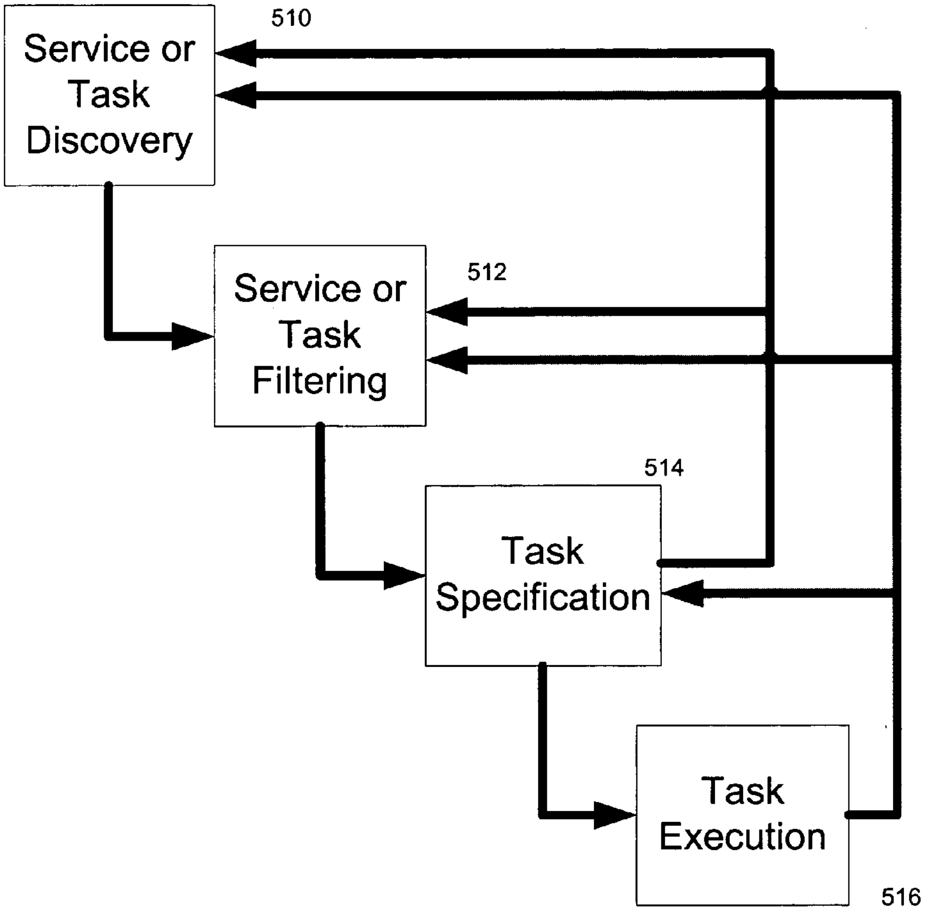
Figure 11 Composite Task Computing Workflow 1100

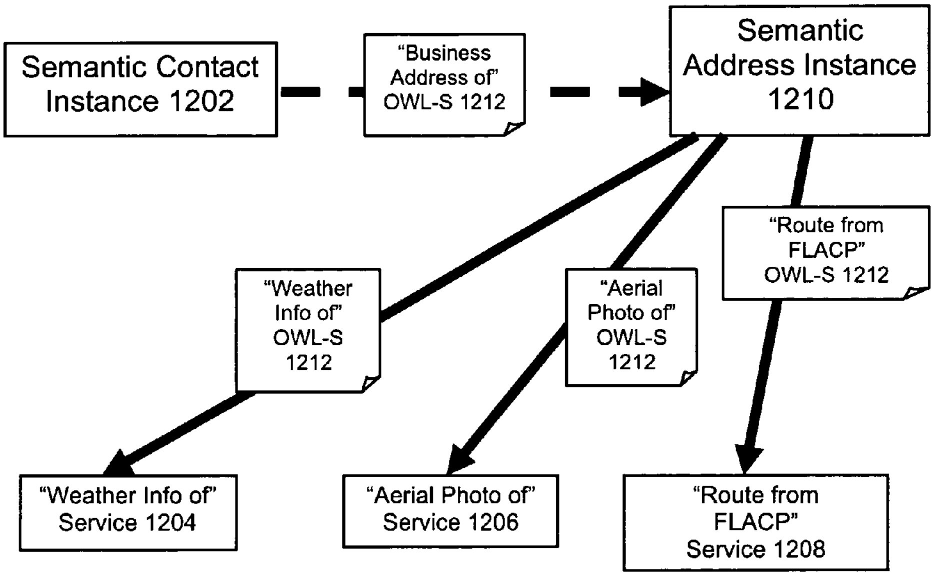
Figure 12 Semantic Service Instance Mapping and Grounding 1200

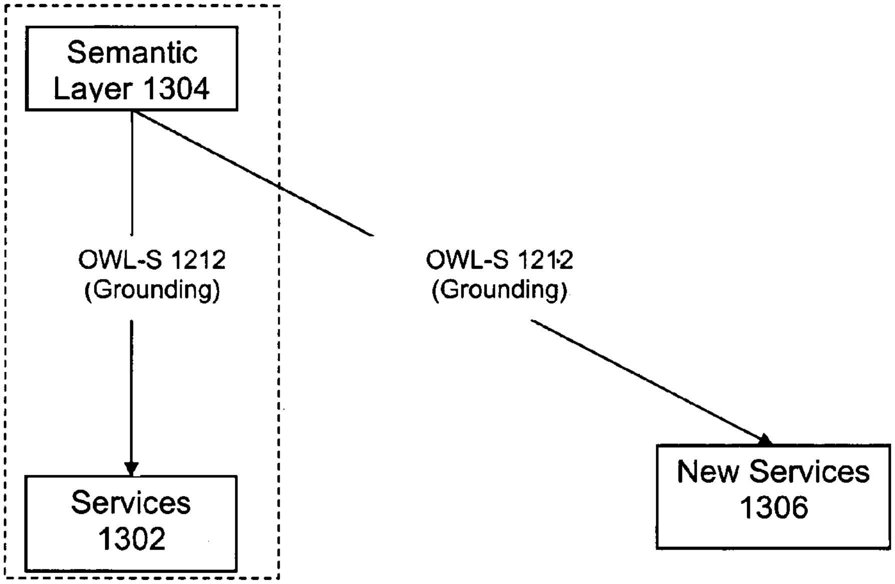
Figure 13 Incorporating New Services (I) 1300

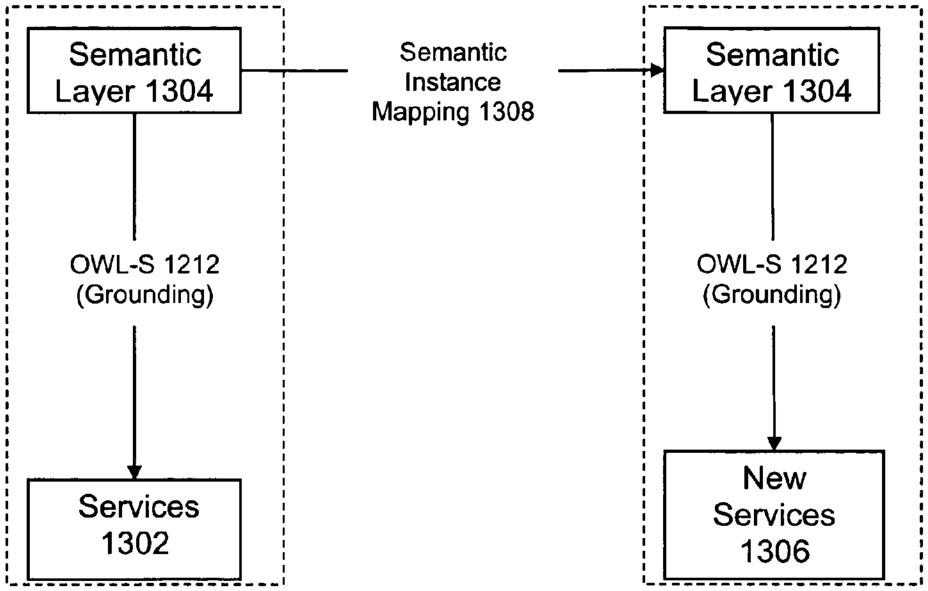
Figure 14 Incorporating New Services (II) 1400

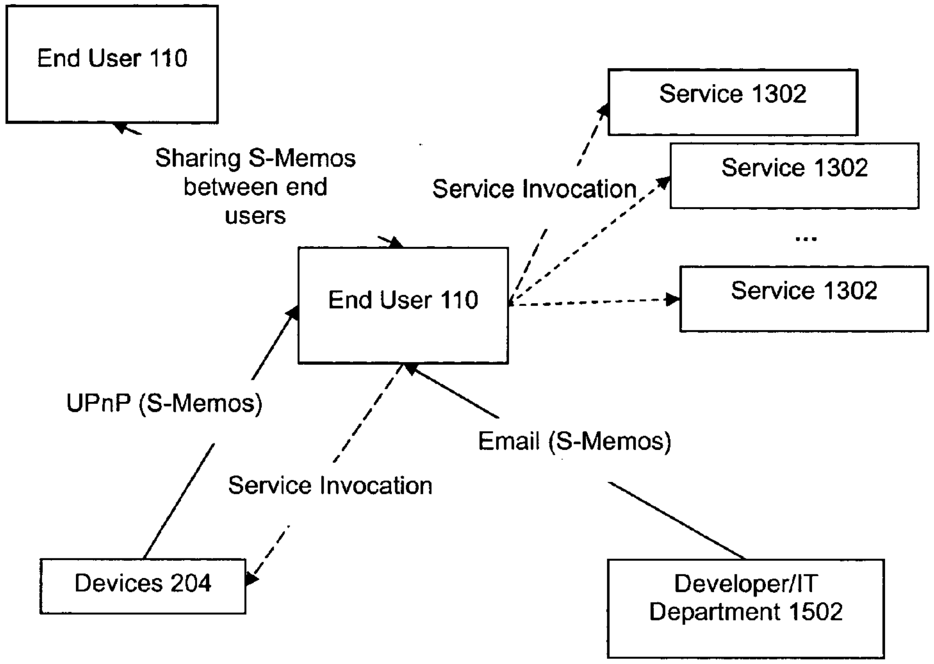
Figure 15 End-user System Development/Deployment Based on S-Memo 1500

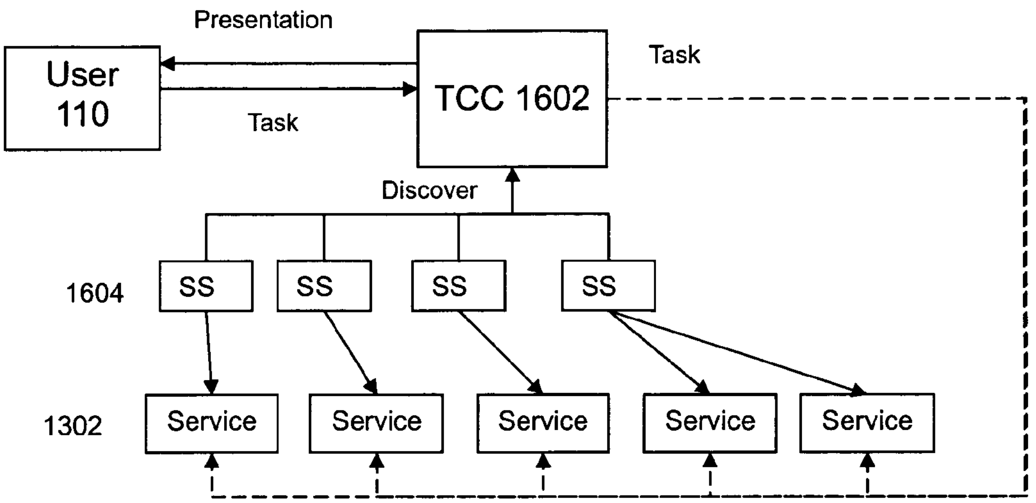
Figure 16 Generic Architecture of a TCE Embodiment 1600

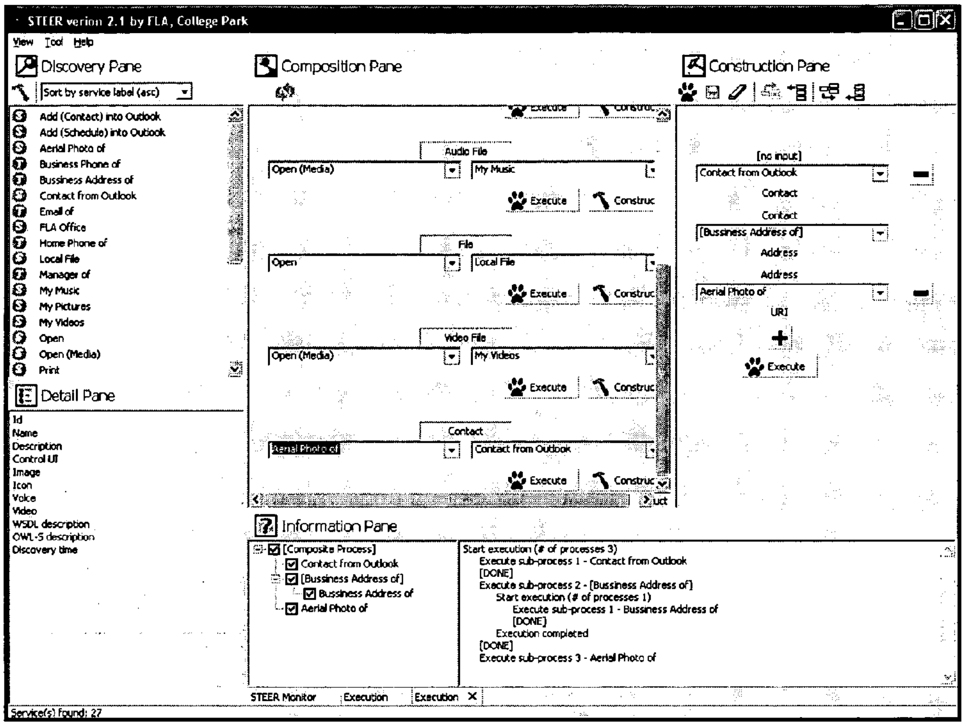
Figure 17 User Interface Full Version 1700

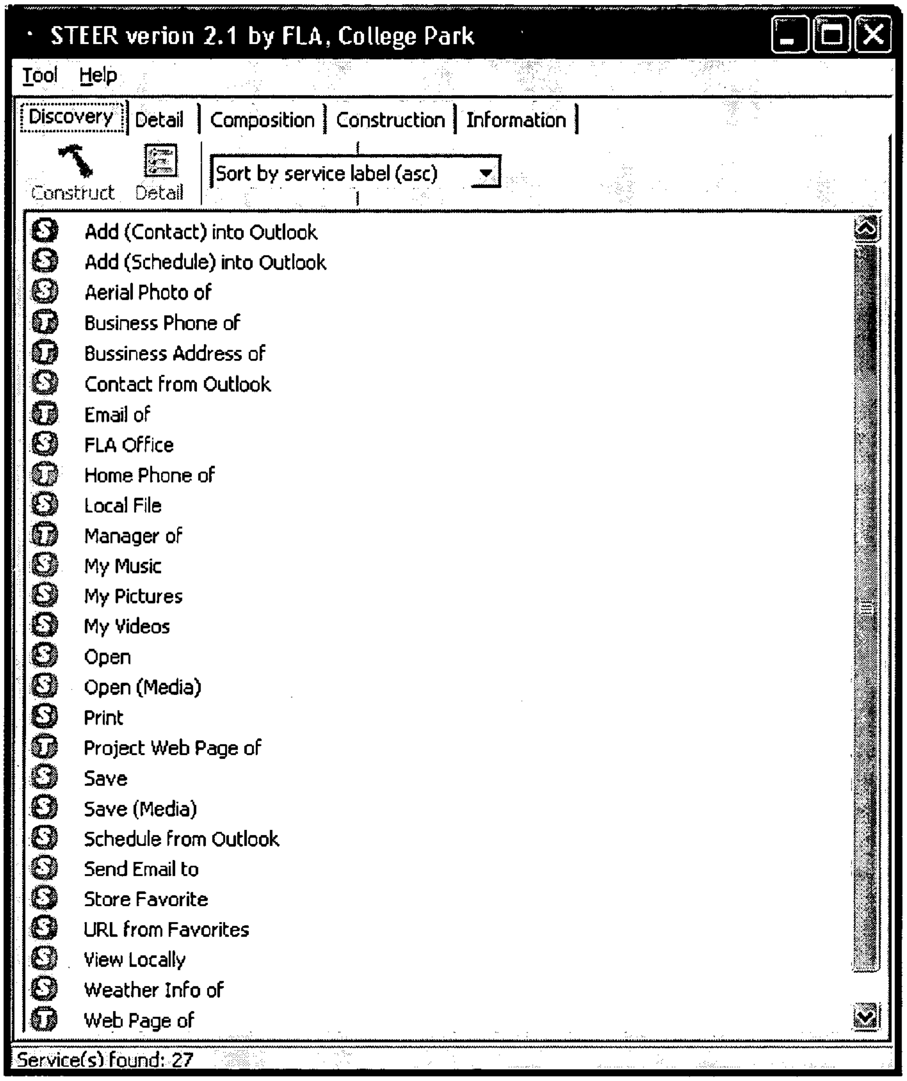
Figure 18 User Interface Tab Version (I) 1800

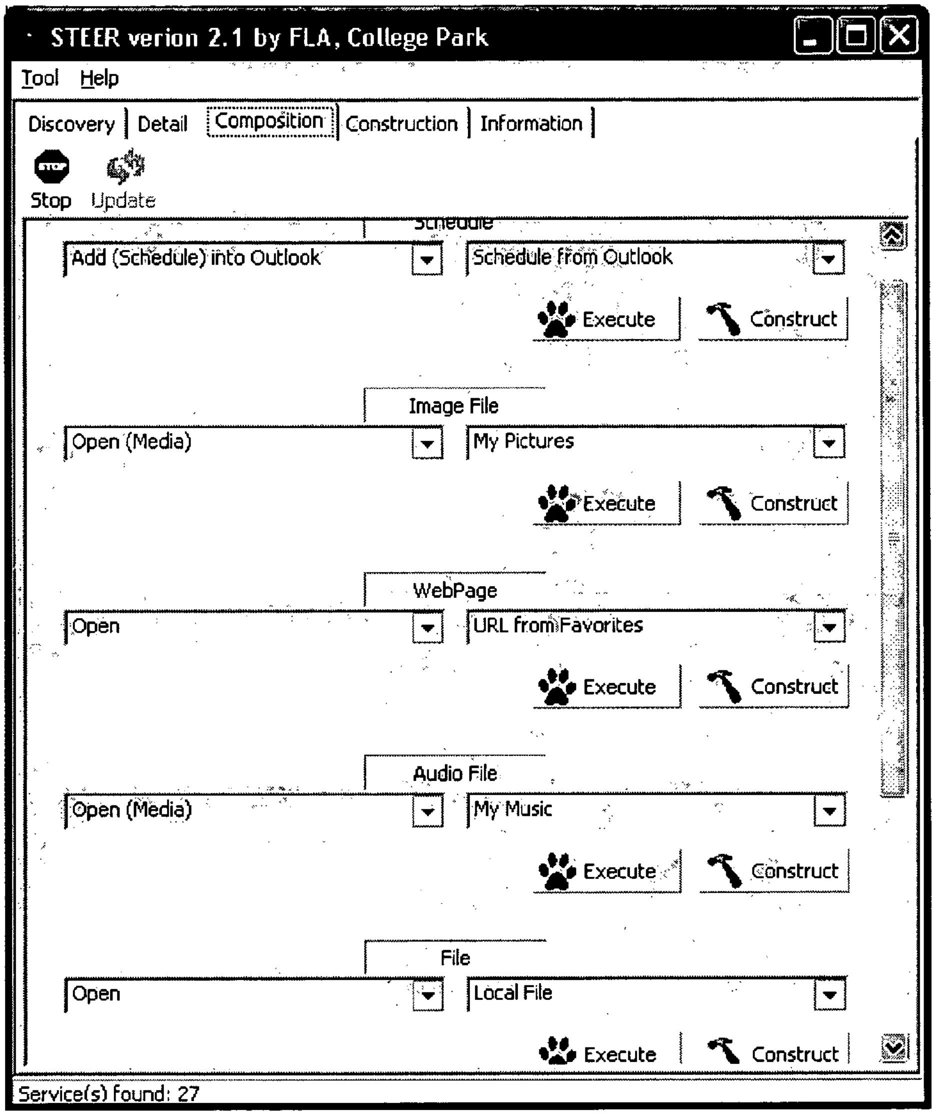
Figure 19 User Interface Tab Version (II) 1900

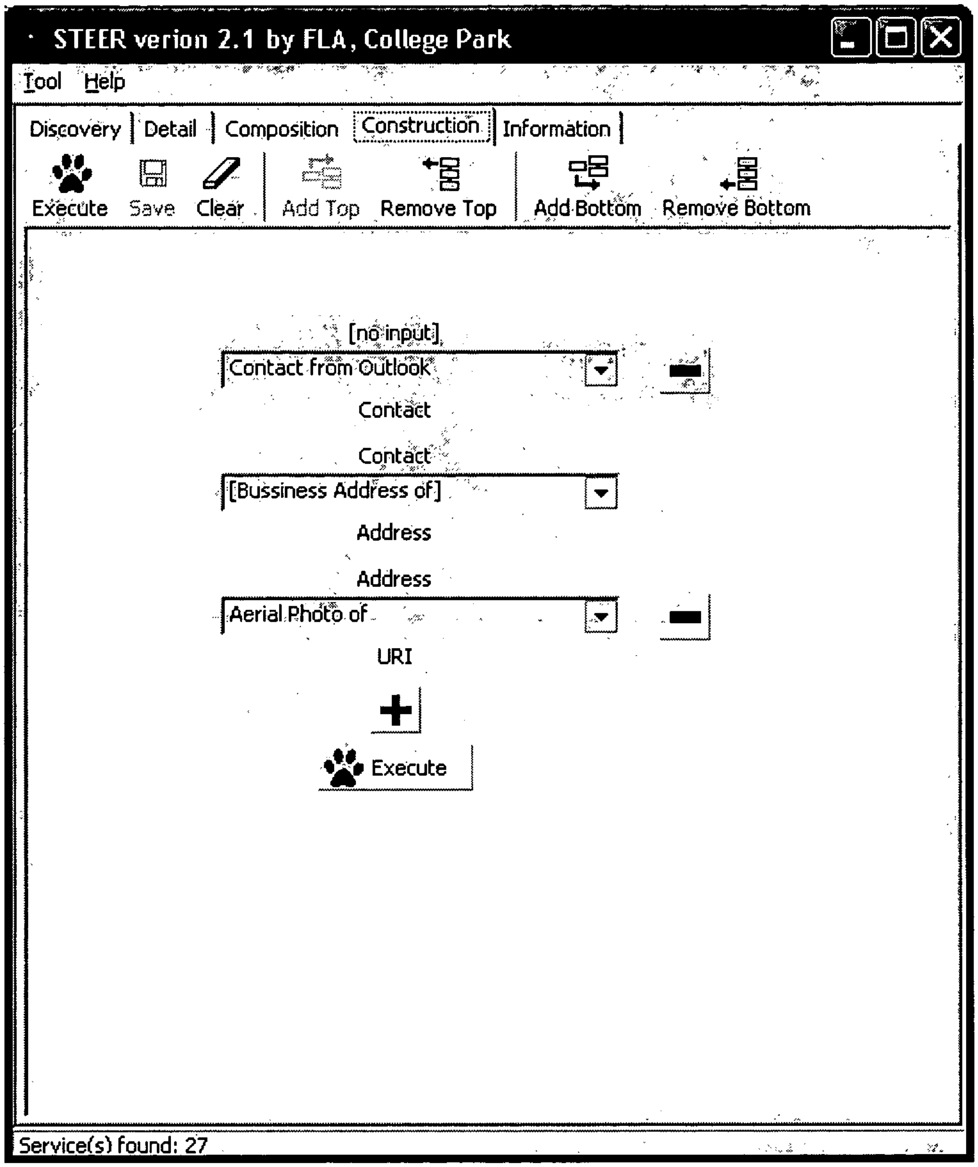
Figure 20 User Interface Tab Version (III) 2000

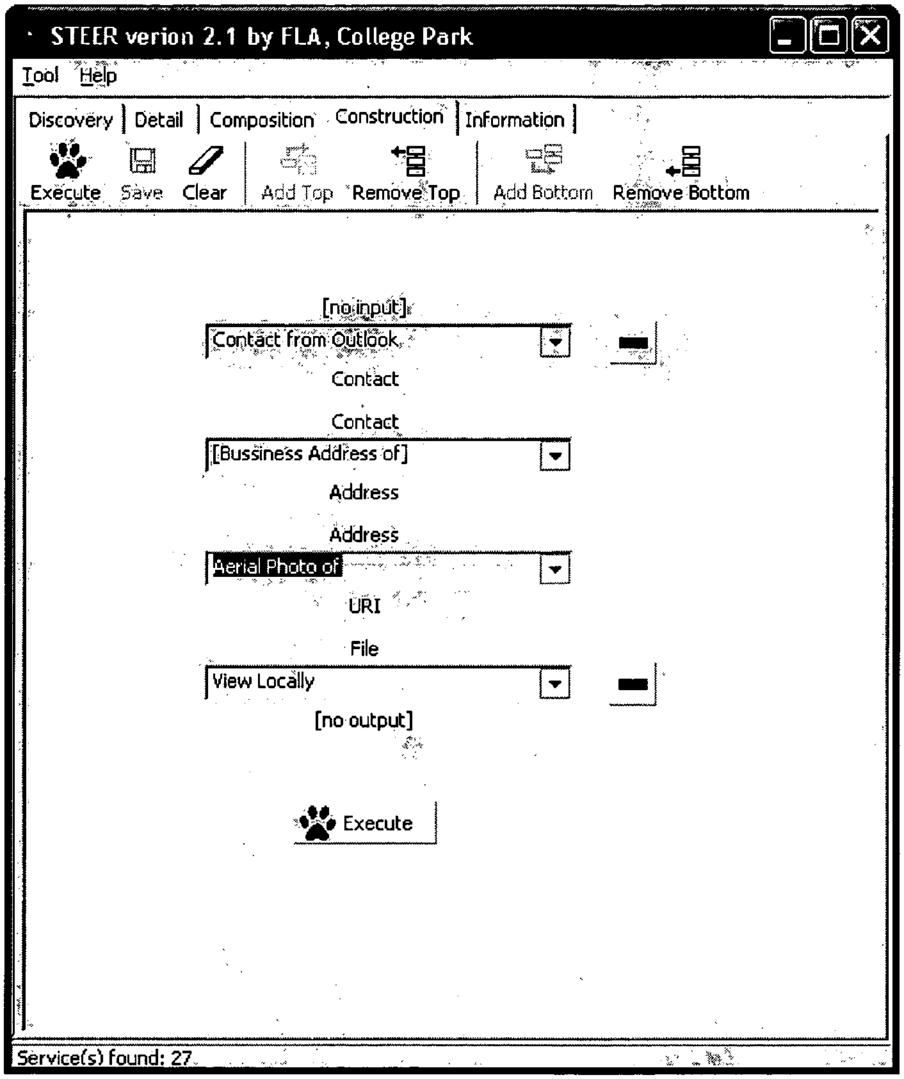
Figure 21 User Interface Tab Version (IV) 2100

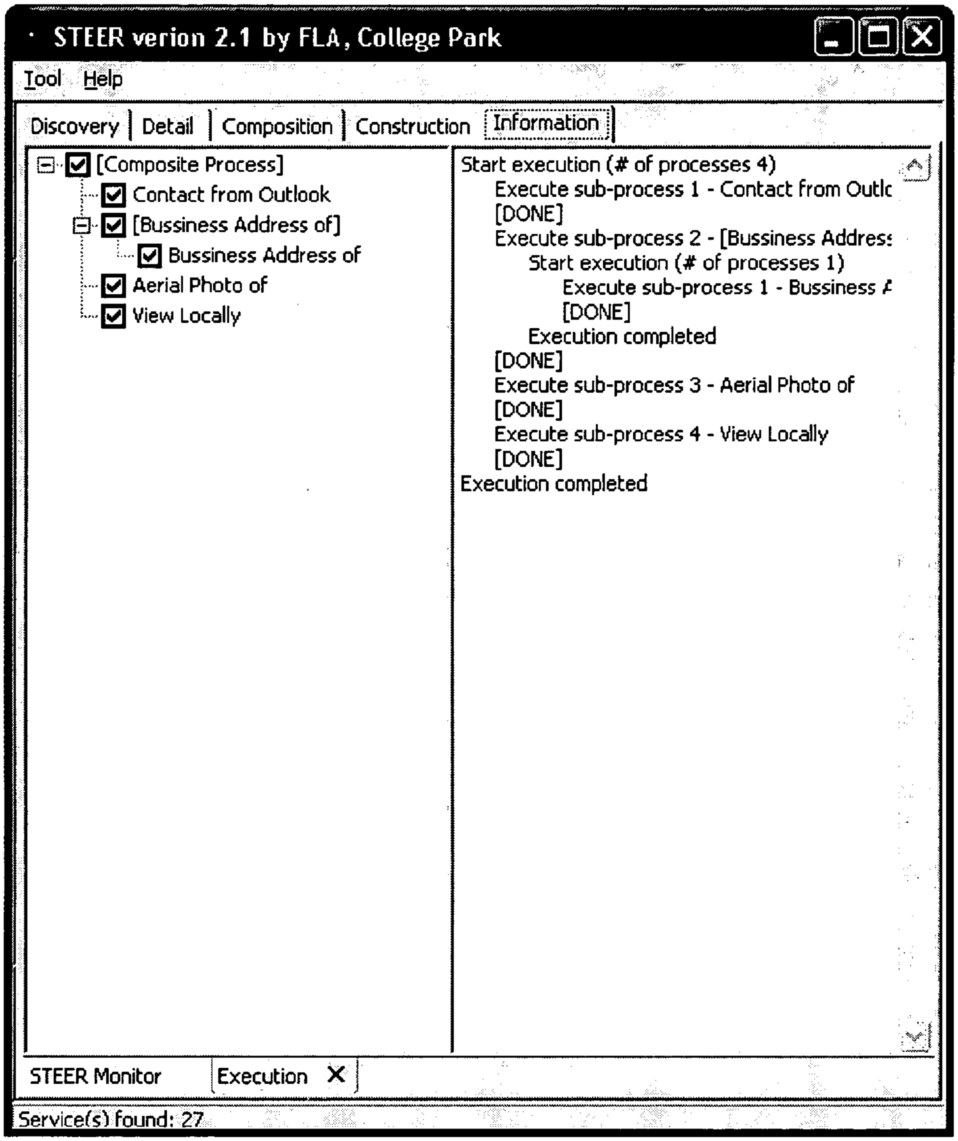
Figure 22 User Interface Tab Version (V) 2200

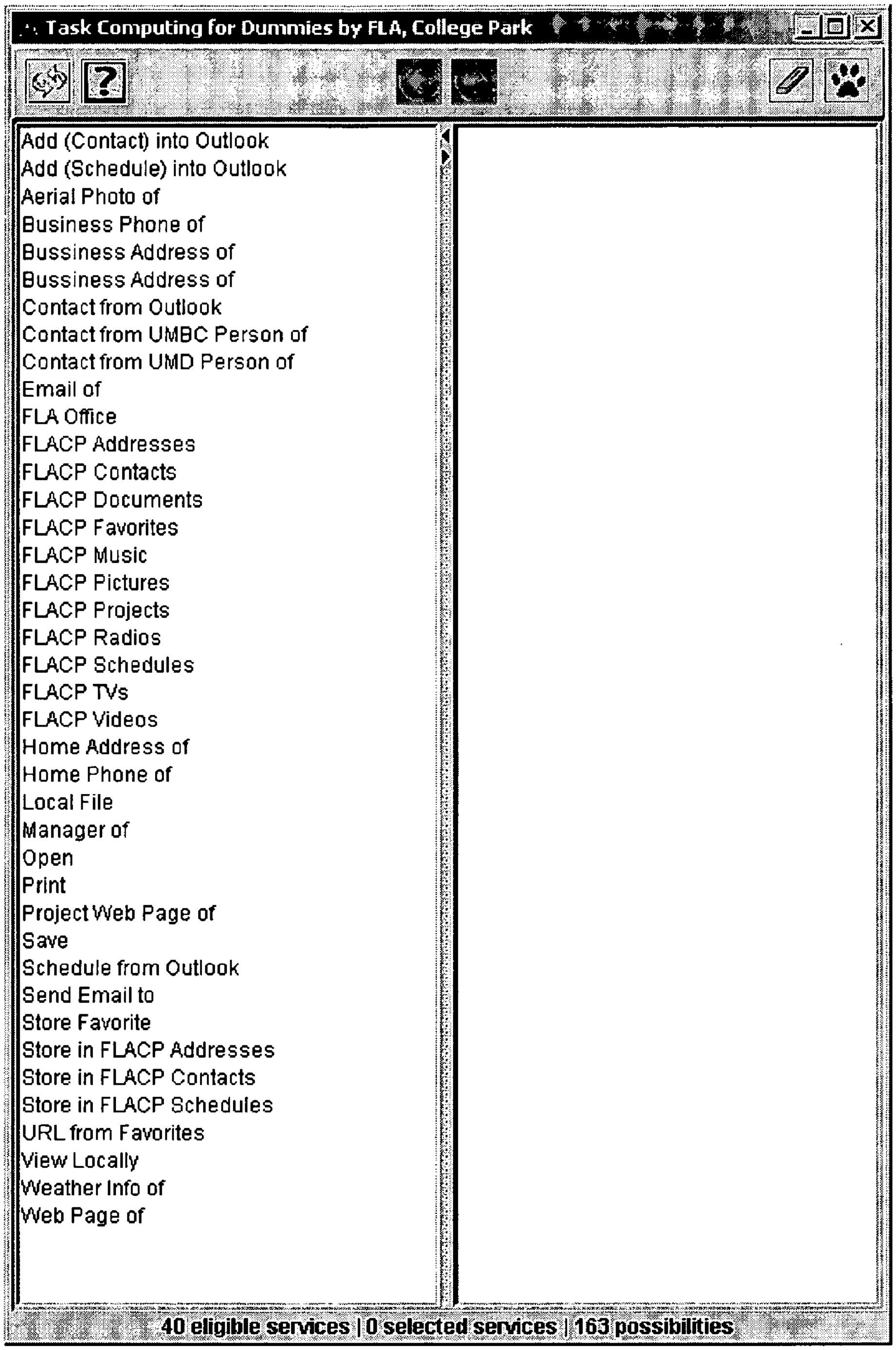
Figure 23 User Interface Flow Version (I) 2300

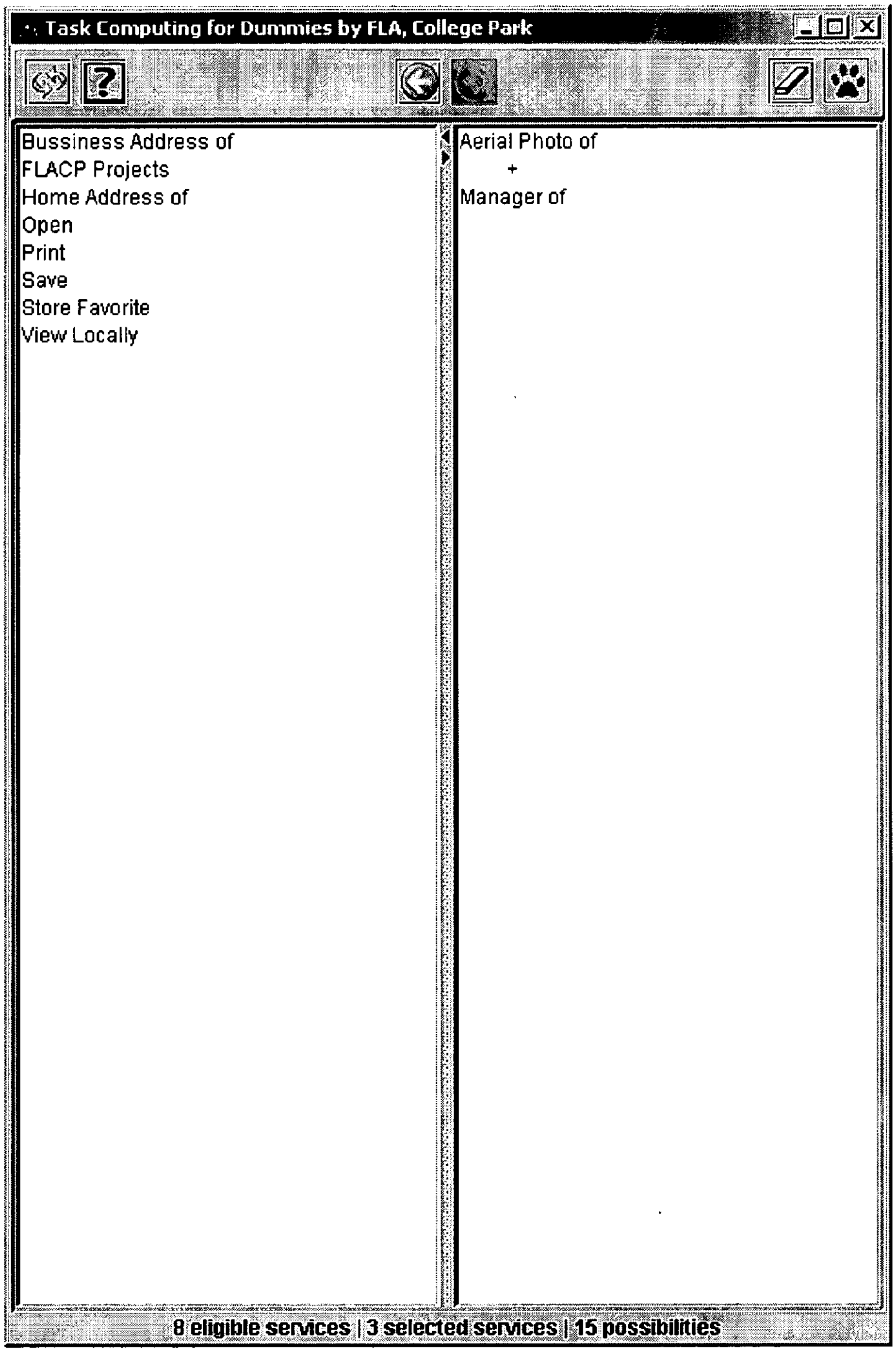
Figure 24 User Interface Flow Version (II) 2400

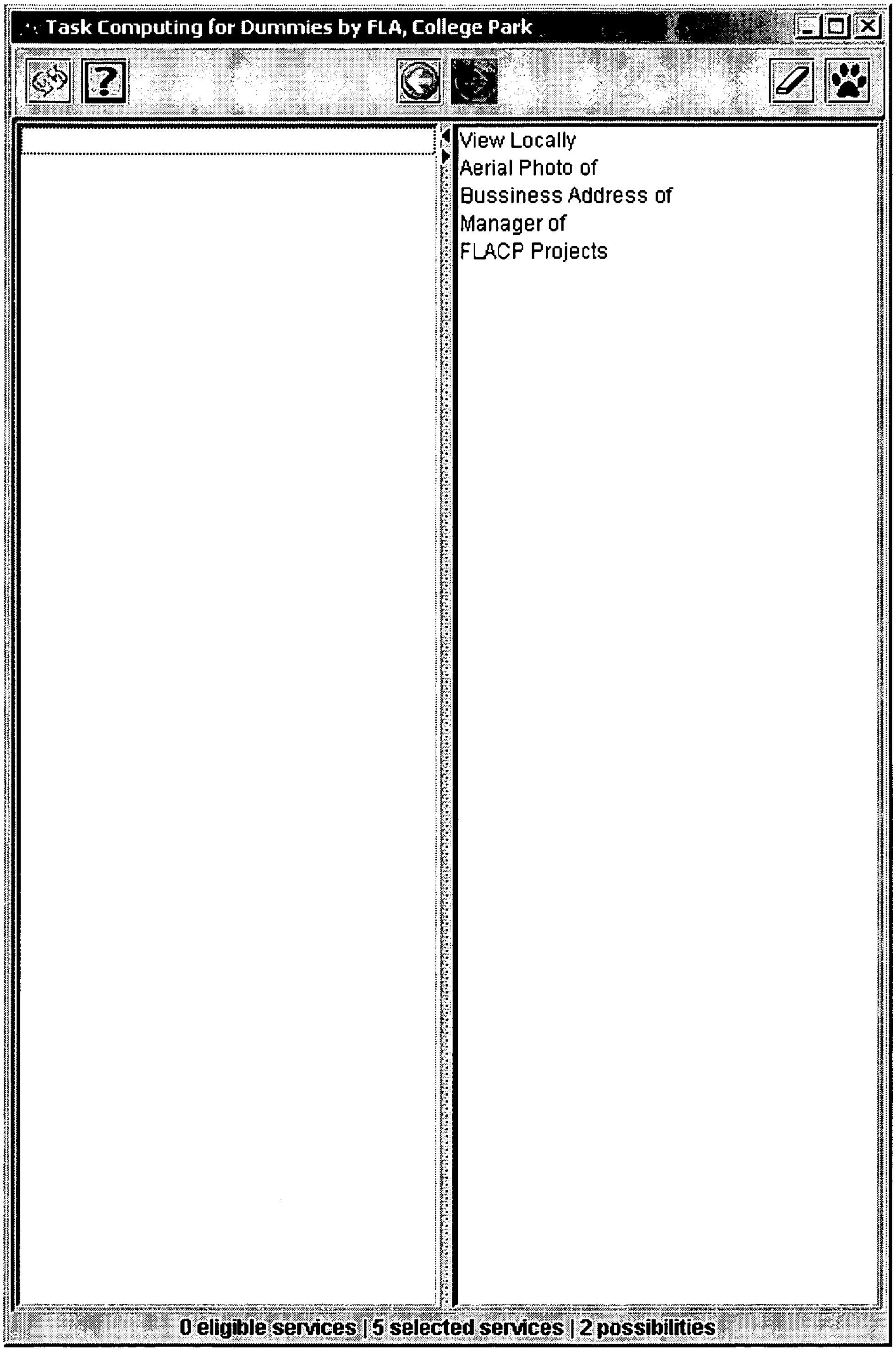
Figure 25 User Interface Flow Version (III) 2500

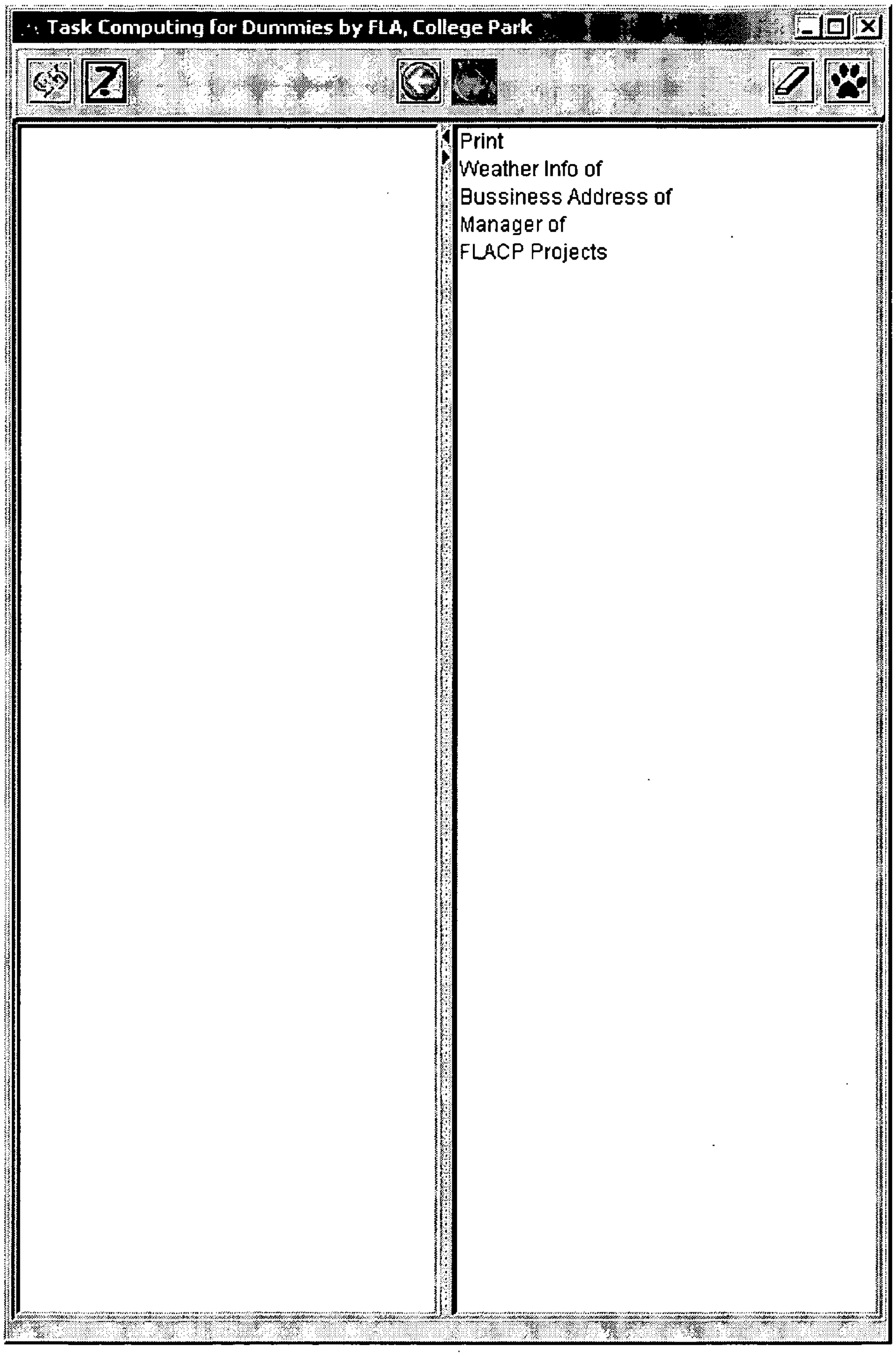
Figure 26 User Interface Flow Version (IV) 2600

Aerial Photo
Business Address of
Web Page of
Manager of
View on Projector
URL from favorites
Aerial Photo of
Weather of
View Locally
Print
Wireless Wallet Project
Route from FLACP
RESTART
Task Computing

Figure 27 At the Start 2700

Aerial Photo
Business Address of
Web Page of
Manager of
View on Projector
URL from favorites
Aerial Photo of
Weather of
View Locally
Print
Wireless Wallet Project
Route from FLACP
View on Projector
BACK
RESTART
Task Computing

Figure 28 After User Selection 2800

Business Address of
Web Page of
Aerial Photo of
Manager of
Wireless Wallet Project
URL from favorites
Weather of
View on Projector
BACK
RESTART
Task Computing

Figure 29 After Refreshing of Left Panel 2900

Business Address of
Web Page of
Aerial Photo of
Manager of
Wireless Wallet Project
URL from favorites
Weather of
View on Projector
Weather of
BACK
RESTART
Task Computing

Figure 30 After User Selection 3000

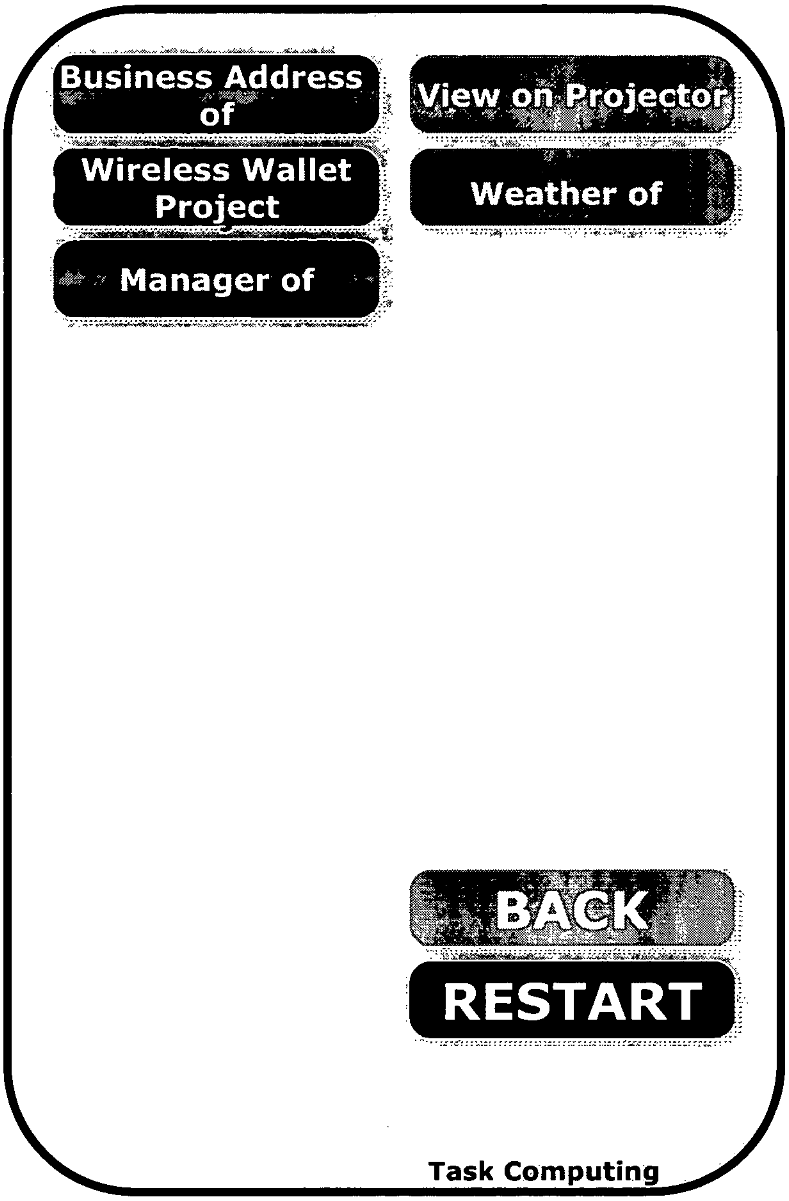
Figure 31 After Refreshing of Left Panel 3100

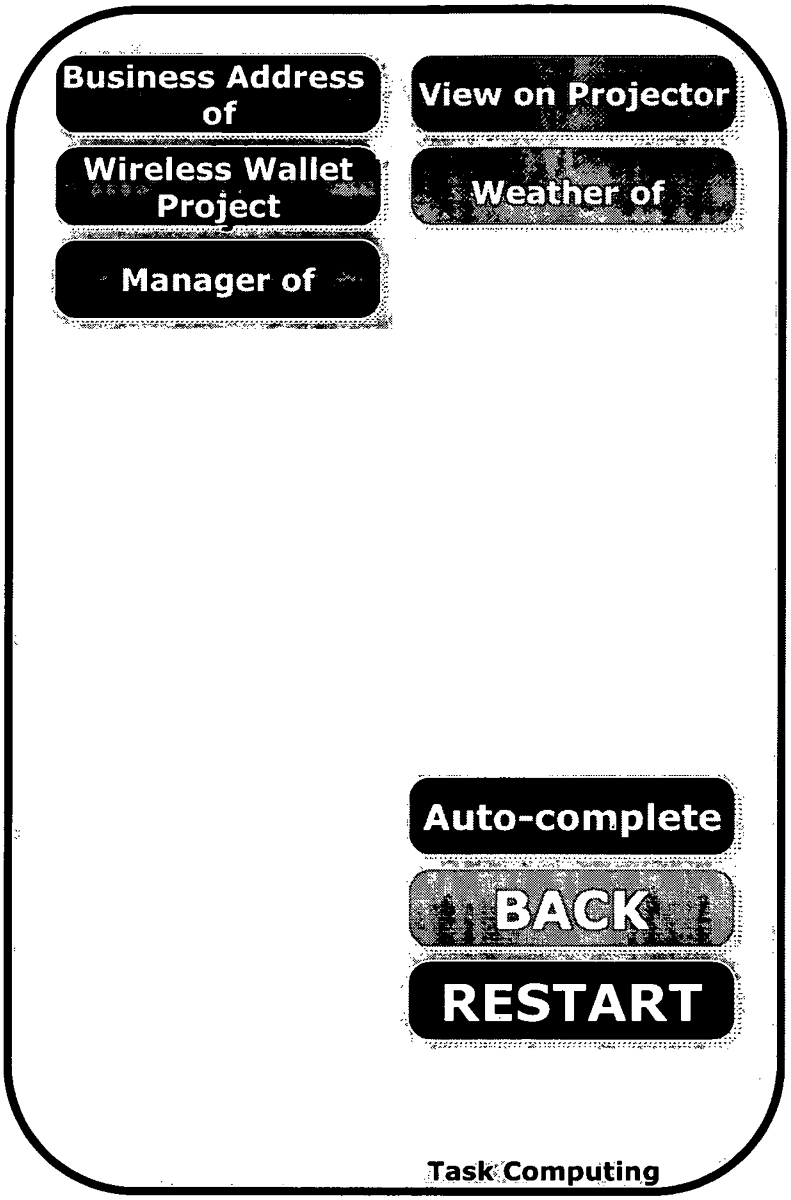
Figure 32 Auto-complete is Now Possible 3200

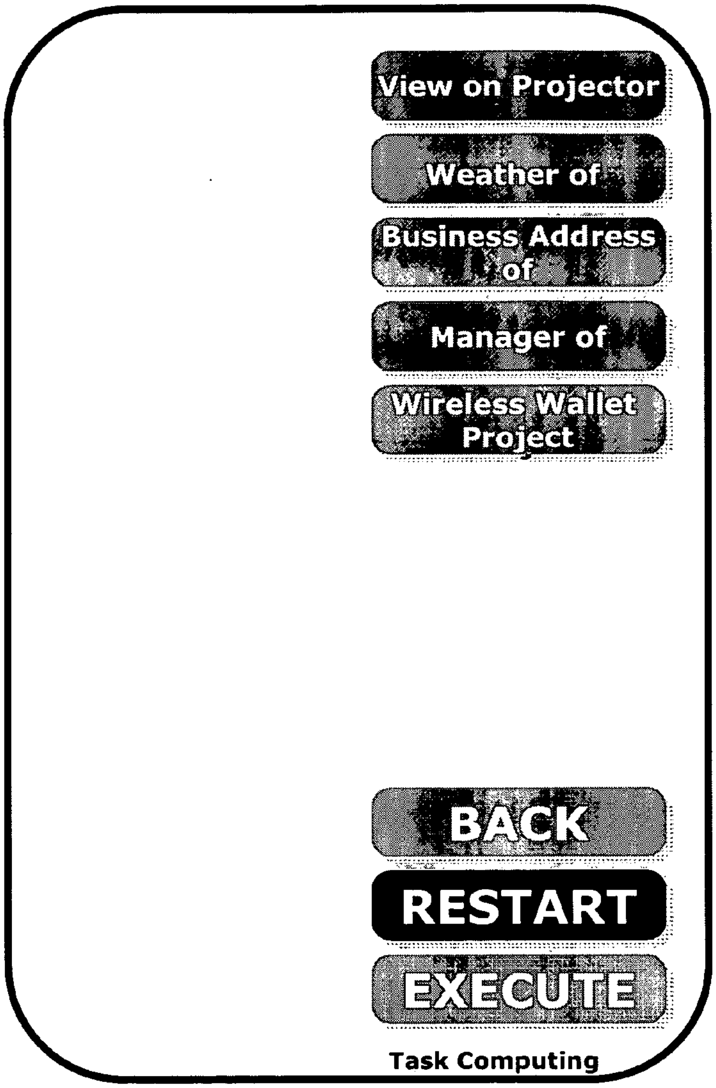
Figure 33 After User Selects Auto-complete; Alternatively if Auto Complete is Possibly, it Might be Done Automatically 3300

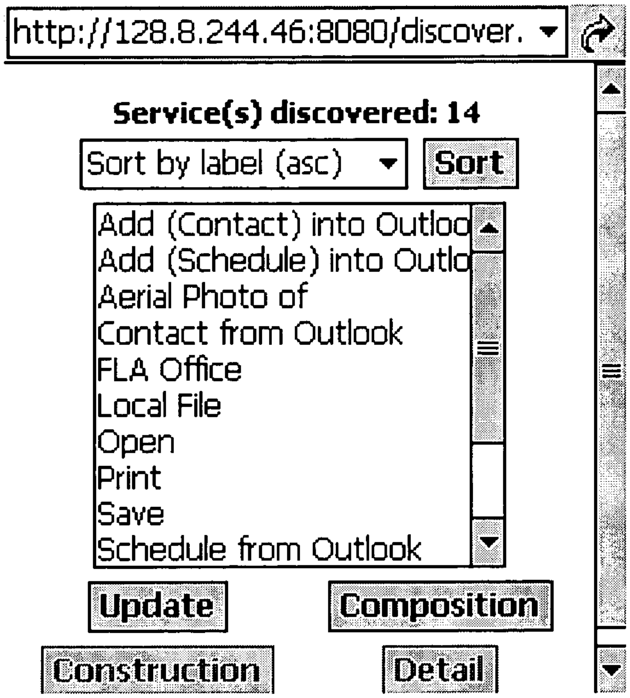
Figure 34 User Interface Web Version (I) 3400

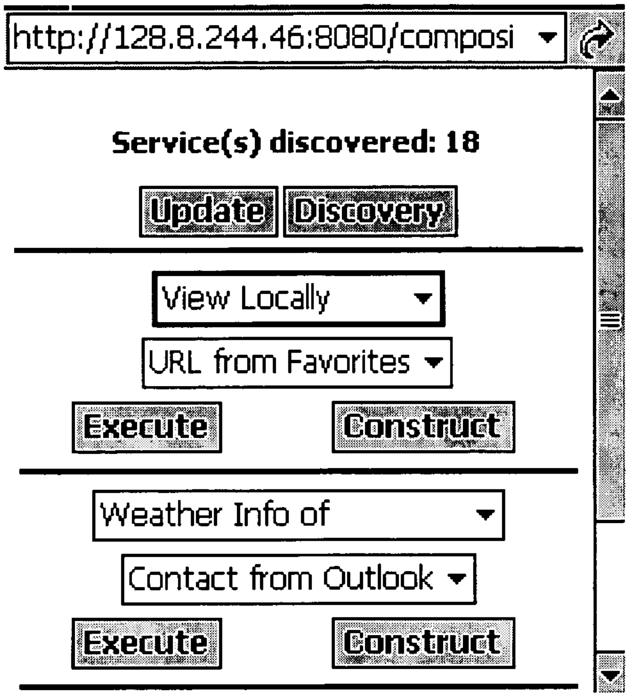
Figure 35 User Interface Web Version (II) 3500

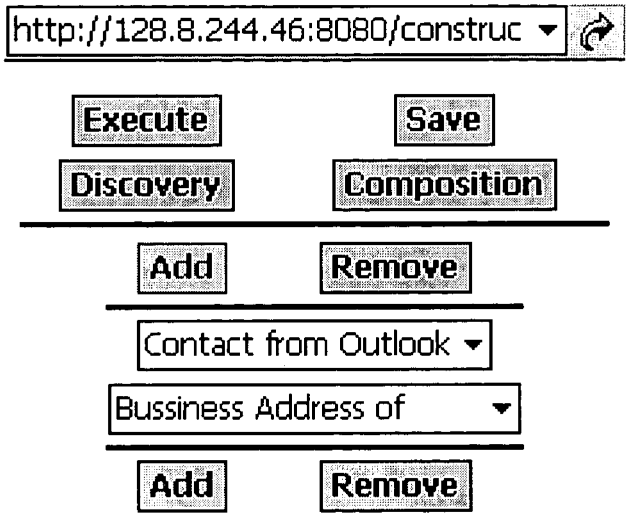
Figure 36 User Interface Web Version (III) 3600

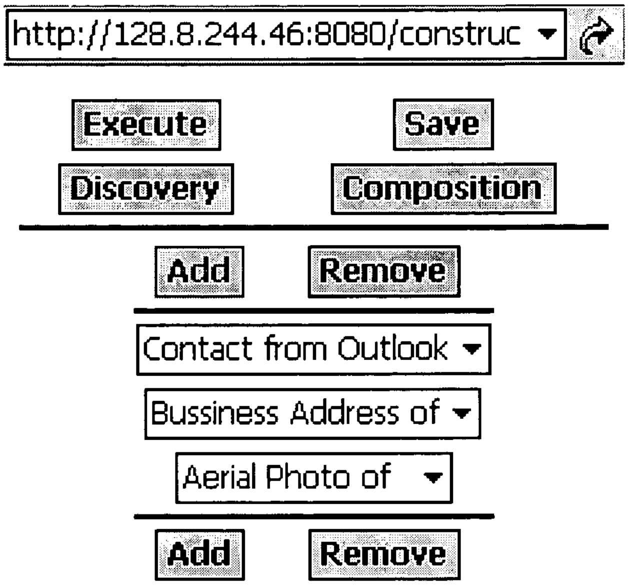
Figure 37 User Interface Web Version (IV) 3700

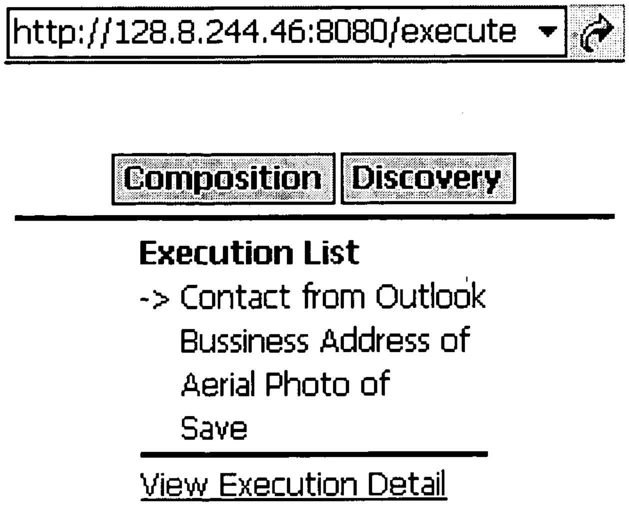
Figure 38 User Interface Web Version (V) 3800

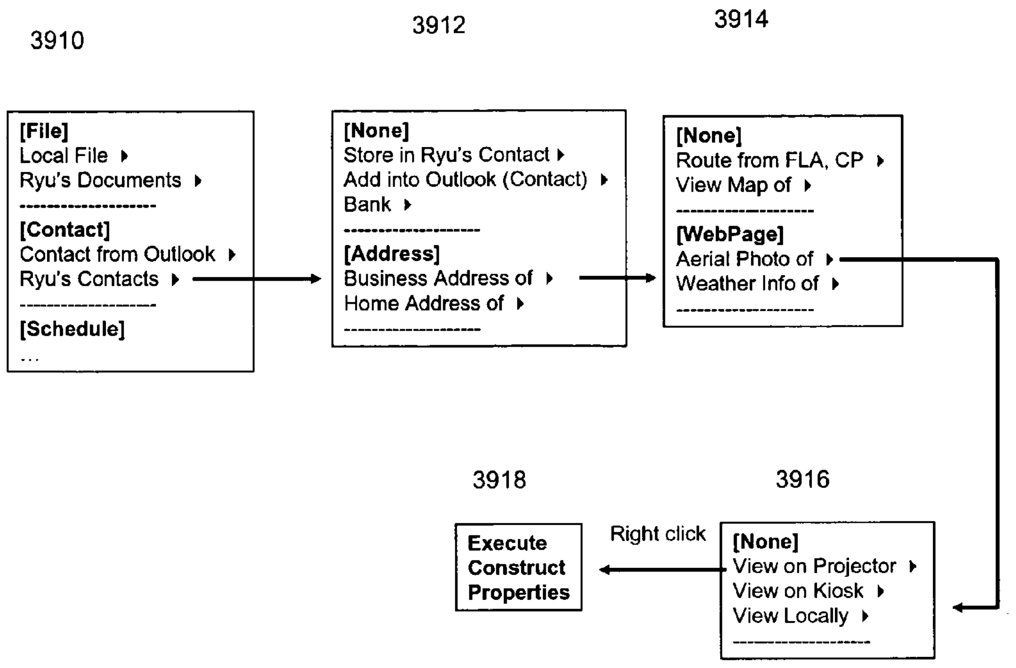
Figure 39 User Interface Nested Menu Version (I) 3900

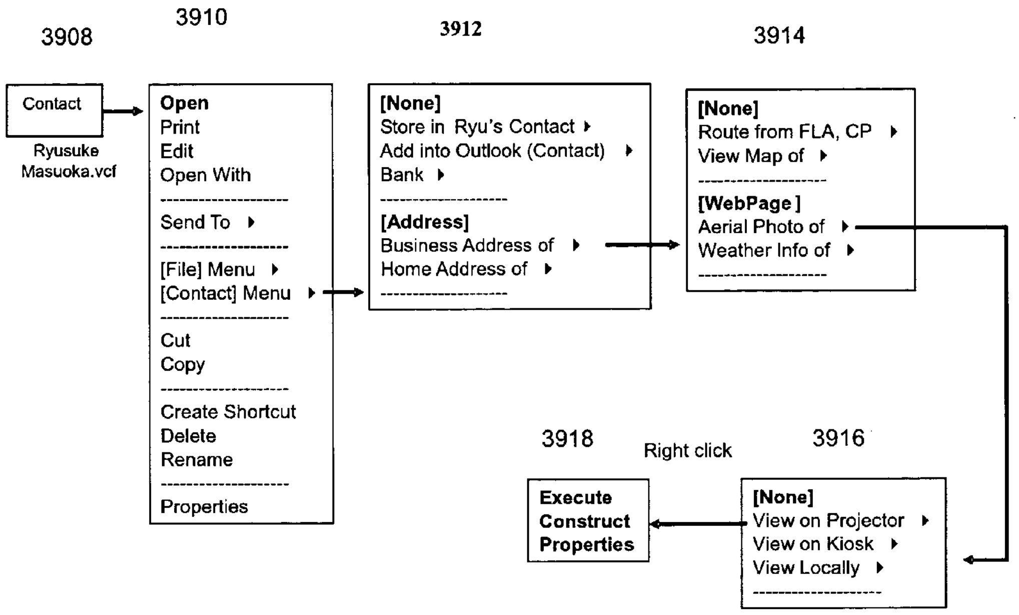
Figure 40 User Interface Nested Menu Version (II) 4000

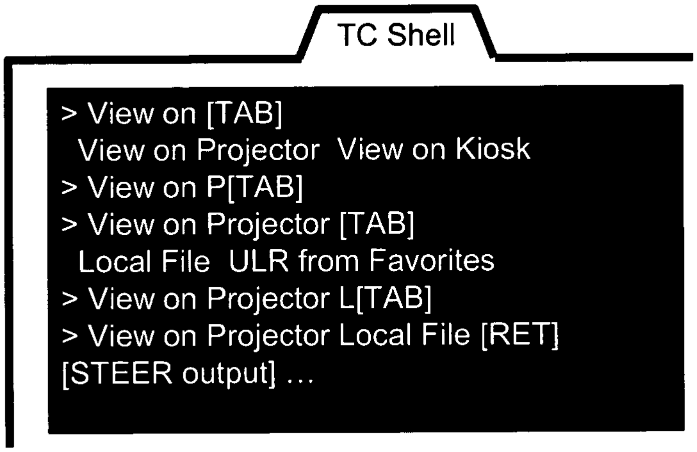
Figure 41 User Interface Command Line Version 4100

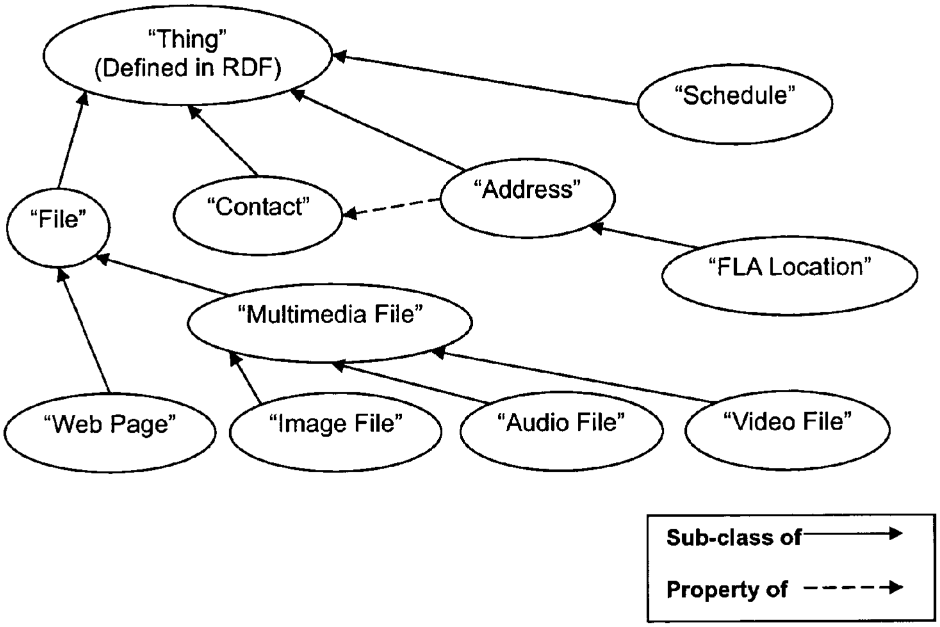
Figure 42 Relationship between Semantic Instance Types 4200

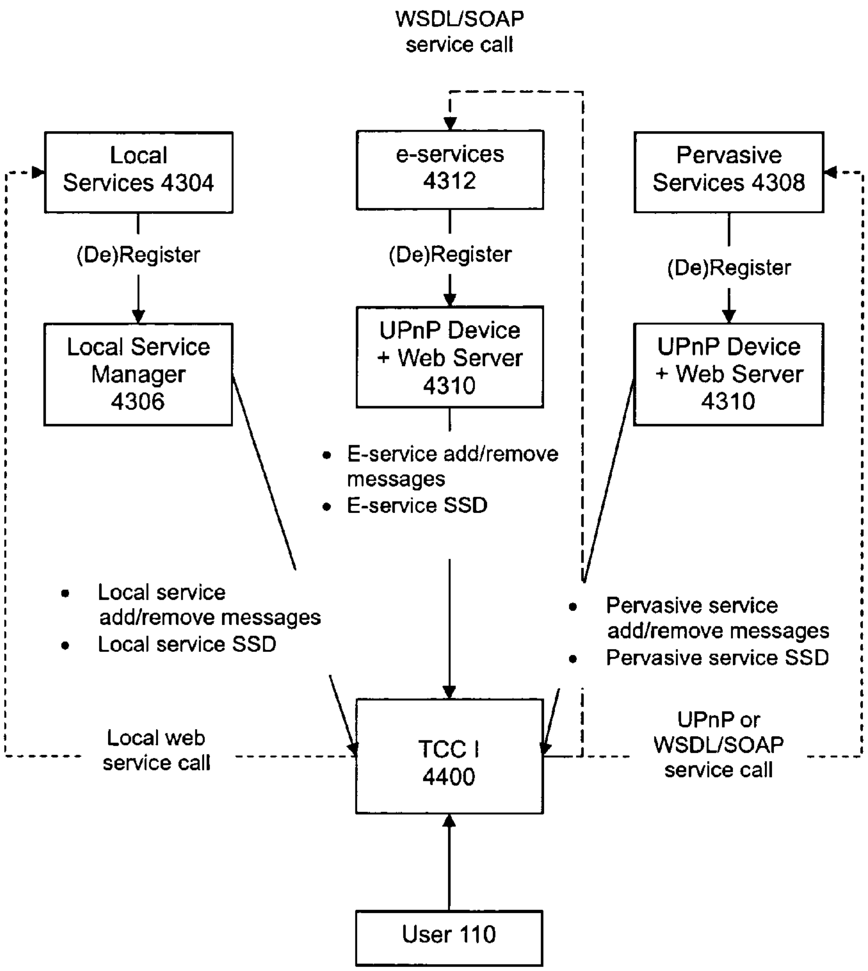
Figure 43 TCE Embodiment Architecture 4300

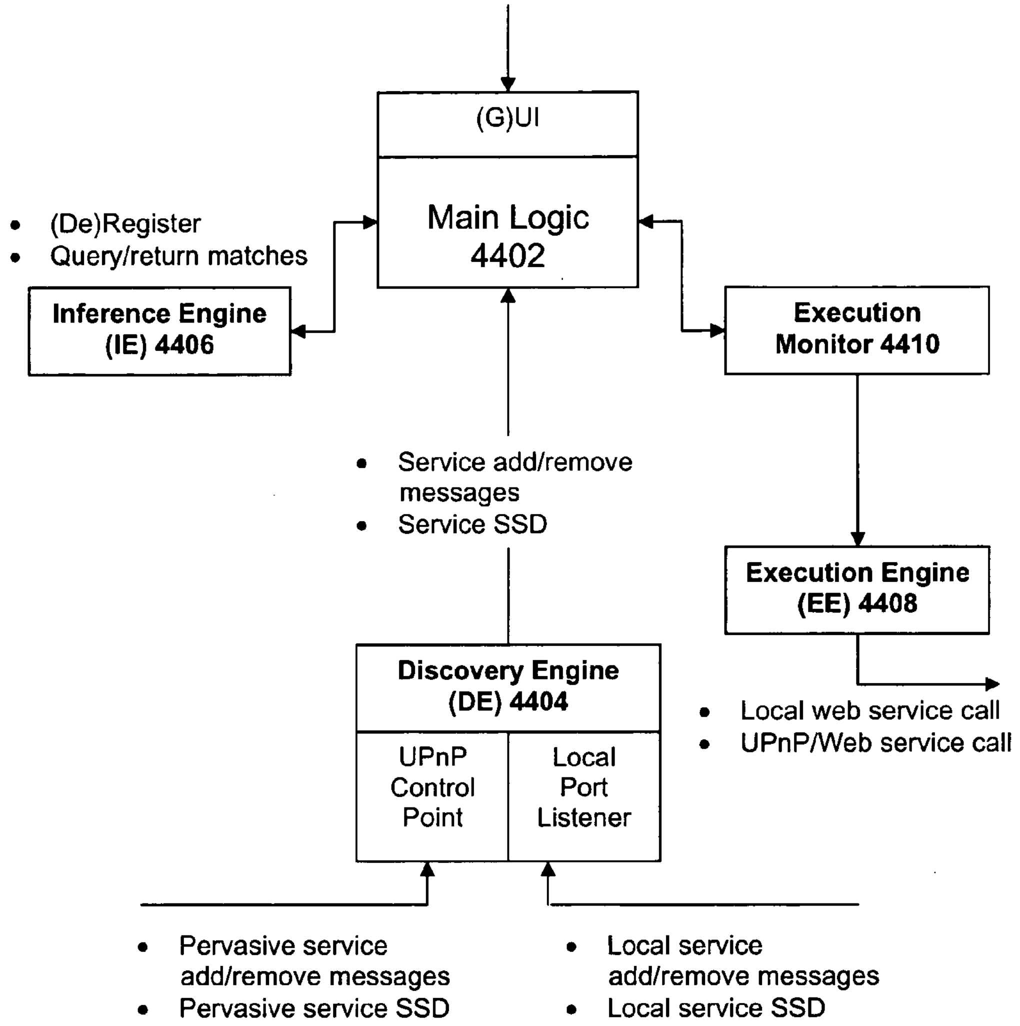
Figure 44 TCC I Internal Mechanism 4400

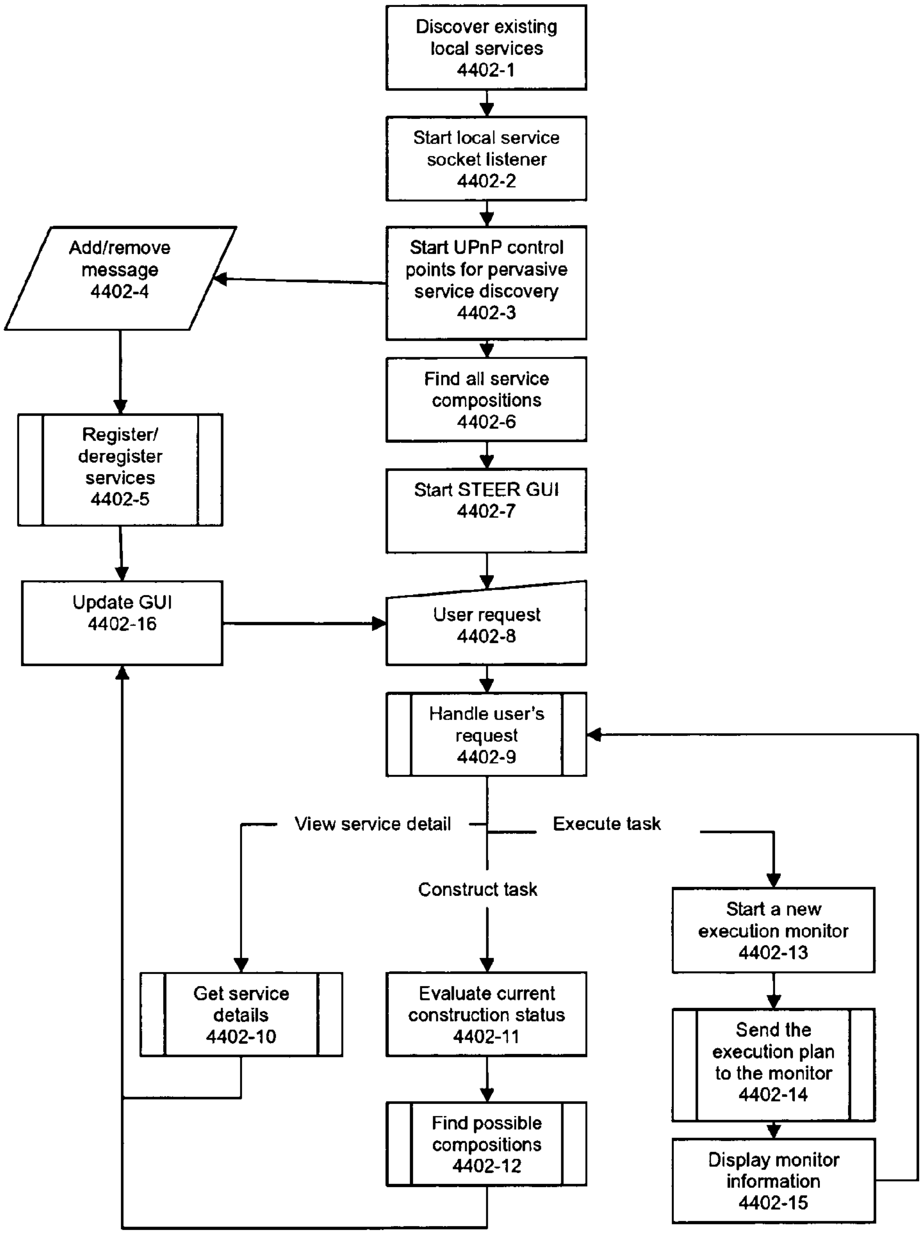
Figure 45 TCC I Main Logic 4402

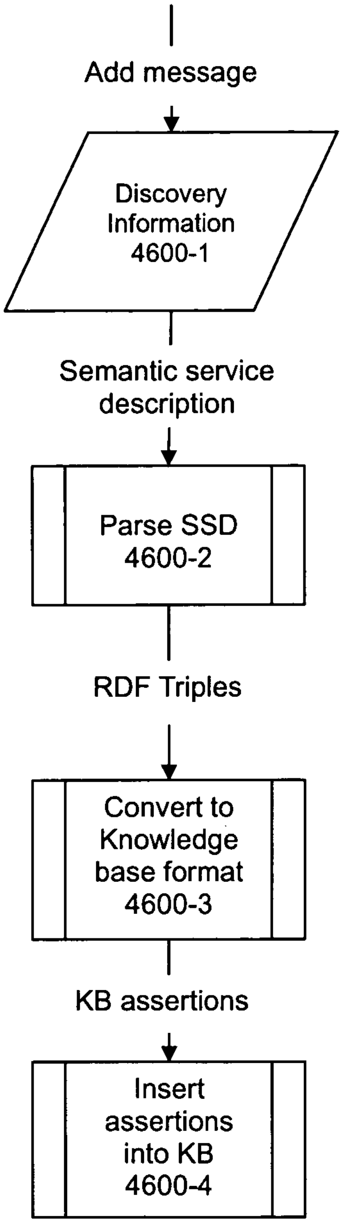
Figure 46 Discovery and Registration 4600 Using IE 4406

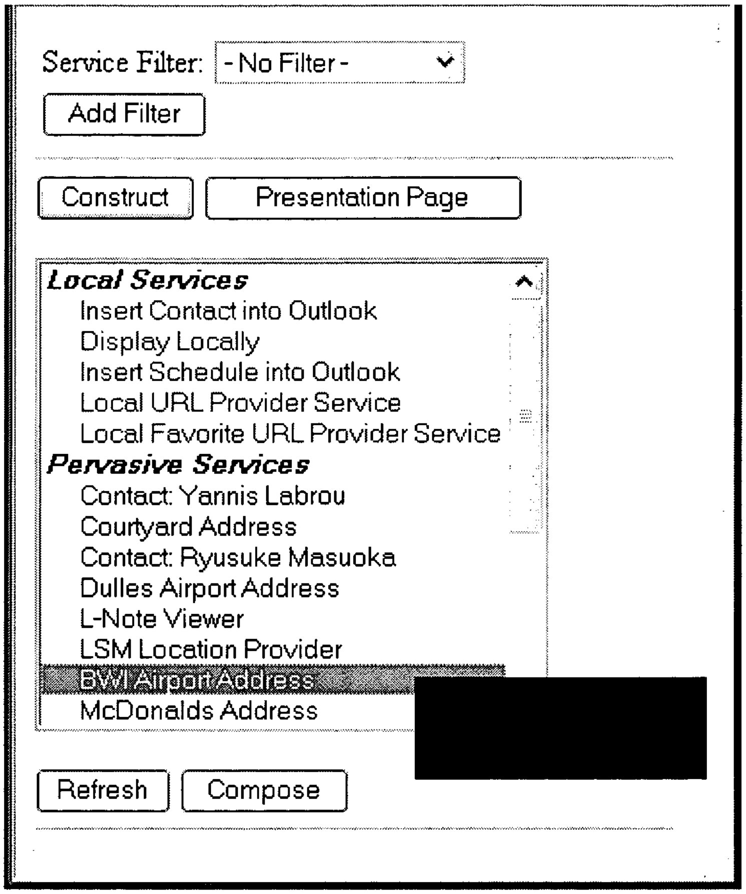
Figure 47Discovery Pane - 4700

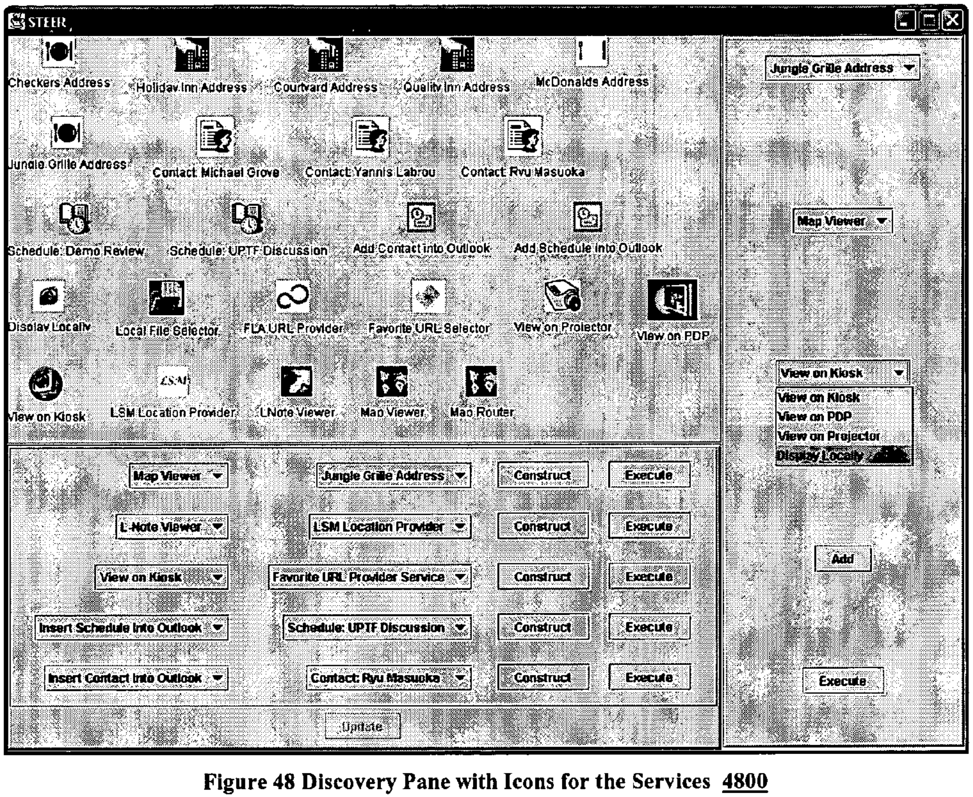
Figure 48 Discovery Pane with Icons for the Services 4800

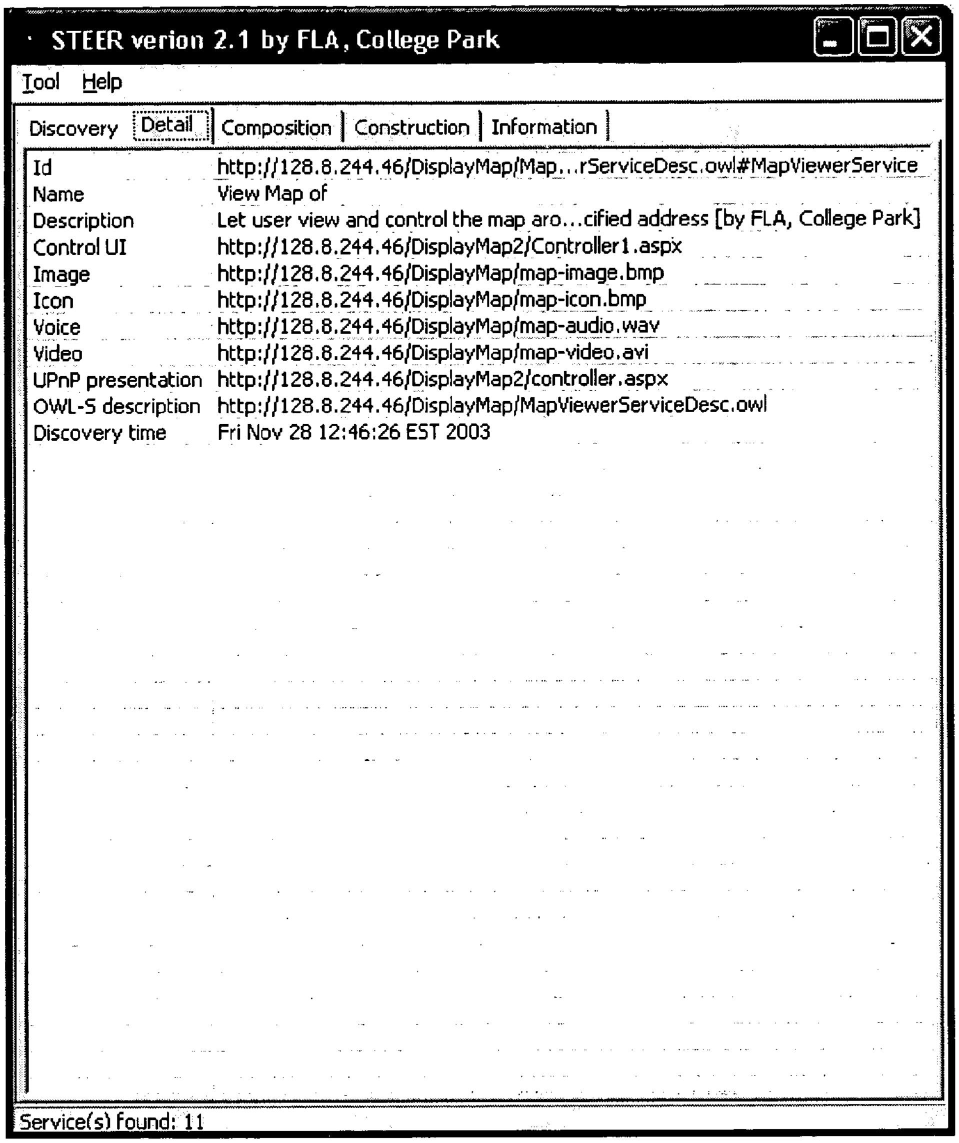
Figure 49 Detail Pane 4900

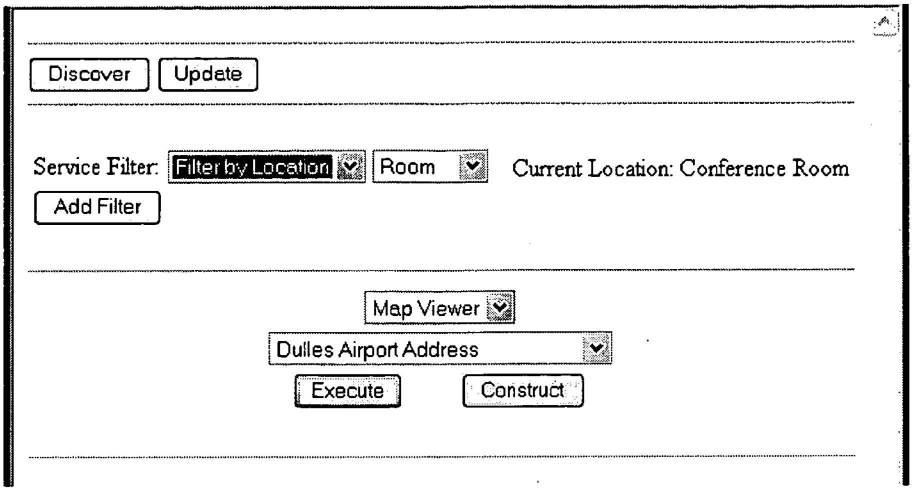
Figure 50 Service Filtering 5000

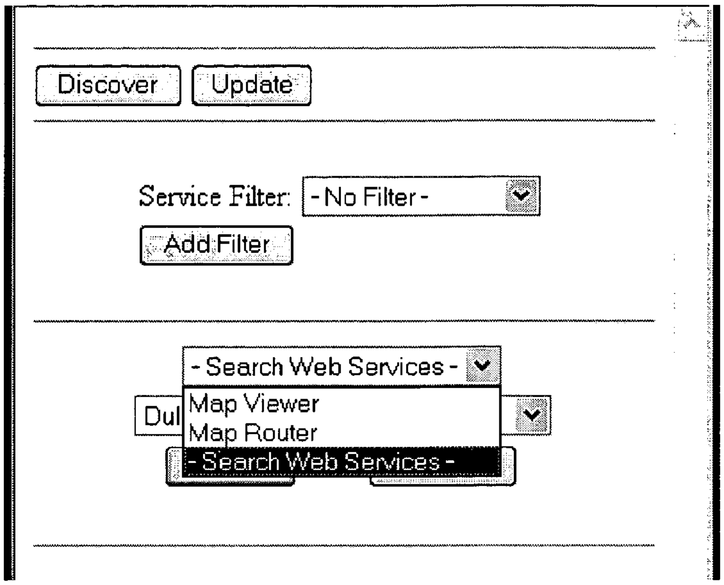
Figure 51 Discovery Pane shown with "Search Web Services" 5100

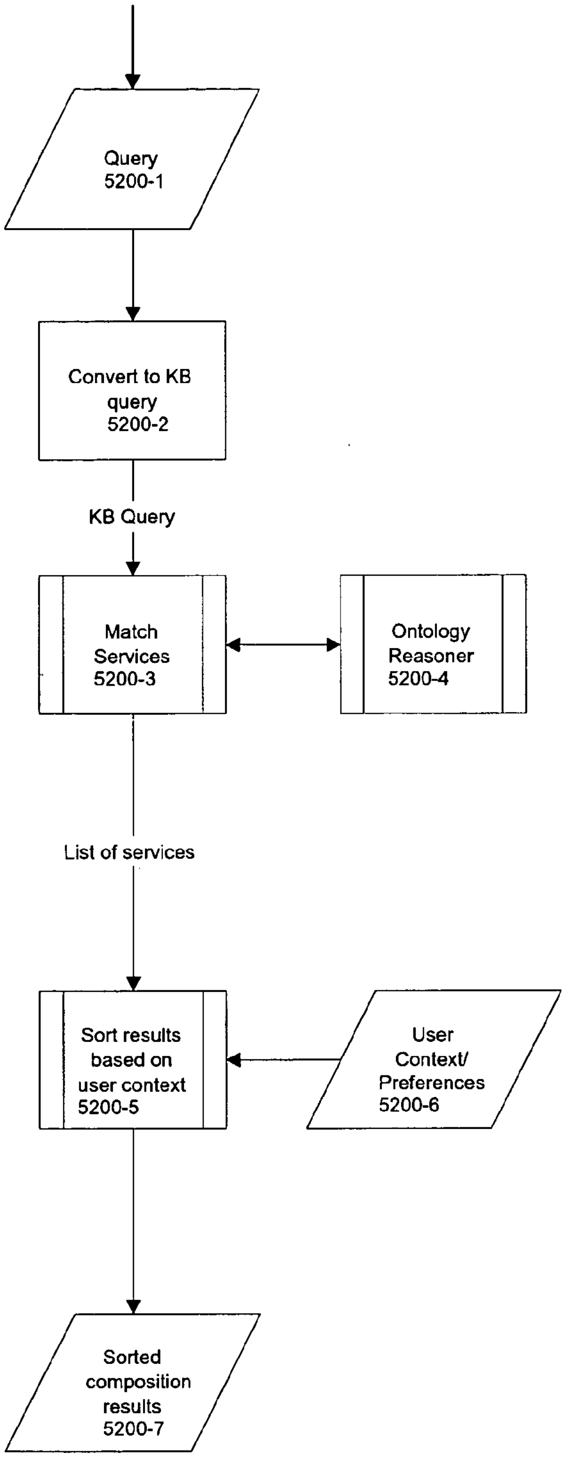
Figure 52 Find Compositions 5200 Using the IE 4406

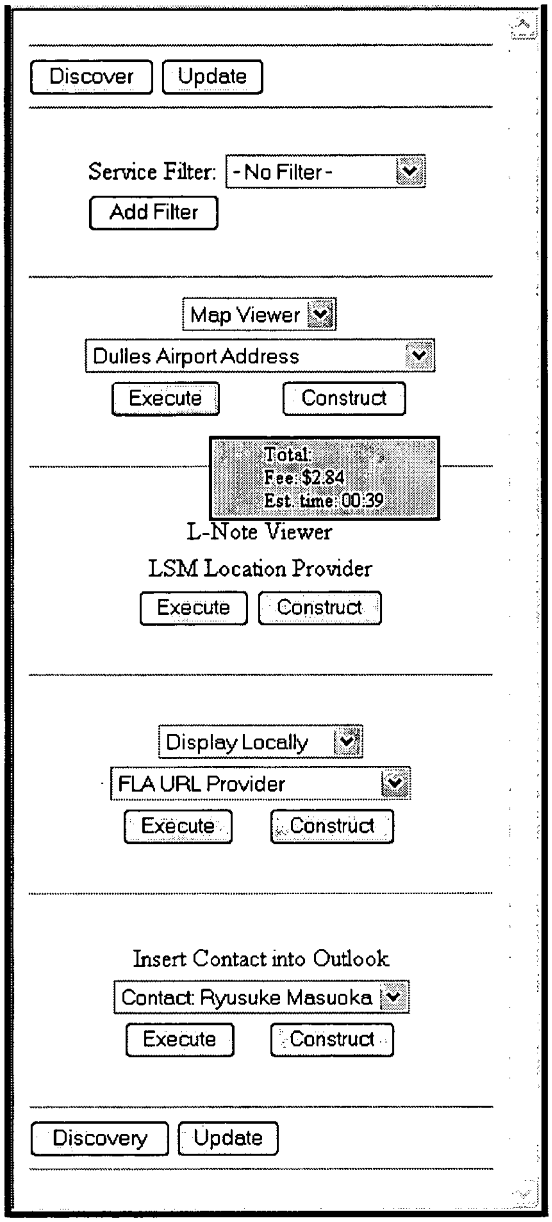
Figure 53 Composition Pane 5300

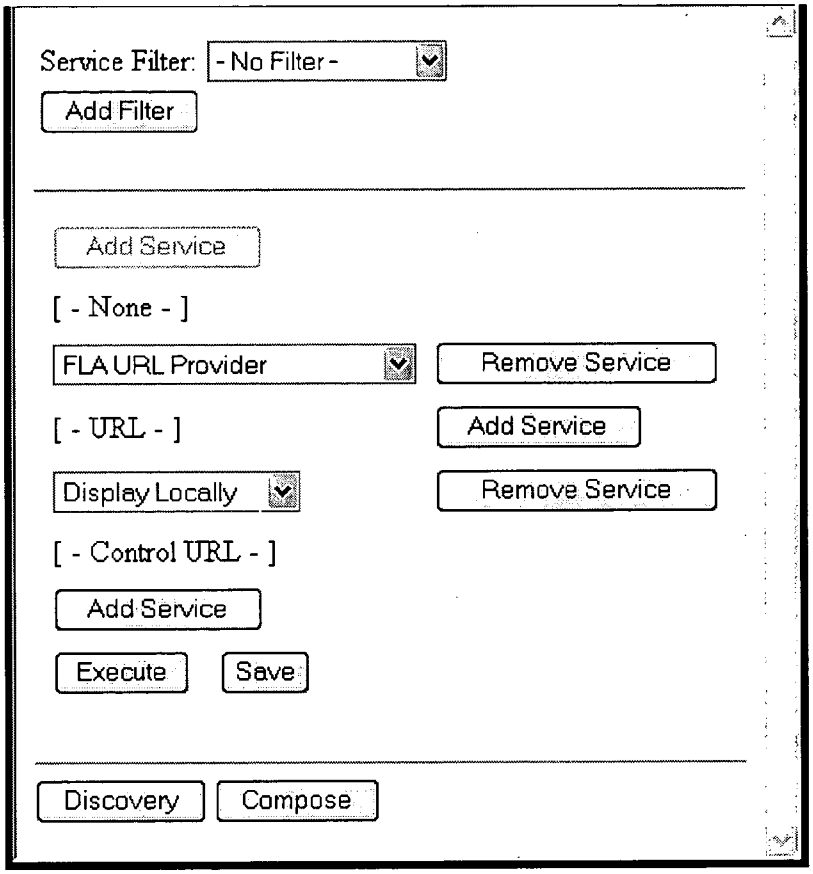
Figure 54 Construction Pane 5400

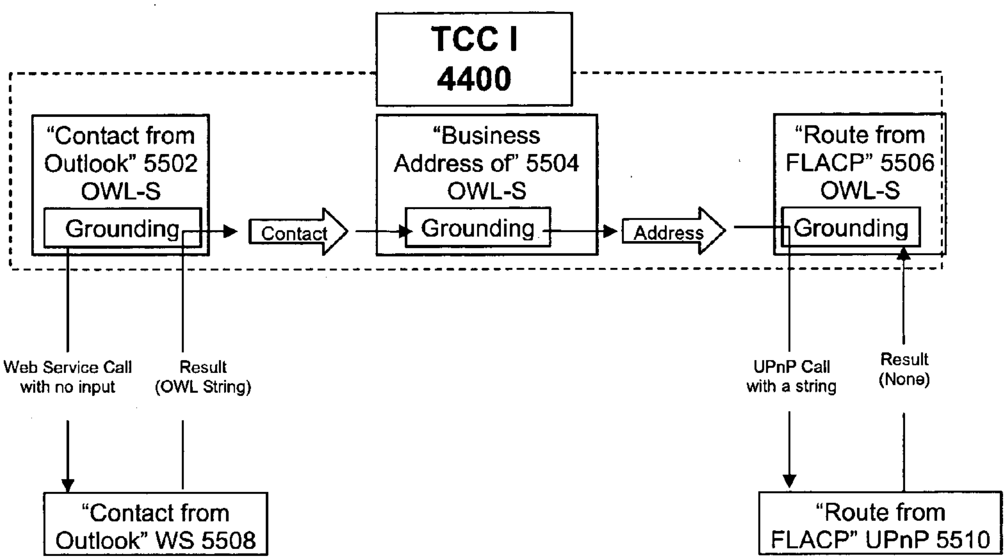
Figure 55 Task Execution in Semantic Layer and Syntactic Layer 5500

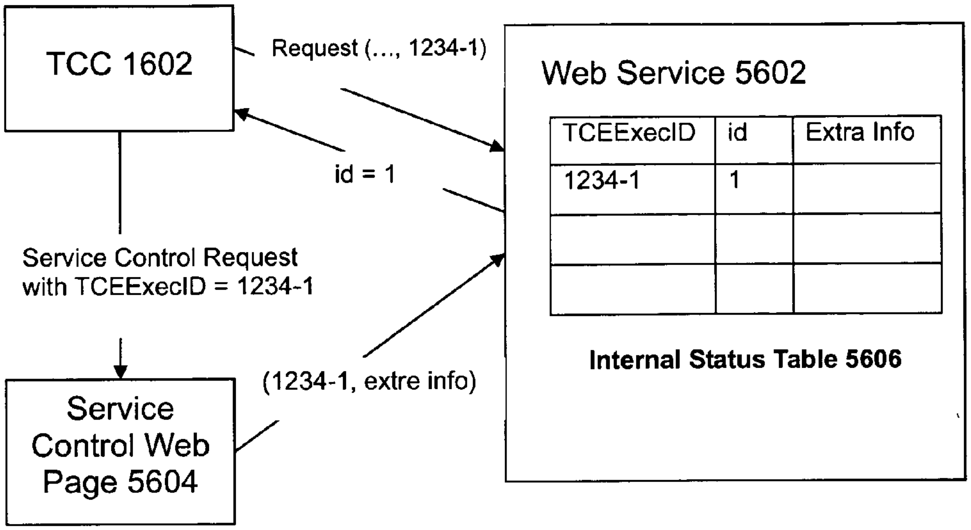
Figure 56 Invocation of Web Service with Web Server Support 5600

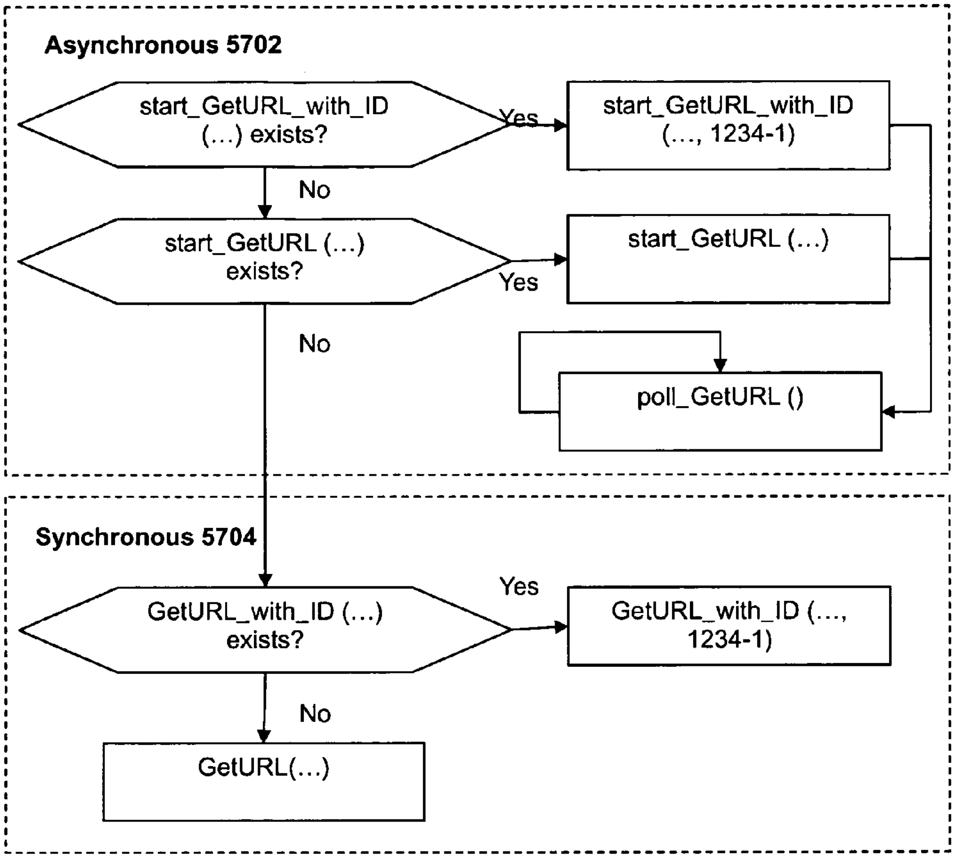
Figure 57 Service Invocation Flowchart 5700 of TCC I 4400

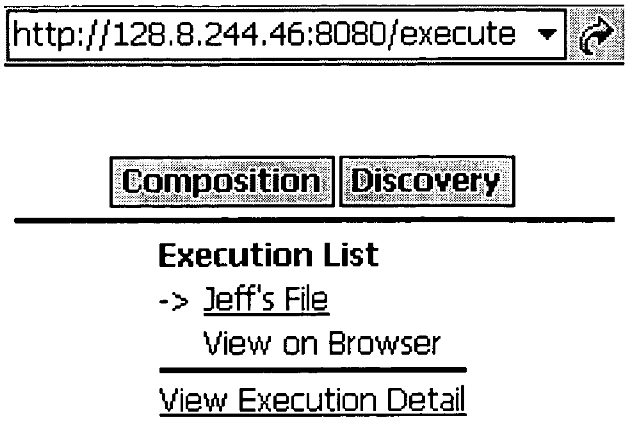
Figure 58 Web-based UI with Service Control UI (I) 5800

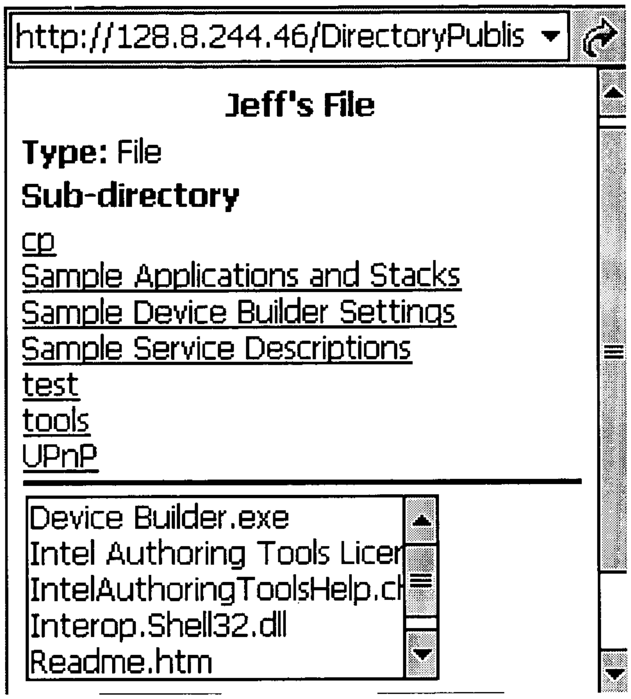
Figure 59 Web-based UI with Service Control UI (II) 5900

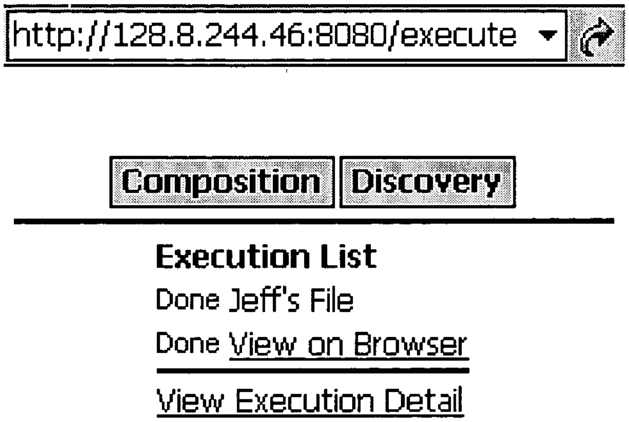
Figure 60 Web-based UI with Service Control UI (III) 6000

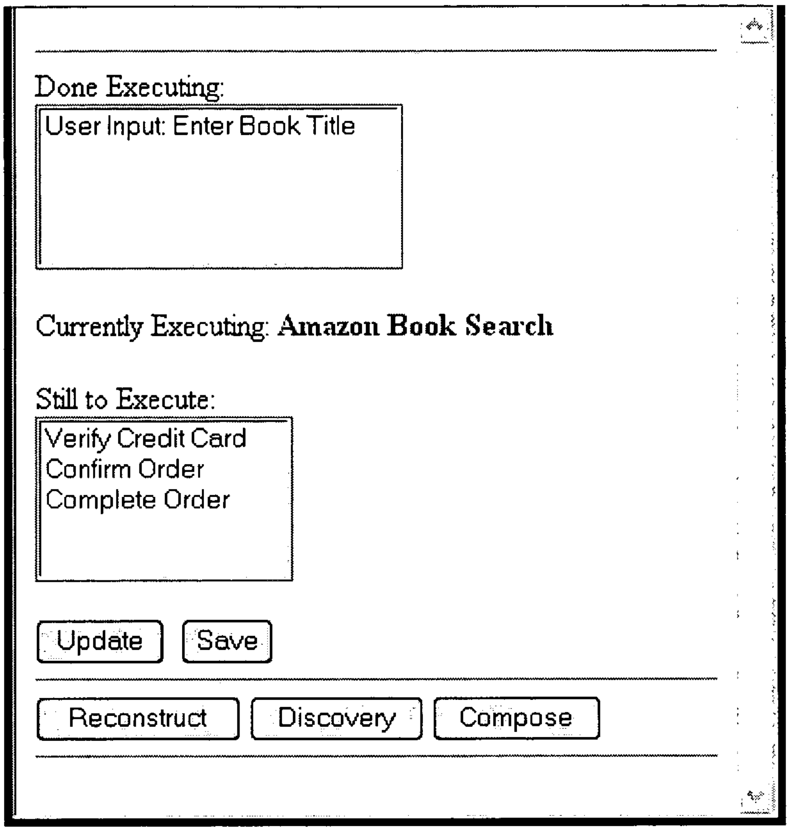
Figure 61 Monitor Pane 6100

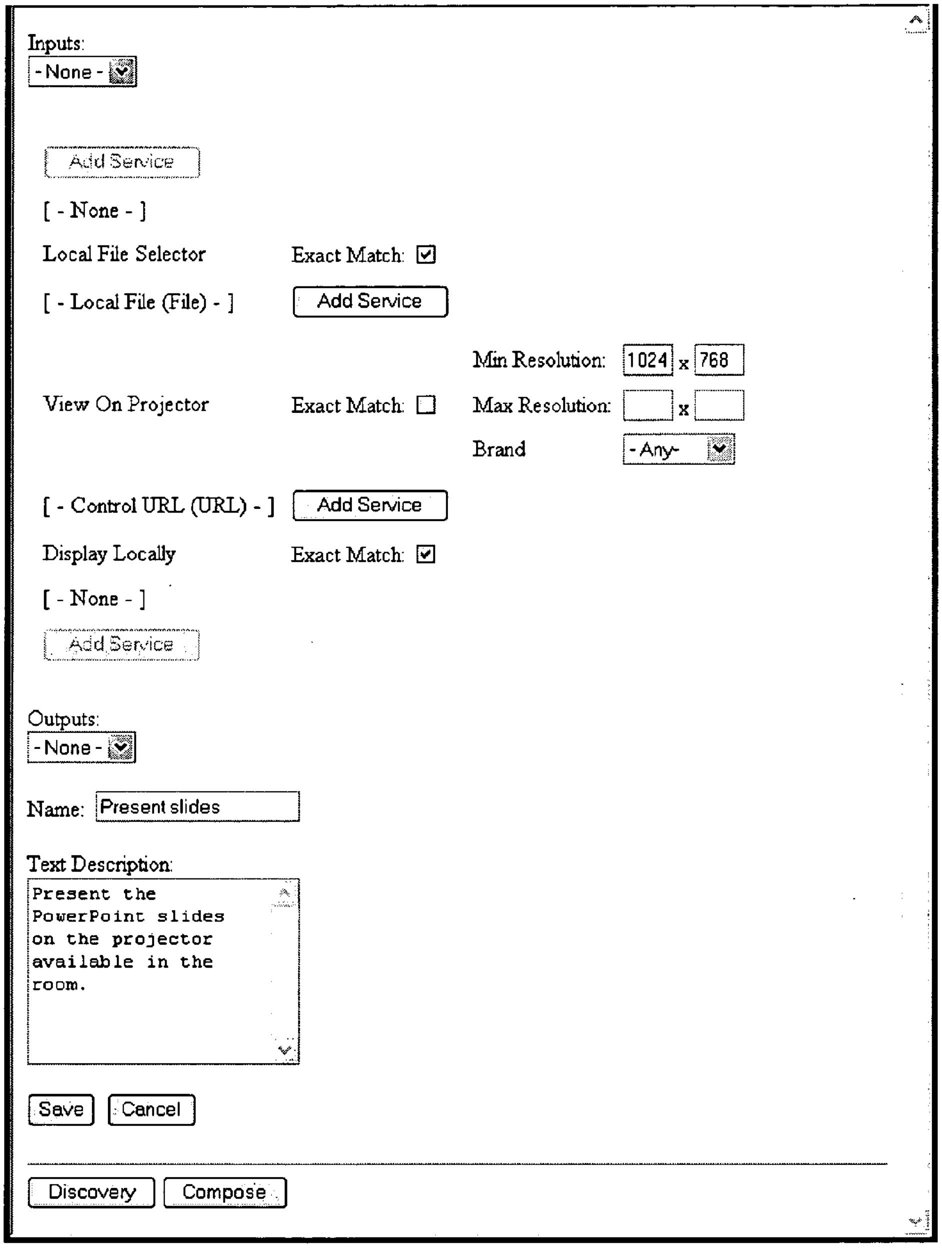
Figure 62 Save Pane 6200

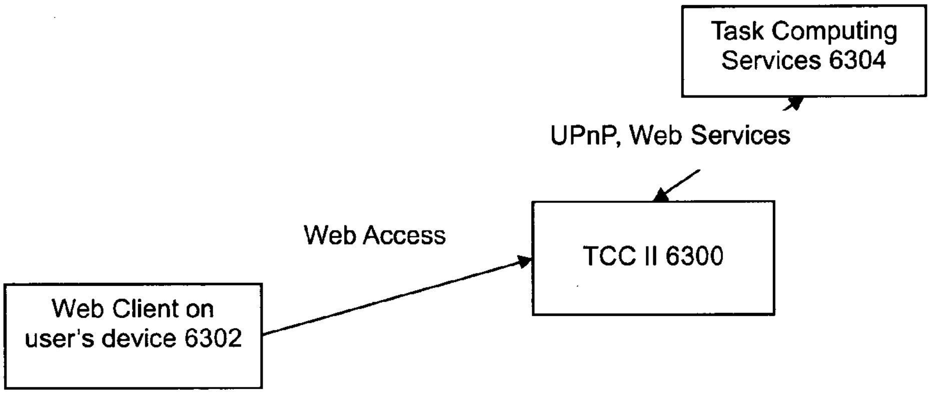
Figure 63 TCC II 6300

```
...
<!-- Profile description -->

<profile:ServiceProfile rdf:ID="ProjectorProfile">
 <service:isPresentedBy rdf:resource="#ProjectorService"/>

 <profile:serviceName encoding=”en”>
  View on Projector</profile:serviceName>
 <profile:serviceName encoding=”jp”>
  をプロジエクタで表示する</profile:serviceName>

 <profile:textDescription encoding=”en”>
  Lets you view the specified URL on the Projector
  in the conference room</profile:textDescription>
 <profile:textDescription encoding=”jp”>
  会議室のプロジエクタで指定された URL を表示し、
  コントロールする
  </profile:textDescription>

...
```

Figure 64 Multiple Natural Language Support in SSD 6400

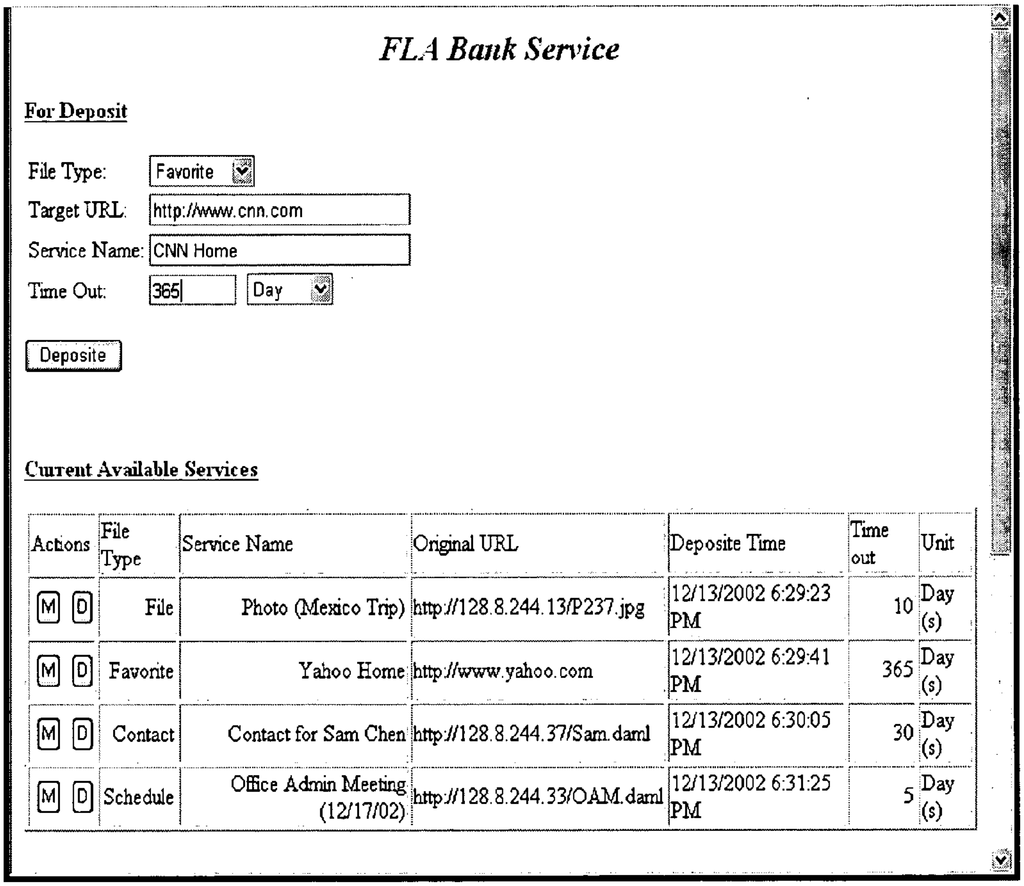

Figure 65 Bank Service 6500

FLA Bank Service

For Deposit

File Type: Favorite
Target URL: http://www.cnn.com
Service Name: CNN Home
Time Out: 365 Day

[Deposite]

Current Available Services

| Actions | File Type | Service Name | Original URL | Deposite Time | Time out | Unit |
|---------|-----------|--------------|--------------|---------------|----------|------|
| [M] [D] | File | Photo (Mexico Trip) | http://128.8.244.13/P237.jpg | 12/13/2002 6:29:23 PM | 10 | Day(s) |
| [M] [D] | Favorite | Yahoo Home | http://www.yahoo.com | 12/13/2002 6:29:41 PM | 365 | Day(s) |
| [M] [D] | Contact | Contact for Sam Chen | http://128.8.244.37/Sam.daml | 12/13/2002 6:30:05 PM | 30 | Day(s) |
| [M] [D] | Schedule | Office Admin Meeting (12/17/02) | http://128.8.244.33/OAM.daml | 12/13/2002 6:31:25 PM | 5 | Day(s) |

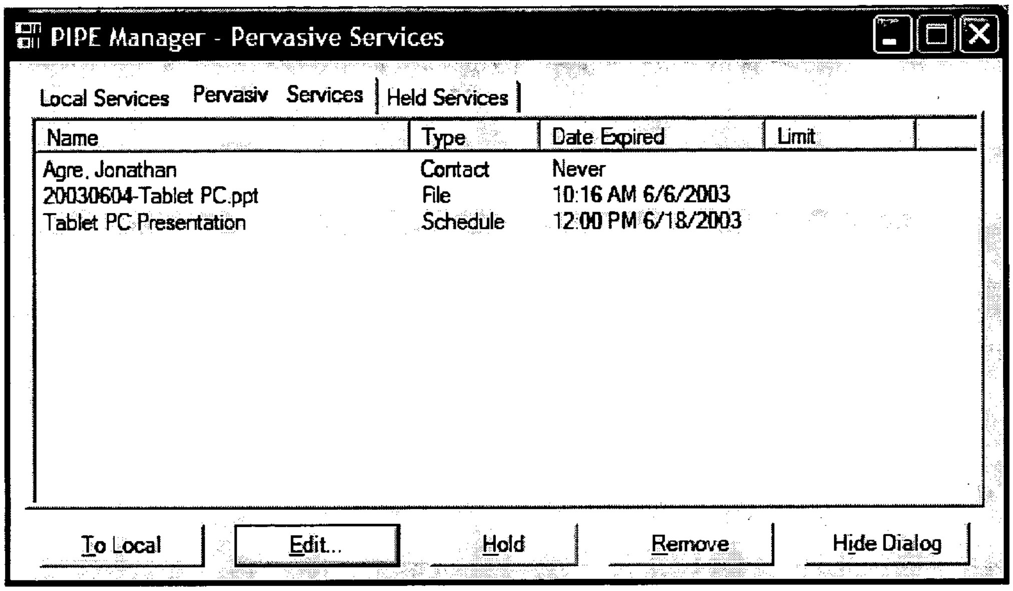
Figure 66 PIPE Manager 6600

Figure 67 White Hole Drag & Drop Interface 6700

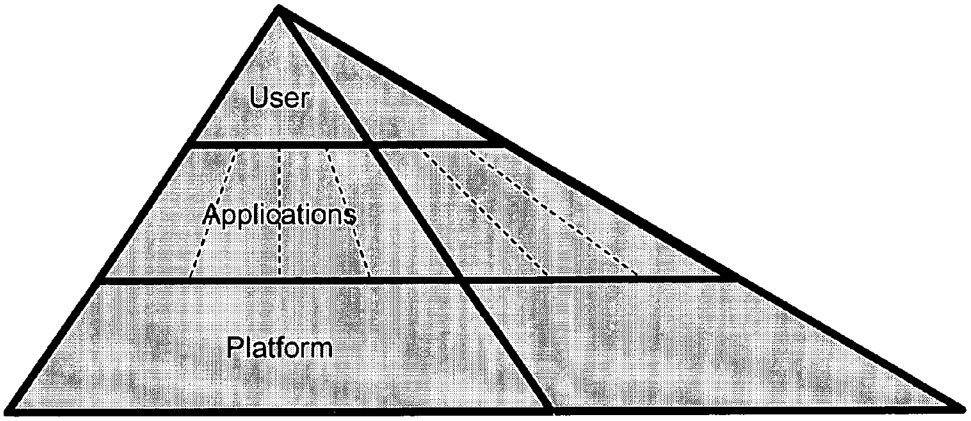
Figure 68 Capability Pyramid before Task Computing 6800

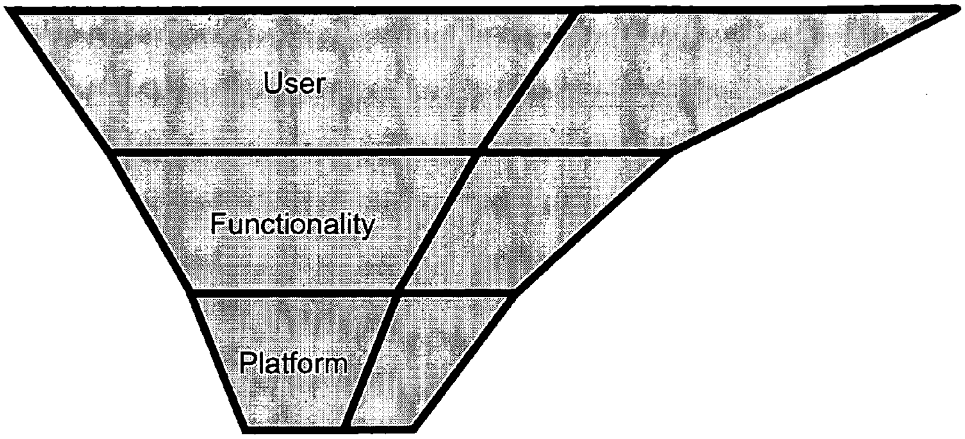
Figure 69 Inversed Capability Pyramid after Task Computing 6900

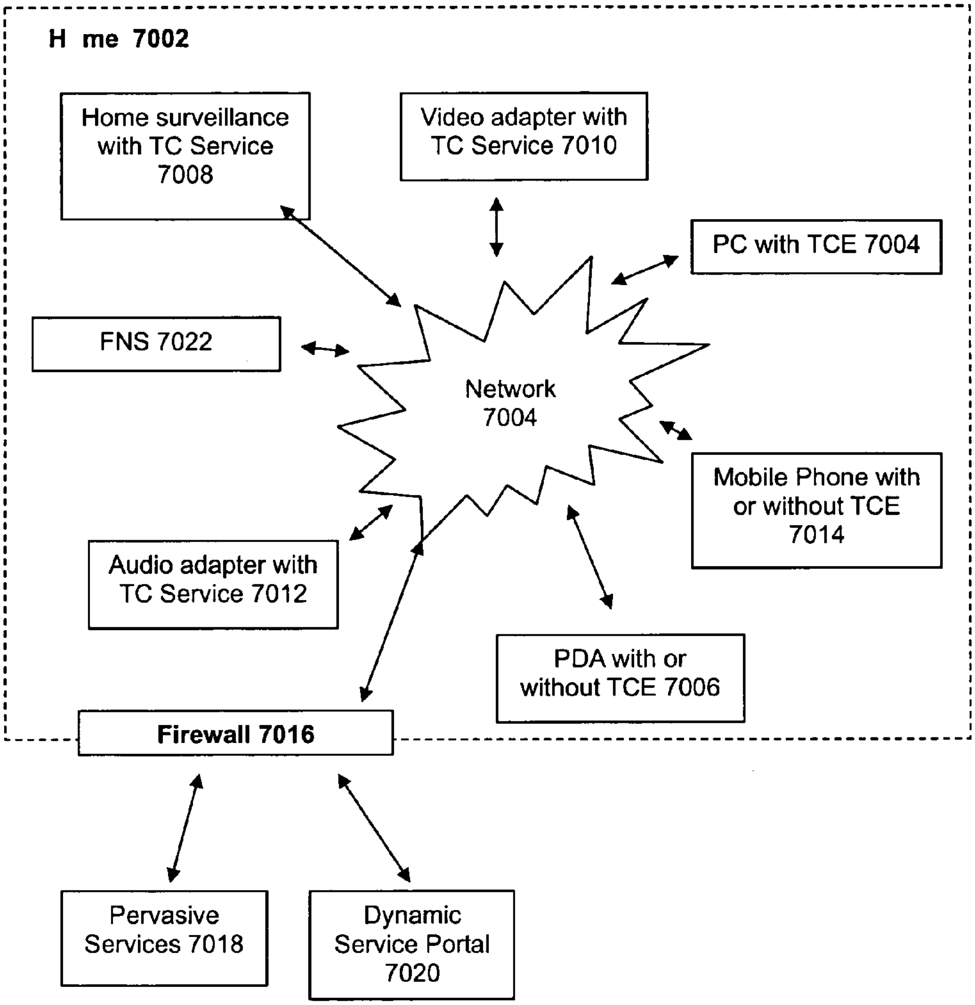
Figure 70 Application eHome 7000

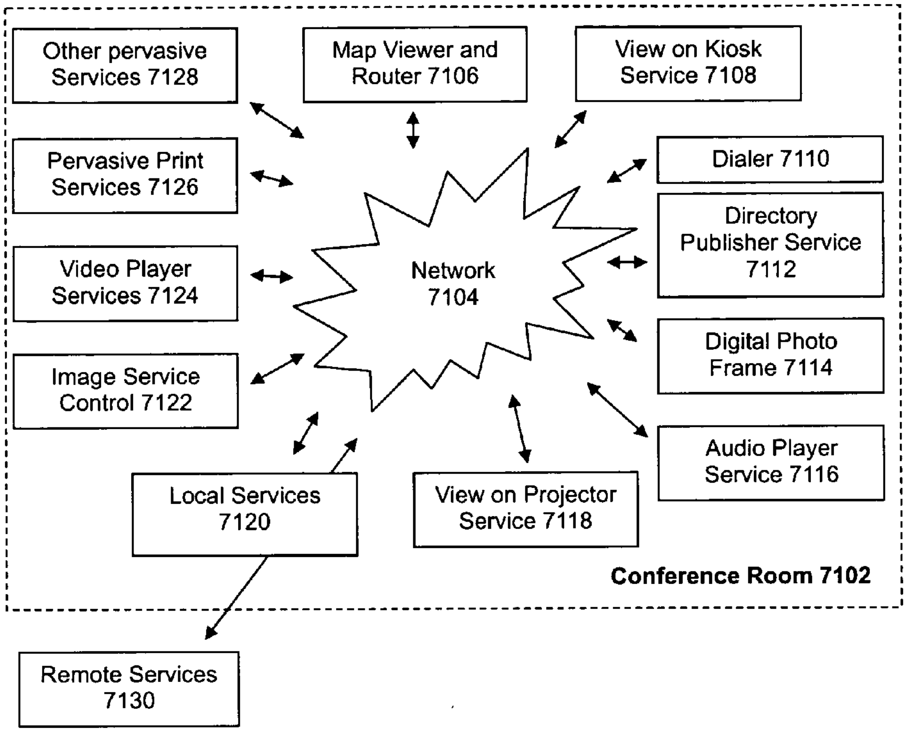
Figure 71 Application eOffice 7100

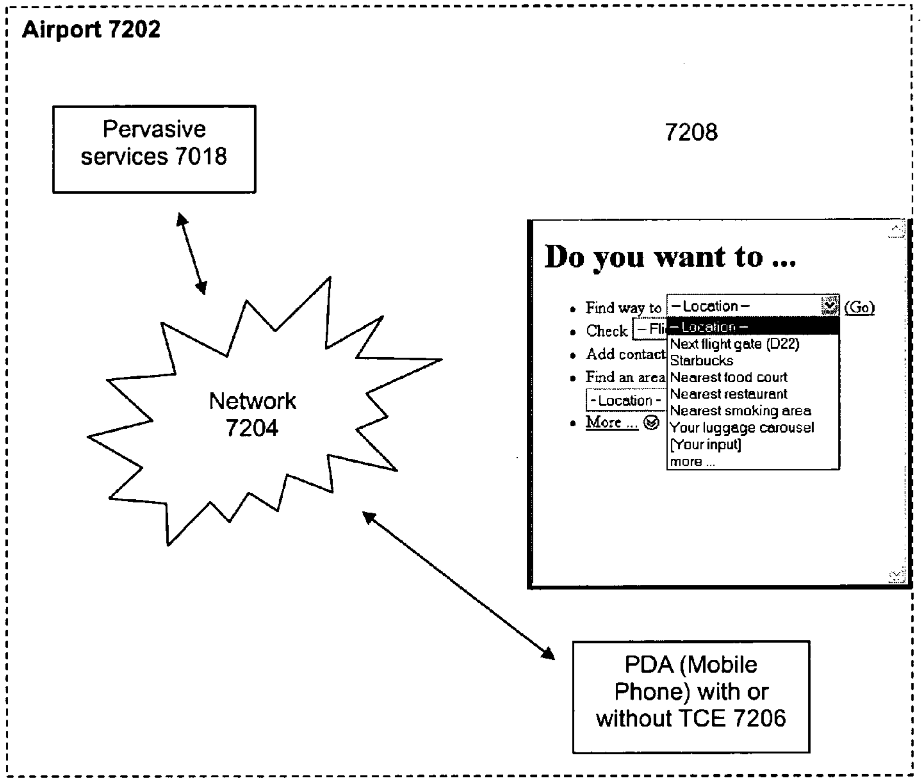
Figure 72 Application Airport 7200

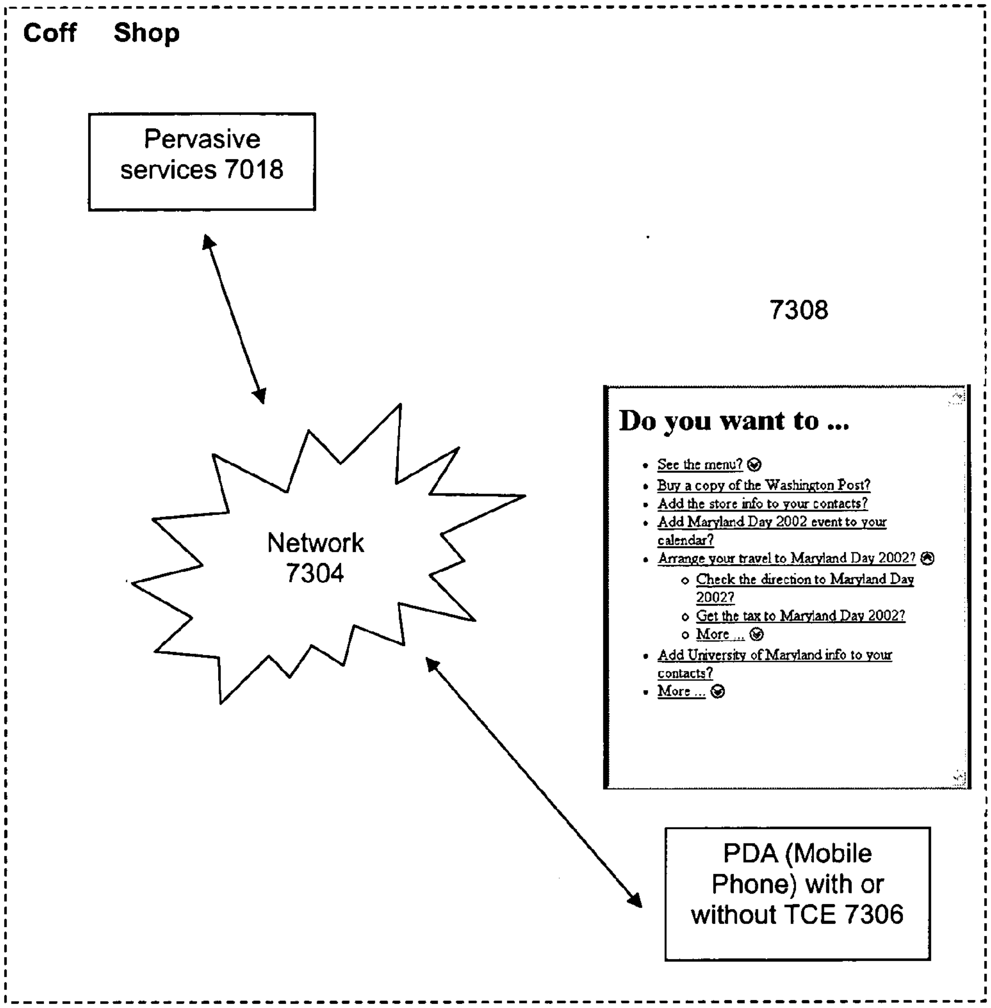
Figure 73 Application Coffee Shop 7300

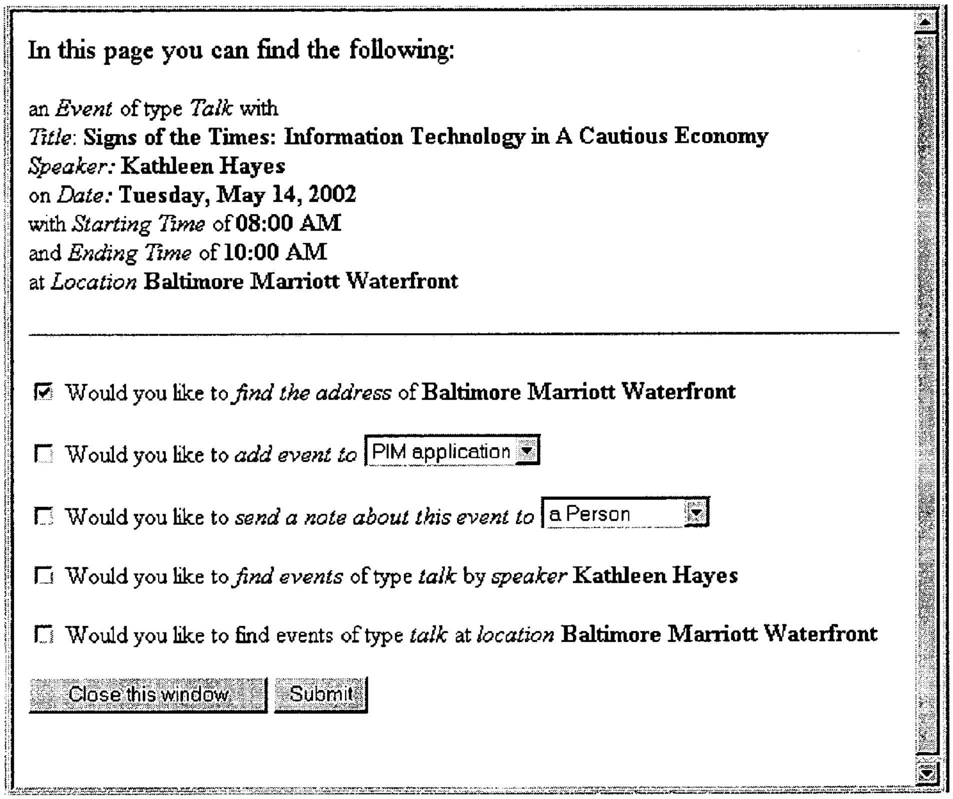
Figure 74 The TCE Identifies what is been Described at the Webpage and Suggests to the User Some Possible Actions Given the Current Content and Context 7400

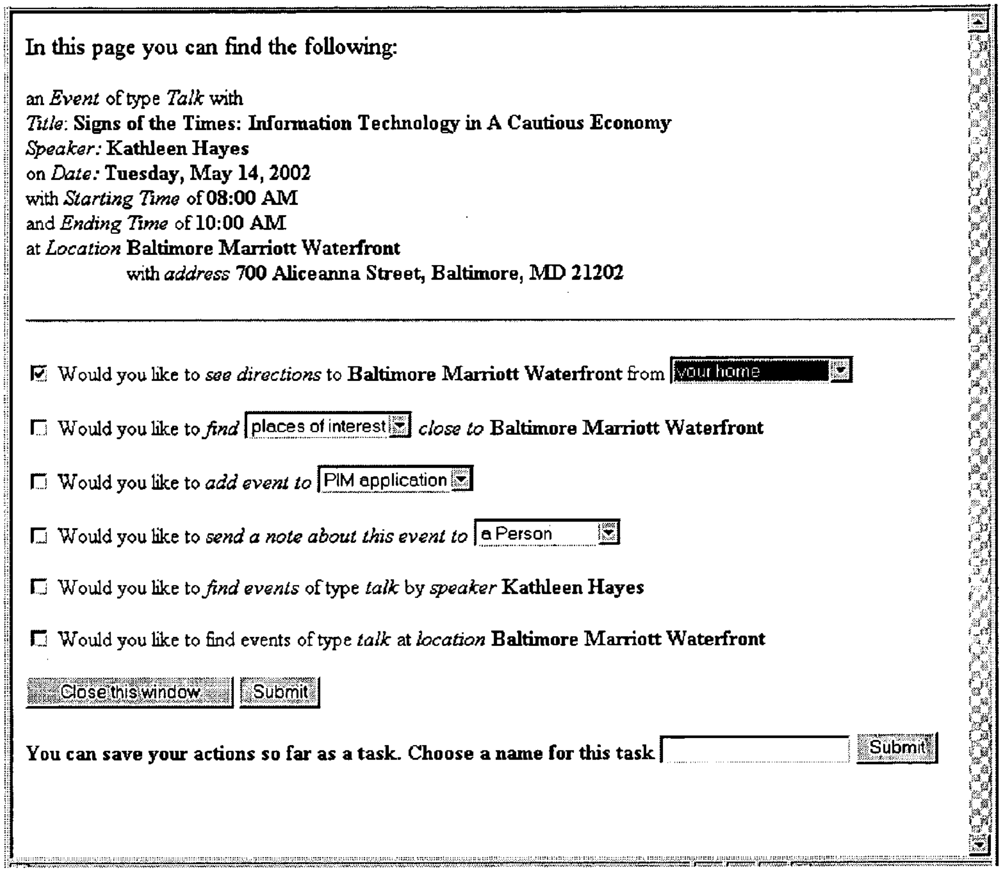
Figure 75 After the User Chose to Find the Address of the Location of the Talk First, TCE Finds the Address and Presents the User with a New List of Possible Actions 7500

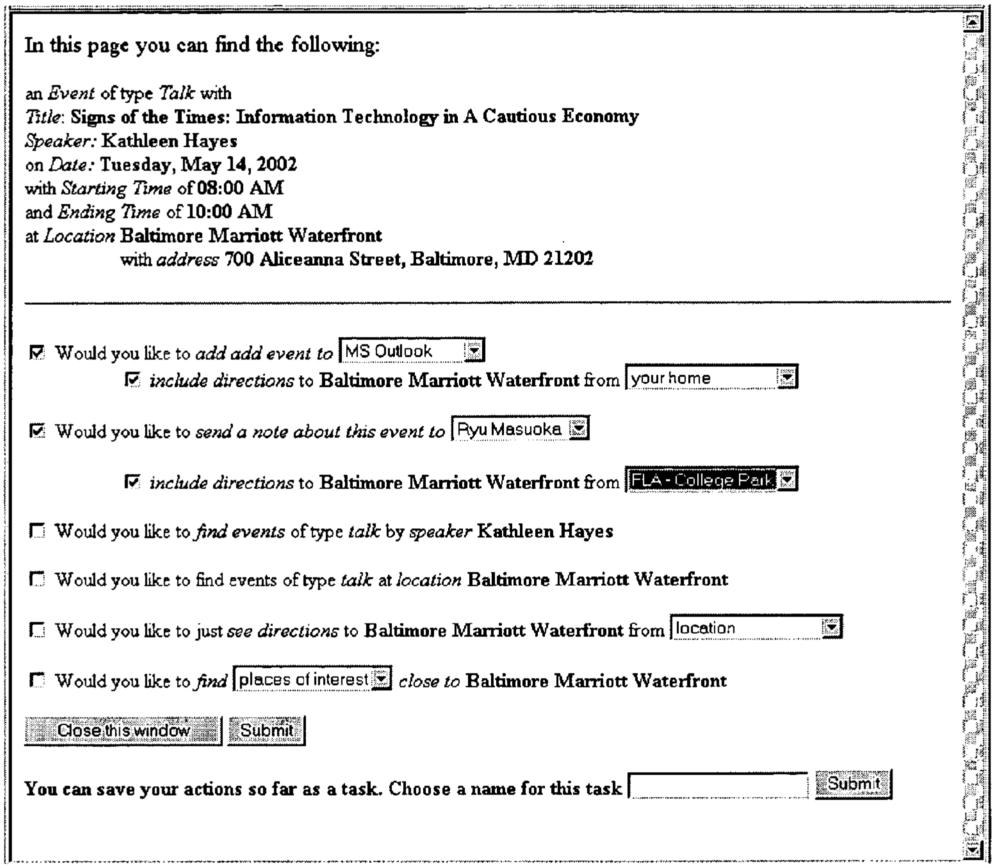
Figure 76 After the User Selected to Check the Location of the Address of the Location of the Talk on the Map, TCE Presents a Revised List of Actions with the Option to Save User's Actions up to This Point as a New Task for Future (re-)Use 7600

TASK COMPUTING

CROSS-REFERENCE TO RELATED APPLICATIONS

This application is related to, and claims the benefit of priority to, U.S. Provisional Application No. 60/434,432, filed Dec. 19, 2002 in the U.S. Patent and Trademark Office, entitled "Task Computing" by Ryusuke Masuoka and Yannis Labrou, the contents of which are incorporated herein by reference.

This application is related to, and claims the benefit of priority to, U.S. Provisional Application No. 60/501,012, filed Sep. 9, 2003 in the U.S. Patent and Trademark Office, entitled "Task Computing", by Rysusuke Masuoka, et al., the contents of which are incorporated herein by reference.

This application is related to, and claims the benefit of priority to, U.S. Provisional Application No. 60/511,741, filed Oct. 17, 2003 in the U.S. Patent and Trademark Office, entitled "Task Computing", by Ryusuke Masuoka, Yannis Labrou, and Zhexuan Song, the contents of which are incorporated herein by reference.

BACKGROUND OF THE INVENTION

1. Field of the Invention

The present invention is generally related to personal and pervasive computing, and, more particularly, to preparing and executing computing tasks.

2. Description of the Related Art

Current State of Computing: Personal Computing

Personal computing is the paradigm of a user operating a single device and accessing/using the applications that reside on that device. Personal computing requires that the user has a sufficient understanding of her computing environment and of the applications that are available on her machine, so that the knowledgeable user can adequately utilize the available resources to execute complex tasks. This is computing as most of us experience it on a daily basis; the burden of learning how to achieve complex tasks resides with the user, who has to understand each of the applications running on her machine and of the functions that they support, to manually transfer data between applications (cut & paste), to manually invoke each application and the specific functionality that relates to the task and to eventually devote her full attention (and time) to the execution of the complex task. Accomplishing complex tasks relies on the user's understanding of the task on one hand and of the available resources (devices and applications) on the other, so that the user herself can combine them into a workflow that the user will execute and the final outcome of which will be a completed task.

Early Examples of a Shift from Personal Computing

We will briefly discuss some examples, outlining the technical aspects of them and pointing to their limitations. These examples indicate a more task-oriented view of the personal computing environment In one feature of an operating system, when the user inserts a music CD into the CD tray, a window pops up suggesting to the user tasks he/she can perform from that point on. A typical listing of these options includes:

Play Audio CD
Copy Music from CD
Open folder to view files
Take no action

Each of these options also mentions the application to be used to perform the action. The focus is on the action, or task to be performed rather than the application used to perform the task.

Similarly, if a digital video camera is connected to the computer a pop window pops-up with the following possible actions for the user to perform:

Record Video
Capture Video
Perform no action

In either case, the operating system uses a pre-specified list of actions, or tasks, that is associated with the occurrence of a specific event (inserting a music CD, or connecting a digital camera), so that when the event occurs, the relevant listing of actions is presented to the user to act upon. In that sense, the system's response is hardwired and does not include flexibility beyond that which as been programmed into the system as to the possible actions to be performed as a result of the triggering event. In other words, the system shows the same set of the actions that can take place when a digital camera is connected to the computer; the programmer of the operating system has prepared this specific list of actions for the particular event. Applications can change the items in the list, but there is not an easy way for end-users to change it.

In another feature of an operating system, the user is presented with a choice of actions. That is, a separate list of tasks is presented to the user for each of the following file types: Documents, Pictures, Photo Album, Music, Music Artist, Music Album, and Videos. For example, if the file type is a picture, a list of "picture tasks" is presented:

View (pictures) as a slide show
Order prints online
Print the picture
Set the picture as background
Copy pictures to a CD This list of tasks is again pre-compiled and associated with the specific file type. There is not an easy way for end-users to modify the list. As in the other examples, the focus is on the task that can be performed and not on the application to be used for executing the task. Moreover the user does not need to know which application will be used for the task. If the user chooses to execute one of the suggested tasks, the proper application will be instantiated accordingly and invoked (launched).

In an example of office suite software, a smart tags feature is available. The smart tag feature highlights text in the current document while using an editor and offers the user a drop down menu of actions that can be performed with the object that that text denotes. For example, if the text represents a name, then this feature may identify the object associated with that name to be a person, and may offer the following list of possible actions:

Send mail (to that person)
Schedule a meeting (with that person)
Open Contact (of that person)
Create a Contact (for that person)

The options are enabled by identifying that the string of characters in the document might represent a name. The system relies on the syntactic features of the text to identify that this particular piece of text represents a name. Note, that a string of characters that does not resemble a typical American name (e.g., Lusheng Ji), may not be identified as a name related to a person. The reason is that the part of the system that identifies a piece of text as a name is a pretty simple program (script) that attempts to identify easily identifiable patterns in the syntactic form of the text. Once the "nature" of the text is identified (correctly or incorrectly), e.g., person, address, etc., a pre-compiled list of possible actions is presented to the user. It is possible for application programmers to create smart tags for other domains and applications, such as identifying addresses and invoking a map application, etc.

Another example of an attempt to present to the user a more task-oriented view of the computing environment is now discussed. When a user types an address in the search box of a search engine, the service will return (above the usual search results) a link to a mapping function that, if followed, will provide a map of the address.

However, it is not obvious that the user might be searching for the map of the typed address. Other reasonable possibilities exist: the user might want a phone number listing associated with this address, or if that address is a business, the user might want to see this business' BETTER BUSINESS BUREAU record, or to check the weather in that vicinity, and so on. In its current form, the search engine guesses what type of "thing" (in this case an address) the typed text stands for and it returns a hard-wired task associated with this type of entry.

In Summary

All the examples mentioned above exhibit similar features:

In some manner the type or nature of the user's input (text or event) is guessed; in effect the system attempts to infer the meaning (semantics) of a string, relying on its syntactic features The system makes a guess of plausible tasks that the user might wish to perform given that input; that guess is hard-wired into the system, so effectively it is not the system that makes the guess in real time, but it is the programmer of the system that made the guess when programming the system, way before the user got to interact with it.

The appropriate application, is automatically invoked upon the user's selection (whatever the user selected in the second step), instantiated with the proper input (whatever the system guessed in the first step).

Examples of the related art increase the user's convenience, but also include the following features:

The functionality has been designed into the application; the application's programmers have programmed (hard-wired) the system's response. As a result, this is not a flexible and scaleable approach because the range of possibilities has been decided during design time The system has limited ways to accommodate the user's actions and wishes, nor it can accurately "perceive" the nature (semantics or meaning) of the input. Despite the different technologies used in each of the examples, the system relies on correctly guessing the meaning of the input by its syntactic features The system employs a cause-effect (or trigger-response) mechanism, in the sense that a certain type of input results to a single action (application invocation). Complex user tasks, entail more complex workflows with complex sequences of events and actions, that would be impossible (technologically speaking) with the simplistic techniques used in these discussed examples.

In summary, during the current transitional state of personal computing, we observe attempts to speculate on the user's task by guessing the meaning of input based on its syntactic features, and invoking the right application with proper input; this approach is hardwired and brittle.

The Limitations of Personal Computing

We argue that Personal Computing exhibits substantial limitations, due to the following reasons:

As personal computing reaches the masses it is unreasonable to expect a high degree of computing experience and proficiency by the average non-expert user.

Personal computing is also problematic for the advanced user as well, because it can be time-consuming Personal computing is an inadequate framework for the emerging paradigm of pervasive computing as described in the following.

Computing environments are becoming increasingly more complex for the average user. This is due to both the complexity and proliferation of applications and devices available to the users. Although the tasks that a user can perform in a computing environment have rapidly increased the required user proficiency has also increased. To make matters worse the user base of computer users have been rapidly expanding to reach users with very little (or none at all) computing expertise. The goal of the computing industry is to make computing available to the non-expert user. This goal is in conflict with the increasing complexity of computing environments.

Even when the end-user possesses substantial expertise, taking advantage of what is possible in today's computing environment takes considerable time. This is due to the fact that effectively advanced users have become "programmers" of their personal computing environments. Consider the more complex tasks that an advanced user might perform frequently, such as deciding to attend a talk that she sees announced on a web page: the user has to find the address of the place where the talk takes place, check for conflicts with her personal calendar, find directions to the location, create an entry in a calendaring application and so on. Doing so requires cutting and pasting between applications (assuming that the user is proficient enough to know which applications to use in order to accomplish the task) and executing a carefully choreographed workflow that uses available resources to accomplish the desired complex task. To make matters worse, if the user needs to perform the same or similar task in the future, she will have to do all of that again.

Personal computing, i.e., the idea of a user owning and operating a computer that runs the user's applications and "holds" the user's data is giving way to computing environments with less well-defined boundaries. As computers get permanently connected to computer networks the distinctions between local and remote applications and data collapse, or even worse, they are confusing to computer users. Moreover, users can access and interact with devices that are not computers in the sense of personal computers but still possess significant computing power and can serve the users' goals and help them accomplish a variety of tasks (cameras, printers, smart appliances, etc.). This new computing environment, often referred to as pervasive computing environment requires a fundamentally different approach to the problem of the user accomplishing things in it. For one thing, the average user may not even be aware of what is possible or feasible in such environments, as available resources (devices and applications) may be constantly changing, and moreover the user cannot rely on the convenience of a flexible and unified user interface for managing the interaction with such an environment. In other words, the personal computing approach is infeasible in a setting replete with devices and applications that are not a priori known to the user.

SUMMARY OF THE INVENTION

Task computing is a new paradigm for how users interact with devices and services that emphasizes the tasks that users want to accomplish while using computing devices rather than how to accomplish them. Task computing fills the gap between what users want done and the service that might be available in their environments. Task computing presents substantial advantages over traditional approaches, such as the current personal computing paradigm, namely, it is more adequate for non-expert computer users, it is a time-saver for all types of users and is particularly suited for the emerging pervasive computing type of computing environments.

We discuss the requirements of a Task Computing Environment (TCE), which is a framework that support Task Computing, by providing support for:

The workflows of Task Computing

Description of tasks and services

Specification, Execution and Re-Usability of tasks by end-users (that rely on the description of tasks and services)

Manipulation including creation and removal of services by the end-users

We elaborate on Task Computing Environment (TCE) embodiments; such an embodiment, when viewed as an embodied system comprises the following:

One or more Task Computing Clients (TCC's)

One or more Semantically Described Services (SDS's)

One or more Semantic Service Discovery Mechanisms (SSDM's)

and optionally includes one or more Semantically Described Service Control Mechanisms (SDSCM's)

We present in detail two Task Computing Client embodiments, called TCC I and TCC II, embodiments of multiple Semantically Described Services and Semantically Described Service Control Mechanisms.

We conclude with detailed walkthroughs of Task Computing use cases using STEER.

The above-mentioned aspects of the present invention can be attained by a computer-based system, method, and computer-readable medium comprising a computer system executing task computing, thus enabling users to define tasks by combining available functionality and to execute such tasks.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 shows a user surrounded by devices and services.

FIG. 2 shows a first user-centered view.

FIG. 3 shows a second user-centered view.

FIG. 4 shows Tasks and Services.

FIG. 5 shows a first computer workflow variation.

FIG. 6 shows a second computer workflow variation.

FIG. 7 shows a third computer workflow variation.

FIG. 8 shows a fourth computer workflow variation.

FIG. 9 shows a fifth computer workflow variation.

FIG. 10 shows a sixth computer workflow variation.

FIG. 11 shows a composite Task Computing workflow.

FIG. 12 shows Semantic Service Instance Mapping and Grounding.

FIG. 13 shows a first method of incorporating new services.

FIG. 14 shows a second method of incorporating new services.

FIG. 15 shows end-user system development/deployment based on S-memo.

FIG. 16 shows a generic architecture of a TCE embodiment.

FIG. 17 shows a user interface full version.

FIG. 18 shows a first user interface tab version.

FIG. 19 shows a second user interface tab version.

FIG. 20 shows a third user interface tab version.

FIG. 21 shows a fourth user interface tab version.

FIG. 22 shows a fifth user interface tab version.

FIG. 23 shows a first user interface flow version.

FIG. 24 shows a second user interface flow version.

FIG. 25 shows a third user interface flow version.

FIG. 26 shows a fourth user interface flow version.

FIG. 27 shows Task Computing at the start.

FIG. 28 shows Task Computing after user selection.

FIG. 29 shows Task Computing after refreshing of left panel.

FIG. 30 shows another view of Task Computing after user selection.

FIG. 31 shows another view of Task Computing after refreshing of left panel.

FIG. 32 shows Task Computing auto-complete information.

FIG. 33 shows user selecting auto-complete in Task Computing with automatic auto-complete optional.

FIG. 34 shows a first user interface web version.

FIG. 35 shows a second user interface web version.

FIG. 36 shows a third user interface web version.

FIG. 37 shows a fourth user interface web version.

FIG. 38 shows a fifth user interface web version.

FIG. 39 shows a first user interface nested menu version.

FIG. 40 shows a second a second user interface nested menu version.

FIG. 41 shows a user interface command line version.

FIG. 42 shows a relationship between semantic instance types.

FIG. 43 shows a TCE embodiment architecture.

FIG. 44 shows a TCC I internal mechanism.

FIG. 45 shows a TCC I main logic.

FIG. 46 shows discovery and registration using IE.

FIG. 47 shows a discovery pane.

FIG. 48 shows a discovery pane with icons for the service.

FIG. 49 shows a detail pane.

FIG. 50 shows service filtering.

FIG. 51 shows a discovery pane with "search web services".

FIG. 52 shows find compositions using the IE.

FIG. 53 shows a composition pane.

FIG. 54 shows a construction pane.

FIG. 55 shows task execution in semantic layer and syntactic layer.

FIG. 56 shows invocation of web service with web service support.

FIG. 57 shows a service invocation flowchart of TCC I.

FIG. 58 shows a first web-based UI with service control UI.

FIG. 59 shows a second web-based UI with service control UI.

FIG. 60 shows a third web-based UI with service control UI.

FIG. 61 shows a monitor pane.

FIG. 62 shows a save pane.

FIG. 63 shows TCC II.

FIG. 64 shows multiple natural language support in SSD.

FIG. 65 shows a bank service.

FIG. 66 shows a PIPE manager.

FIG. 67 shows a white hole drag and drop interface.

FIG. 68 shows a Capability Pyramid before Task Computing.

FIG. 69 shows an inverted Capability Pyramid after Task Computing.

FIG. 70 shows an Application eHome.

FIG. 71 shows an Application eOffice.

FIG. 72 shows an Application Airport.

FIG. 73 shows an Application Coffee Shop.

FIG. 74 shows the TCE identifies what has been described at the web page and suggests to the user some possible actions given the current content and context.

FIG. 75 shows after the user chose to find the address of the location of the talk first, TCE finds the address and presents the user with a new list of possible actions.

FIG. 76 shows after the user selected to check the location of the address of the location of the talk on the map, TCE presents a revised list of actions with the options to save the user's actions up to this point as a new task for future (re-)use.

DETAILED DESCRIPTION OF THE PREFERRED EMBODIMENTS

In this document we discuss Task Computing and its embodiments.

Overview of Task Computing

Task Computing is aimed at assisting the user in accomplishing complex tasks using the functionality at her disposal, without prior knowledge of the environment of available such functionality and without the need to directly interact with or understand the sources of that functionality. An essential element of task computing is that the user knows and understands her task and the Task Computing Environment (TCE) understands devices and services and how to interact with them. The two of them combined, user and TCE can co-operate in accomplishing arbitrarily complex tasks.

In today's computing environments the user is surrounded by functionality that is presented to the user in the form of either devices or computer-mediated services, such as electronic services (e-services) available over the Internet, applications that run on computing devices that the user operates, or simply devices that support a specific function. Examples of such devices and e-services include phones, displays, entertainment centers, televisions, PDA's, mobile phones, audio players, fax machines, printers, weather services, map services, etc.

FIG. 1 shows examples 100 of a user 110 surrounded by devices and services. The devices and services shown in FIG. 1 include a Tablet PC, Map Service, PDAs, Fax machine, MD player, printer, entertainment center, weather service, mobile phone, contact list manager, television, camcorder, displays, and phone. The functionality presented by such devices and e-services, includes listening to music, downloading songs, watching streaming videos, listening to radios, providing contact information, checking addresses on a map, etc. All these devices and services are designed so that they make their functionality available to the user by means of the user directly interacting with (and/or operating) the device or services; for example if the user want to call a colleague with the phone provided for the room she is visiting and the phone number of the colleague is stored in the user's MICROSOFT OUTLOOK application on their laptop, the user has to start the OUTLOOK application, look-up the phone in question and then dial it manually on the phone. Even when the applications, e-services and devices can physically communicate with one another, i.e., a communication link among them exists, they can not exchange data in a way that is meaningful to the user's task, unless the designers of the respective applications, services, devices, have designed them with that specific task in mind. When faced with that plethora of devices, e-services and applications, the user can not perform tasks that utilize functionalities from all these sources, unless the devices, application and e-services have been designed for that task. Moreover, the casual user is often not unaware of what such tasks are possible.

FIG. 2 is a more technology-historical-oriented view 200 of the "user in the middle" perspective of FIG. 1. At the technical level, the functionality of the devices, e-services and applications, has become available through a variety of technology and protocol advancements, that include, but are not limited to, operating systems and applications with functionality exposed through frameworks such as MICROSOFT .NET, discovery protocols such as Jini or UPnP, web services, WLAN-enabled devices, etc.

More particularly, FIG. 2 shows the technologies and protocols have matured for the user 110 to access devices and e-services easily. As for network 202 aspect, they have evolved from standalone network, to the Internet to and wireless networks. As for devices 204 aspect, they have evolved from standalone devices to networked devices to UPnP and JINI. As for network configuration 206 aspect, they evolved from Server/Client to P2P,/Ad-hoc. As for web technology 208 aspect, they evolved from web as "the eye-ball web" for human consumption to to web services as the transactional web and the Semantic Web for machine-actionable,—readable, and understandable web. As for OS and applications 210 aspect, they evolved from object oriented to .NETand other remote object and remote procedure call technologies.

FIG. 3 shows the user surrounded by functionality, offered by devices, OS and applicatios and e-services, that is presented to her in the form of services; services are the abstraction visible to the user in the Task Computing paradigm. That is, FIG. 3 shows a user-centered view 300 of the user 110 surrounded by web 302, devices 304, and OS/Applications 306. The above-mentioned devices 204 aspect enables the service abstraction of devices 304, the above-mentioned network 202, network configuration, and web technology aspects enable the service abstraction of web 302, and the above-mentioned OS application 210 aspect enables the service abstraction of OS/Applications 306.

FIG. 4 illustrates the convergence of the ideas described in FIG. 3. Device-based services, Operating System and Applications-based services, Internet-based services, provide functionality, such as Play (Audio), Add into Outlook, Weather Info, etc., that are all presented to the user as a service abstraction and in a manner that dissociates them from the physical system that provides them, so that the user can "mix and match" them for whatever purpose she sees fit, for example to view the weather info of the address of a contact from her Outlook onto the TV set.

More particularly, FIG. 4 shows tasks and services 400. As shown in FIG. 4, the input from the web 302, devices 304, and OS/applications 306 results, respectively, in web accessible services 312, device actions 308, and OS applications 310, all of which support the accomplishment of tasks 314.

"Task Computing" is defined as computation to fill the gap between tasks (what user wants to be done), and services (functionalities that are available to the user).

A Task Computing Environment (TCE) is a framework that supports Task Computing, by providing support for:

The workflows of Task Computing

Description of tasks and services

Specification, Execution and Re-Usability of tasks by end-users (that rely on the description of tasks and services)

Manipulation including creation and removal of services by the end-users

We use the term "task" to refer to an action (or a series of actions) that a user wants to perform. In that sense, tasks are (potentially complex) actions that users conceive, which might or might not be computationally feasible in their entirety.

A task that is being carried out by a computing system (or a collection thereof) should be thought of as a computationally feasible implementation of a user's conceptualization of a task. In Task Computing, the user bears partial (or complete) responsibility for "translating" the task conceptualization (in her mind) into a computational implementation of a task. This process might be interactive and collaborative between the user and the TCE, in the sense that the user might further define or refine her initial task conceptualization into a computational task implementation.

A computational implementation of a task is a single service (an atomic service) or a set of services organized (composed) in a workflow (a composite service). So, a task can be comprised of either a single service if the task exactly matches with the service (i.e. if the service is exactly what the user wants to be done) or it can be comprised of a workflow of services. We will refer to both atomic services and composite services, simply as services.

The fact that services (atomic or composite) exist (somewhere) does not mean that they can be used by a particular user in order to accomplish tasks. In other words the availability of services alone does not enable Task Computing by itself. Such services need to be discovered, filtered according to the context and requirements of a particular user and states of the services, presented to the user in a way that the user can create tasks with them and eventually the created tasks need to be executed on the user's behalf and with the user's participation. That process (discovery, filtering, task specification, task execution) and optionally manipulation of services are the end user's view of Task Computing, in the sense that from her perspective Task Computing involves going through these steps of the Task Computing workflow. We next elaborate on the Task Computing workflows.

The Workflows of Task Computing

The Task Computing workflow describes the process (sequence of steps) that a user goes through when performing Task Computing. Although the workflow might not be necessarily manifested in its entirety in the User Interface (in the sense that not necessarily each element of the workflow is explicitly represented by an element in the User Interface) supporting this workflow and its variations, is a necessary element of any TCE.

A Task Computing Workflow includes the following functions:

Discovery of devices and offered services (either by said devices or broader network/Internet) by the user's TCE. Discovery refers both to finding out that services exist and how to access them. For Task Computing purposes, discovery includes discovery of the descriptions associated with said services, their usages and states. Except for devices and services, discovery might include items such as tasks, either previously defined by the current user or by other users. A variety of discovery mechanisms are discussed later but it should be noted that an explicit user-driven search is also a mode of discovery.

Flit ring of said discovered devices and services, based on the user's context. The purpose of filtering is to reduce a potentially unwieldy number of discovered services to a manageable subset that is more relevant to the user's context and current situations (using a variety of potentially user-selectable criteria) and/or the task that the user attempts to accomplish. A variety of filtering mechanisms and/or criteria are discussed later but it should be noted that an explicit user-driven filtering (which could include a search against a list of already discovered services) is a mode of filtering.

Task Specification, during which the user who knows and understands the task she wants to accomplish, composes the task by connecting together the available (filtered) services (and tasks). This task specification can be accomplished in a variety of ways (preferably using a graphical user interface, GUI). There is no unique UI for accomplishing the said step of the Task Computing workflow, although we will present some examples later on.

A user can also save a specified task for future use.

Task Execution of a specified task, during which the user only interacts with the execution of the task in order to provide necessary input for the proper execution of the involved sub-tasks of services and to monitor the execution the task, but all the lower-level invocation and interaction with the affected devices and systems is left to the computing system that supports the task computing framework.

It should be noted that Discovery>Filtering>Task Specification>Task Execution prescribes a general workflow for task computing; its elements are intended to describe the user's Task Computing experience while using a Task Computing Environment. From a TCE's perspective, considering the TCE as a computing system that "delivers" Task Computing, the four constituents of a Task Computing workflow, constitute the basic functions that the TCE ought to support and their inter-relationships.

Additional elements might be introduced in the Task Computing workflow. Also, some of these elements might be eliminated from a User Interface perspective, although most likely such a step might still take place in the background, within the TCE. For example, a user might select to skip the Task Specification phase, because the output of the Filtering phase might be presented to the user in a way that it matches a user task without further elaboration needed by the user. Or, a user might skip filtering because the discovered services (and tasks) are too few, or a previously compiled repository of tasks and services is used and no further filtering is necessary. Typically Task Execution can not be omitted as a step of a Task Computing workflow, as it denotes the final outcome of a Task Computing user experience.

In FIGS. 5-11 we present diagrams of the basic Task Computing Workflow and its variations.

In the Task Computing Workflow Variation (I) 500 shown in FIG. 5, service or task discovery 510 is executed, then service or task filtering 512 is executed, followed by task specification 514, and then by task execution 516.

In the Task Computing Workflow Variation (II) 600 shown in FIG. 6, service or task discovery 510 is executed, then service or task filtering 512 is executed, followed by task specification 514, and then by task execution 516. At the completion of task specification 514, control may return to service or task discovery 510.

In the Task Computing Workflow Variation (III) 700 shown in FIG. 7, service or task discovery 510 is executed, then service or task filtering 512 is executed, followed by task specification 514, and then by task execution 516. At the completion of task specification 514, control may return to task filtering 512.

In the Task Computing Workflow Variation (IV) 800 shown in FIG. 8, service or task discovery 510 is executed, then service or task filtering 512 is executed, followed by task specification 514, and then by task execution 516. At the completion of task execution 516, control may return to service or task specification 510.

In the Task Computing Workflow Variation (V) 900 shown in FIG. 9, service or task discovery 510 is executed, then service or task filtering 512 is executed, followed by task specification 514, and then by task execution 516. At the completion of task execution 516, control may return to task filtering 512.

In the Task Computing Workflow Variation (VI) 1000 shown in FIG. 10, service or task discovery 510 is executed, then service or task filtering 512 is executed, followed by task specification 514, and then by task execution 516. At the completion of task execution 516, control may return to task specification 514.

In the Composite Task Computing Workflow 1100 shown in FIG. 11, service or task discovery 510 is executed, then service or task filtering 512 is executed, followed by task specification 514, and then by task execution 516. The Composition Task Computing Workflow shows that at the completion of each function subsequent to service or task discovery 510 (that is, at the completion of service or task filtering 512, task specification 514, or task execution 516), control may return to any prior function.

Two major classes of variations exist that involve iterations from each of the Task Specification and Task Execution phases to prior steps of the workflow. The rational for these variations rests with the user-driven nature of Task Computing. During the Task Specification stage the user might decide that she needs to refine or modify her task and an additional Discovery→Filtering, or just Filtering phase might be required for the user to discover additional potentially helpful services, or to broaden to narrow the output of the Filtering stage (by modifying the filtering criteria). Similarly, during execution, a failure (or some other exception) due to network problems, service failure, or some other difficulty in executing a sub-task of a specified task, might require that the user seeks an alternative/substitute service (through further Discovery and/or or Filtering) or even a modification of the task itself. A Task Computing Environment should allow for multiple such iterations and/or "mixing" of such workflows; for example, the user might go from Task Execution→Filtering→Task Specification, as suggested in one workflow and then from Task Specification→Discovery→Filtering→Task Specification→Task Execution, as suggested in another workflows. We could have illustrated the above by simply allowing multiple iterations from each of Filtering, Task Specification, and Task Execution to any prior stage, but we felt that the illustration we used (and the additional comments) better denote the rational behind each of the workflow classes.

We provide next some additional comments about each of the constituent components of the Task Computing Workflows. A Task Computing Environment may manifest itself to the user in the form of an integrated UI with different panes that represent each (or multiple) steps of the Task Computing Workflows. In addition, pop-up windows may appear on demand, presenting additional information to the end user or in order to assist the user with providing necessary input. Furthermore the form of the UI might differ depending on the type of client device (e.g., PDA vs. a desktop or laptop computer) and/or the nature of the user's context (e.g., pervasive computing environment vs. web browsing.) There can be interfaces by voice, Braille, tactile, etc. Voice interface would be especially useful for mobile phone and in-car applications.

Discovery

Discovery involves finding the services that can be consumed/used by the TCE. Discovery includes identifying programmatic interfaces for interacting with these services and descriptions of such services, including their input and output parameters, details on the functions they perform, the conditions for using them, their effects, and so on.

There are a variety of service discovery mechanisms. A TCE might implement multiple service discovery mechanisms and any single service might be discoverable through multiple service discovery mechanisms. In general, there is no preferred discovery mechanism for a given service but there are mechanisms that might be more efficient or easier to implement, depending on the location of the service and/or its description.

Discovery might take place in a variety of modes. We distinguish between an active discovery mode, a passive discovery mode and a hybrid discovery mode.

Discovery is closely related to finding the functional aspects of contexts (or situations) where the computing device, therefore its owner, is in. Discovery finds the set of functionalities the context offers. In that sense, each discovery mechanism represents a certain context (or a set of contexts). For example, a local service discovery mechanism represents the context of the computing device itself, giving the functionalities available on it. The UPnP discovery mechanism represents the context of the sub-network the computing device is in. A discovery mechanism by Web Services can be set up on the Internet for a certain community with which the owner of the computing device has a membership. Bluetooth and InfraRed (IR) communications have limited ranges compared to the wireless LAN technology. But the discovery mechanisms accompanying Bluetooth and IR are not necessarily inferior to those accompanying wireless LAN (such as UPnP). Because of their limited ranges, they give better localization of the computing device and its owner, leading to better determination of the functionalities the discovery mechanisms have to offer.

Active Service Discovery Mechanisms

The TCE queries some facility (a computer system, or a network thereof), such as a broker, a facilitator, a directory (such as UDDI server), a yellow pages-like service, a Service Discovery System-(UPnP, Bluetooth SDP, InfraRed (IR), Jini, Rendezvous, Salutation)-implementing network node, or some search engine for services for a listing of services. That query might be a request for a complete listing of available (known) services by that computing system, or some narrower search query submitted to that system. Such a request might be made to a peer network (instead of a single computer system) like the file-sharing peer networks. A peer network might be a broad one (such as the aforementioned systems) or more localized ones, such as TCE's peers in the same subnet as the current user. Such a query might be either pre-specified or dynamically created, by either the TCE itself (and/or one of its components) or by the user, or through a collaboration between the user and the TCE. This search might be based on keywords (provided by the user) or it might be driven by a machine-level understanding of a user's context and task. Any of the above types of search might be also thought of as an "Interactive/User-assisted discovery". The query might also be determined in real-time while the user is in the process of performing discovery or some other step of the Task Computing workflow. For example, as the user attempts to specify a task, the TCE might infer that the user might be interested in having some additional (not yet discovered) service or task available for her current task, and without the user explicitly requesting so, it might attempt to discover such a service or task (alternatively, the user might explicitly perform such additional discovery herself). The latter is an important feature of a TCE; a TCE might proactively perform discovery given a user's dynamically changing context.

An additional type of active discovery might include a look-up or a query against a previously compiled listing of available devices, services and tasks, stored locally (on a user's client device) or on another peer device that is accessible by the user's client device (e.g., a friend's PDA using an infrared communication link); this local store might be used regardless of whether the user is online (connected to a network) or offline, or even in combination with other modes of discovery.

Passive Service Discovery Mechanisms

Passive discovery typically involves some service discovery system, such as UPnP, Bluetooth SDP, Jini, Rendezvous, Salutation, etc. In such a case the TCE is equipped with the ability to understand and process the protocols and mechanisms of the discovery system (the TCE might be enabled for multiple such systems); as a result the TCE can discover services by virtue of being connected (or having access) to a network where services that implement one (or more) of these systems might broadcast (or multicast) their presence and availability to other devices on the same network or sub-net, or even across networks. In a variation of this type of discovery, proxies that can discover devices, services and tasks using any of the aforementioned protocols might be accessible by a TCE (for querying), or might automatically update the TCE regarding the availability of said devices, tasks and services.

Hybrid Service Discovery Mechanisms

A hybrid discovery mode is also possible; such a mode might include both the active and passive methods. An example is to use a web service as a discovery mechanism. The discovery procedure includes two steps. In the first step, TCC registers a callback interface (for example, a WSDL URL) to a registry. Whenever a change happens (a new service, a service removed, etc.), the registry calls the given callback interface to inform TCC about the change. The second step is optional. Though the callback mechanism is quite efficient in the use of network bandwidth, it has some drawbacks. For instance, it can not be used if TCC is behind a firewall and the callback interface is inaccessible from the registry. The second step is designed for that purpose. TCC polls the registry in a given interval or whenever necessary. And the registry returns all changes after the last polling or all available services. Note that the second step can be treated as an independent discovery mechanism, and in that situation, the mechanism should be categorized as an active method.

Filtering

At any given time, not all discovered services are relevant to the user for Task Computing purposes. The purpose of the filtering phase of the Task Computing workflow is to narrow the discovered services to those that fit the user's current context. On occasion, the output of this filtering might not further narrow the output of discovery. This filtering ought to be dynamic in the sense that as the user's context changes the output of the filtering should be dynamically updated (on occasion, upon the user's explicit request).

We use the term "user's context" broadly to refer to the various criteria that may be used in order to select (filter) a subset of services from the output of discovery. Such criteria might include any of the following or a combination there of:

- User profile
- Task at hand
- User device characteristics
- User location
- User motion status
- User network connectivity
- User specified keywords (similar to a search query)
- Features of a set of services when considered as a whole, such as
  - Number of services
  - Similarity between the services
  - Output of the application of mathematical or logical formulas on service-related values for the purpose of expressing any constraint or criteria that the user deems relevant. Examples of this kind includes total resources needed to execute all the services in the set, such as total fee or total time.
- Individual service features, such as
  - Cost of using/accessing the service such as fee and time
  - Provider of the service
  - Reputation of the service,
  - Input and output parameters and their values including the application of mathematical or logical formulas on such values for the purpose of expressing any constraint or criteria that the user deems relevant
- Etc.

A user might save contexts (a context being an application of one or more filtering criteria) so that she can refer to them by name and automatically invoke them by name. Although filtering might be handled automatically by the TCE, the user might explicitly drive the filtering process by entering keywords, or selecting from a variety of criteria. It is also possible that the TCE's proactive filtering and the user driven filtering might occur concurrently and/or iteratively.

Task Specification

Task specification is the process during which the end user "translates" a task into a service (either an atomic service or a composite service). For that purpose, the user utilizes the services that are the output of the filtering process. This user-driven process can be thought of as one of specifying a workflow of services that when executed will accomplish the user's task. A service composition is the output of task specification; the task specification is a process during which the user (alone, or while collaborating with the TCE), browses through filtered services attempting to create a service composition that matches the task in the user's mind. Occasionally we might refer to task specification as task composition.

Task[R. M.3] specification relies on the input, output and other requirements of available services, in order to only present to the user feasible possible compositions. Such requirements include the types and/or values of input/output parameters, conditions for using, accessing, invoking a service, effects that the service might have if invoked, etc. The outcome of a task specification is a sequence involving multiple services (in the general case it is a directed acyclic graph) which is valid and that can be executed in its entirety. On occasion, the sequence might only be one service long, in the case that a user decides that an existing service or task matches the task that the user has in mind.

In specifying a task the user is aided by a user interface which attempts to present to the user the available services in a way that (a) assists the user in creating service compositions that can be executed correctly and (b) helps the user identify services most relevant to her task. This presentation ought to be dynamic in the sense that as the user's context, or even, as the user selects a different service (in a task specification) the available and relevant services should be updated. There are a variety of ways that the TCE can assist the user with respect to these goals. For example, the TCE can present services in pair-wise listings depending on the matching or perhaps partial matching, of output and input between services in the same pair; typically (but not exclusively), such matching relies on the semantics of the services and of their input and output parameters. Instead of using listings, the TCE might highlight services that can precede (or follow) a user-highlighted (or selected) service; again, for doing so, the TCE relies on the semantics of the services and of their input and output. Alternatively, the TCE might present the filtered services, in a hierarchy organized by either the type of service or of the type or value of any input or output parameter, or of some other service feature (location, fee, newness, prioritization, preconditions, effects, etc.). In general any or all of the criteria or means that can be used to filter services (per the discussion of the filtering stage) can be used to guide the presentation of services during the task specification process; such criteria or means can be used to organize the filtered services in a way that will make it easier for the user to select and match services for the purpose of fulfilling a task.

The ways that services can be composed in a workflow, generally will depend on the services' properties, such as their semantics. Specifically, parameters taken into account in order to decide how services can be composed, include any or all of the following: the data types of their data inputs and outputs, the semantic types of their data inputs and outputs, the conditions that have to be satisfied prior to executing the service and the effects of the successful execution of the service. Feasible and possible task specifications might be further restricted by domain-specific logic (for example, if a service prints documents, the domain of the service includes printers, printing and documents), or application logic, or business logic, or task logic (generally expressed in the form of statements in some logic). The aforementioned logic might describe additional restrictions to be observed while specifying a task from a collection of services. Such restrictions might include whether a service can be used more than once in the same task specification, or whether two services can be used together in a composition, etc.

We will refer to the parameters taken into account in order to decide the ways that services can be composed, as the composition logic.

One simple example of composition logic, that takes into account the semantics of the services, is one that matches the semantic output of a service to the semantic input of another service. If the semantic output of the first service matches the semantic input of the second service then there exists a partial workflow where the first service is followed by the second service. Thanks to the semantics, such a matching need not be exact, meaning that the matching between semantic types of input and output parameters might be inexat (for example, the matching based on semantic proximity), or that matching might take into account the relative positions of parameters into the relevant ontological hierarchies.

It is important to note that the user can save such compositions and give the names (for the task that they stand) for future use (like macros in applications). Such pre-compiled task specifications can also be saved and used as bookmarks in the user's TCE client. Users may choose to share such task specifications. As mentioned earlier, for task specification purposes, such previously defined macros, as just new services.

Another mode of task specification might not be user-driven but TCE-driven. In that case the TCE given the available services from the output of the filtering stage might suggest service compositions, or partial service compositions, that could be presented to the user for approval. Such compositions might or might not be eventually executed (see discussion of Task Execution next). The TCE might use any of the criteria or means that the user might use for creating service compositions, as discussed previously in this section.

Task Execution

Task execution is the step of executing a specified task. The input to Task Execution is typically the output of the Task Specification phase, which is a service. That service is either a composite service that was specified by the user during Task Specification, or an atomic service that corresponds to the user's task. The TCE is responsible for the execution, not the user, although the user might be required to provide supplemental input during the execution of the service composition or to act in order to manage failure or exception during this execution. For that reason Task Execution may be also thought of as a User-Monitored Task Execution, in the sense that it might not necessarily take place with the user in a passive role, waiting for the output of the executed composition, but she might have to provide input, select an alternative course in case of failure, cancel execution and go back to a discovery, filtering or task specification, etc.

Task execution entails passing proper input to services (while handling the necessary translations between systems and protocols in a way that is transparent to the end-user), requesting user input when necessary and carrying out all the actions involved with the composed task. These tasks present challenges due to the fact that a specified task has been specified using semantic information about the services it invokes and the input and output parameters of such services but on the other hand that semantic information is not what is used for the execution of the task. In other words, the service composition is an abstraction that by itself is not a piece of executable code. The TCE is responsible for translating the service composition to a series of actions and calls that can be directly used to execute the services involved in the task. A second source of challenges arises from the fact that just because a service composition is feasible (one of the goals that the TCE attempts to satisfy during the Task Specification stage) it does not mean that it will be executed correctly. Potential problems include erroneous semantic information about the constituent services, failures of the systems on which such services are actually running, network-related problems, etc.

So the TCE during Task Execution ought to handle grounding, i.e., binding the service in the task specification abstraction to the actual underlying service and its parameters, properly translating semantic terms (for input and output) to the actual syntactic terms that the service uses, or, translating between semantic objects that reference different ontologies.

One of the main technical challenges in Task Computing has to do with the fact that services are defined in semantic layer, so are the input/output parameters of the services. However, when we invoke services, we must provide the syntactic parameters to the services because services are implemented in syntactic layer. Grounding is a procedure to transform a semantic instance into a syntactic instance.

The benefit of splitting the semantic layer and the syntactic layer is as follows. In some cases, although several services have the same semantic input, due to their implementation details, the syntactic instance could be different. We can group those services in semantic level without worrying about such differences.

FIG. 12 shows an example of semantic service instance mapping and grounding 1200. Suppose we have a "Semantic Contact Instance" 1202 and three services. "Weather info of" is a service 1204 that returns the current weather condition of a given address; "Aerial photo of" is a service 1206 that shows the satellite picture of a given address; and "Route from FLACP" is a service 1208 that displays the turn-by-turn directory from Fujitsu Laboratories of America, College Park to a given address. Semantically, all three services accept address as an input, but in real-life implementation, "Weather info of" 1204 accepts a zip code as a string; "Aerial photo of" 1206 accepts street, city, state and zip as four strings; and "Route from FLACP" 1208 accepts street, city, state and zip as one string.

If we do not split the semantic layer and the syntactic layer, three services are totally different. If we have an address object, it could only match at most one service. Now we have a more flexible framework. First, we define a "Semantic Address Instance" 1210 is the semantic parameter of all three services. Next we create an instance mapping at the semantic layer. The mapping extracts the business address information from a contact item. In the figure, the mapping is represented by a dashed arrow. Started from the "Semantic Address Instance", we define three groundings, one for each service. Groundings describe the details of transforming an address instance into a syntactic parameter and are represented by solid arrows.

Both semantic instance mapping and grounding are described in a semantic service description language 1212 such as OWL-S. Since they are complicated to generate manually, a tool, namely OntoLink, is used. OntoLink has a powerful graphical user interface which helps user to define the relationship between two semantic instances and creates mapping and grounding afterwards.

Ontolink is a graphical tool for specifying mappings between (a) semantic descriptions of services and WSDL descriptions of services (this process is also known as grounding) and (b) between ontologies, or instances belonging in different ontologies. The output of the tool is a specification expressed in a language known as XSLT (known in the art).

OWL-S is a tool for describing ontological knowledge and is known in the art.

Also, the TCE needs to monitor service execution and provide for handling exception and failure. Exception and failure might occur at both the system layer (the system that is offering the service and its connectivity and/or accessibility to the user), or at the service layer. When failure occurs at the service layer, such failure might be due to either an incorrect invocation of, or binding to the service, or it might be due to additional, unforeseen requirements and/or credentials being necessary for accessing and/or using the service. In any of these cases the TCE need to make an attempt to rectify the problem, which might include involving the user entering (perhaps) additional information and/or taking some action; such actions might include a re-specification of the task.

Finally it is possible that Task Specification and Execution take place in an interleaved manner, i.e., a partial Task Specification is executed and the user goes back to Task Specification, extending the service composition, executing it, and so on. In other words, Task Specification and Task Execution need not be sequential stages of the Task Computing workflow, but they might take place concurrently, in either a user-driven, user-controlled manner, or in a semi-automated, but user-monitored manner.

Elements of a Task Computing User Interface

Each step of the Task Computing workflow should be manifested in the user interface. This does not necessarily mean that there is a distinct visual (in the case of a Graphical User Interface or GUI) or other elements dedicated to each of the steps of the Task Computing workflow. In fact, it is possible that multiple workflow steps might be presented at (or invoked through) a single user interface element.

A GUI for a TCE might employ multiple user interface features for assisting the user during each of Discovery, Filtering, Specification and Execution. Such features include drop down menus, search boxes, checklist buttons, icon highlighting with pop-up text, cursor over text, etc. For example, as the user moves the cursor (when using a GUI) over a graphical representation of a service, icons of other services that the cursor-indicated service might be matched with (preceding them or following them) might be highlighted. Or, when the discovered and filtered services are insufficient for the task that the user is attempting a "Search for more Services" option might become available.

Enabling Services for Task Computing

While discussing the challenges of task execution we discussed the concepts of semantic service instance mapping and service grounding. The approaches discussed also assist users with incorporating new services into Task Computing, meaning providing to existing services an adequate semantic description so that the service can be used for Task Computing purposes. FIGS. 13 and 14 display two possible ways.

FIG. 13 shows incorporating a new service (I) 1300. As shown in FIG. 13, an existing service 1302 has OWL-S 1212 groundings that map the instances of the semantic layer 1304 to the parameters of the services. Assuming that we have a new service 1306 that is identical to the existing service 1302 at the semantic layer 1304, enabling the new service 1306 for Task Computing requires that we create a new OWL-S 1212 grounding for that new service 1306. Then we can use the new grounding 1212 for the new service 1306 to invoke the new service 1306; the new grounding 1212 will take care of deriving the service parameters from the semantic instances. This mechanism can be used either to add a new service implementation that can be used for the same purpose as the existing service implementation(s), or in case we want to upgrade a service implementation by effectively re-directing the existing semantic service description to the grounding of the new service.

FIG. 14 shows incorporating a new service (II) 1400. FIG. 14 discusses a situation with two services 1302,1306 both of which have a semantic service description but each one of them using a different ontology for its semantic layer. To incorporate the second service 1306 we can use semantic instance mapping 1308 to map a semantic instance 1304 of the first service 1302 to a semantic instance 1304 of the second service 1306. Then, to invoke the second service 1306 we first use the semantic instance mapping 1308 to translate the instance of the first service 1302 into an instance of the second service 1306, and then we use the grounding 1212 of the second service 1306 to prepare the service invocation parameters.

These mechanisms are not usually employed by end-users, but they are mainly used by the providers of the services or third parties that have an interest in these services in order to make the services available for Task Computing.

The Service Description (we also refer to it as a S-Memo) itself is a file, or a pointer to a file that can be distributed from service owners and administrators to end users. As discussed, the S-Memo includes not only the semantic details of a service, but also the service invocation method. End-users can use a service for Task Computing if they have access to a S-memo. Even though while performing Task Computing end-users will discover services automatically, it is also possible that the end-users are explicitly informed of a new service through receiving a S-memo or a pointer to it. Such a memo can be distributed by e-mail, it can be automatically distributed by the service itself to users in the same subnet with the service, or passed from one user to the other. FIG. 15 describes these mechanisms.

More particularly, FIG. 15 shows end-user system development/deployment based on S-memo 1500. As shown in FIG. 15, the end user 110 may receive S-Memos from devices 204 through UPnP, from a developer/IT department 1502 through Email, and/or from OS and applications from her own computing device. Then the end user 110 invokes the services of devices 204, services 1302, and/or services on her own computing device to accomplish her task. The end user may share S-Memos with other end users 110.

On Task Computing Environment (TCE) Embodiments

A Task Computing Environment (TCE), when viewed as an embodied system comprises the following:

One or more Task Computing Clients (TCC's)

One or more Semantically Described Services (SDS's)

One or more Semantic Service Discovery Mechanisms (SSDM's)

Optionally:

One or more Semantically Described Service Control Mechanisms (SDSCM's)

A "Task Computing Client (TCC)" is a client that supports the workflows associated with the Task Computing Environment.

FIG. 16 shows the global architecture of an example TCE embodiment 1600. Of course, this is just one of many possible TCE embodiments. The TCC 1602 is software that enables the user to experience Task Computing, and when executed by a computer, causes the computer to execute the task Computing functions. The TCC discovers services 1302, filters services given a user's context, provides the user with a User Interface for specifying a task and assists the user with the task specification, and after the task has been specified it takes care of executing the task by invoking the services, occasionally requesting input by the user though the user interface and eventually it presents the user with the outcome of the task execution.

As shown in FIG. 16, a user 110 invokes tasks to, and receives presentations from, the task computing client (TCC) 1602. The TCC 1602 executes the tasks and receives services 1302 and semantic service discovery 1604.

TCC 1602 functionalities includes, but not limited to, the following:

A User Interface (UI) that allows the user to interact with the major functionalities that the TCE supports (Discovery, Filtering, Composition, Execution). These functionalities are mapped to modules or engines that are user accessible through the user interface:

Discovery Function (DF) finds (services and) their associated descriptions; the above is true even if the DF only queries a third party as opposed to receiving itself announcements. TCC can have multiple DF's corresponding to the service discovery technologies (such as UPnP, Jini, Bluetooth SDP, etc.).

Filtering Function (FF) filters the discovered services depending on user preference and context.

Specification Function (CF or Task Specification Function) can match services given their semantics and allows a user to specify arbitrary and complex sequences (not necessarily linear sequences) of services for subsequent execution (tasks).

Execution/Monitoring Function (EF) does the actual calling of services invocation interfaces, is responsible for coordination between called services during execution and manages the interaction of called services with the user during execution.

The minimally required functionalities of a TCC are Discovery Function (DF), Task Specification (TF) and Execution/Monitoring Function (EF).

Components (modules) that implement the functionalities of a TCC can be physically located in a system other than the end user's device. For example, in one of our PDA implementations, all the components of TCC except for the User Interface (in that case a Web browser) execute on a separate computing device. Many of the TCC functions can be provided as services themselves.

The components (modules) that implement the functions of TCC can be owned and/or operated by the different entities. Those components can again be discovered as services themselves.

A "Semantically Described Service (SDS)" 1604 comprises one or more service invocation interfaces and their accompanying semantic-layer descriptions.

Service invocation interfaces can be implemented by any method/mechanism for calling them (and/or interacting with them) including but not limited to SOAP & WSDL, UPnP, JINI, RPC, RMI, CORBA, COM, DCOM, KQML, FIPA-ACL, etc. A service can have multiple service invocation mechanisms.

The service invocation interfaces need not to be on the same machine nor under the same managing authority as the service that they describe.

The semantic-layer description or "Semantic Service Description (SSD)" 1604 of the service might include semantic description of its I/O, process model, etc. using any appropriate semantic language. SSD's about services should include (at a minimum):

A semantic layer description of the service

How to execute the service

The semantic service description can be physically located anywhere. It does not have to reside in the same entity physically and logically as the service interfaces, nor does it have to be managed by the same authority that manages and/or owns the implemented service and/or its interfaces. For example:

Anyone can give an SSD (Semantic Service Description) 1604 to a service invocation interface or a set of service invocation interfaces (interfaces can be distributed across multiple entities)

A TCC can keep SSD's internally.

Semantic service descriptions can be in any appropriate semantic language. An example of such an appropriate language is OWL-S. But, it is possible that the semantic description of the service is a simple proprietary language that only specifies explicitly the I/O of the service, in which case any semantic language for describing the I/O will suffice. (e.g., RDF, DAML, DAML-S, etc.)

A Semantic Service Discovery Mechanism (SSDM) is a mechanism to find SSD's. Optionally a SSDM finds the status (active, inactive, etc.) of the service.

There are many SSDM's. A TCC might employ multiple SSDM's and a service might be discoverable by multiple SSDM's.

In pervasive environments, UPnP, Bluetooth SDP, Salutation, Jini, Rendezvous are very dynamic SSDM's and actively inform other client devices about the presence of services). Generally speaking, a TCC, when using one of these mechanisms for discovering services that are available in the same subnet as the computing device that the TCC is executing.

For discovering services on the Internet, UDDI or a GOOGLE-equivalent for services can be used for service discovery; the TCC will query them for available services given search criteria.

Agent communication languages (KQML, FIPA ACL, . . . ) provide a vocabulary for querying agents on the network about services that the agents might be aware of.

For services that are running on the same computing device as the TCC, a variety of mechanisms exist, such as using the registry mechanism of the OS, or other mechanisms that we discuss later.

Also, the user types in/cuts and pastes the URL or some kind of reference for the SSD of the service (such as the S-memo).

The user scans a bar-code associated with the service, on the device in order to get the URL, some kind of reference, or the description itself for the SSD of the service.

A Web Service (or any other remote procedure call mechanism) can be used as one of SSDM's.

Local cache for previously- or often-used services can be considered as one of SSDM's.

Local or remote databases for SSD's of well-known services can be considered as SSDM's. The discovery modules queries those databases for SSD's for a found service using the IDs specific to the discovery mechanism used to find the service. For example, assume a service is found through UPnP as a UPnP device. The discovery module tries standard ways of obtaining its SSD's. When the attempts fails, the discovery module queries the local and/or remote databases for its SSD's using its Unique Device Name (UDN) of UPnP.

Definition (SDSCM)

A Semantically Described Service Control Mechanism (SDSCM) is a mechanism to let some entity (not necessarily a user of TCC nor even a human) to manage and control the provisioning of (create, provide, hold, remove, and etc.) SDS's.

SDSCM includes, but not limited to:

Semantic Instance Scraper for Applications

White Hole Service

PIPE (Pervasive Instance Provision Environment)

Notification services. Those do not use a subscription model, but notify the user by making the information providing service available as necessary.

Even though SDSCM is not an absolute requirement for task computing, SDSCM is crucial for creating a more dynamic Task Computing Environment. (More embodiments are given later.)

User Interfaces

As an important part of TCC, User Interface presents the discovery results to users, helps users to specify and submit a task for invocation. In this section, we give six versions of a User Interface for a TCC.

Full Version

FIG. 17 displays one possible User Interface 1700 for Task Computing that shows all information in one window. This complicated User Interface is intended for the advanced user.

There are five panes in this UI for this particular embodiment 1700. The top left one is the discovery pane. It has a list that shows all services (functionality) that can be discovered. Above the list, there is a drop down list which allows users to sort the service list in different manners based on such as alphabetical order, service type, discovery time, etc. To view the detailed information, users single-click the service they are interested in, and details about it will be shown in the detail pane which is on the left bottom of the window. The center top one is the composition pane. In the composition pane, there are several groups that comprise object name, two drop down lists and two buttons. The services in the left drop down list are called consumers and the services in the right one are called producers. In each group, any consumer can be combined with any producer since the output from producer can be used for the input for the consumer. This enables for this UI to present more combinations in a compact display area. When the consumer/producer pairs are seen from left to right, they are in the reverse order of the actual executions of the pairs. This is made intentionally so that the pair can be read as an English sentence (for example, "Open" "Local File") as the producer can be easily perceived as a noun phrase while the consumer can be perceived as a verb or adjective phrase that acts on it. This allows the users perceive what kinds of tasks are available more quickly. For other languages such as Japanese that has the reverse order of verb and its objective noun, it should be presented in the order of their executions. The object name shown above the pair of drop-down menus (such as "File," "Schedule," "Contact," etc.) is the object name of the output of the producer. The buttons in this pane are "Execute" and "Construct". When users click "Execute" the current selected consumer and producer will be combined as a task and executed. Or when users click "Construct", the current consumer and producer becomes the base for further construction and are shown in the construction pane. The construction pane is the right top one where users build a customized task. In the construction pane, the task that is currently being built is shown. Users may add a new service to the top/bottom of the service sequence, or remove the first/last service in the sequence by click buttons either in the tool bar or click the "+" or the "−" button in the pane. Users can click the "Clear" button in the tool bar to remove the current sequence and restart the building procedure. When the sequence is completed, users may click "Execute" button to execute it. The right bottom one is the information pane. In the information pane, TC operation messages are shown. And for each execution, a new tab will be added to the information pane, which displays the current execution monitoring information. The user can also begin a construction (task specification) by selecting a service from the discovery pane and the hitting the construct button.

As mentioned above, the panes are coordinated with each other so that the user can quickly accomplish her tasks.

When the user lets her cursor hover over one of the service names in the composition pane or construction pane, the description of the service taken from its SSD in OWL-S will be shown in a pop-up box.

Except the composition pane, any one of all other four panes can be hidden or shown by choosing the corresponding menu item.

A save pane can be also added to this user interface as necessary for the user to save the compositions she deems worthy.

Tab Version

FIG. 18-22 display another possible User Interface using tab metaphor. This is better suited for devices with a smaller display, such as PDAs and mobile phones.

Like full version, there are five panes in this User Interface. Each is a tab of a large form. FIG. 18 displays the discovery pane. A list in the discovery pane shows all services. Users can sort the list in six different orders by selecting the drop down list in the tool bar. To view more about a service in the detail pane, users can select the service and the "Detail" button. Users can construct a new task from a specific service. The way to do that is to double click the service and the construction pane will be popped up with the selected service in it. More particularly, FIG. 18 shows a user interface tab version (I) 1800.

FIG. 19 shows a user interface tab version (II) 1900. FIG. 19 displays the composition pane. In the composition pane, there are several groups that comprise two drop down lists and two buttons. The services in the left drop down list are called consumers and the services in the right one are called producers. In each group, any consumer can be combined with any producer. This enables for this UI to present more combinations in a compact display area. When the consumer/producer pairs are seen from left to right, they are in the reverse order of the actual executions of the pairs. This is made intentionally so that the pair can be read as an English sentence (for example, "Open" "URL from Favorites") as the producer can be easily perceived as a noun phrase while the consumer can be perceived as a verb or adjective phrase that acts on it. This allows the users perceive what kinds of tasks are available more quickly. For other languages such as Japanese that has the reverse order of verb and its objective noun, it should be presented in the order of their executions. Two buttons are "Execute" and "Construct". When users click "Execute" the current selected consumer and producer will be combined as a task and executed. Or when users click "Construct", the current consumer and producer becomes the base for further construction and are shown in the construction pane.

FIG. 20 shows a user interface tab version (III) 2000. FIG. 20 displays the construction pane. In the pane, there are three combo boxes, which indicate that the current task comprises three services. Users can remove the first and the last service by clicking the "−" button, or they can add a new service to the bottom by clicking the "+" button below the third combo box. In this example, since the first service does not accept any parameters from other services, there is no "+" button above the first service. Each combo box also lists services that are similar to the current one in the task. Users may replace the current service with any one in the list.

FIG. 21 shows a user interface tab version (IV) 2100. FIG. 21 displays the construction pane after users click the "+" button. Now a new combo box has been added to the construction pane. The combo box lists all services that can be combined with the third service (previously the last one). Since the current selected service in the new combo box does not have any output, the "+" button disappears.

When users are satisfied with the task, they click the "Execute" button to run the task.

FIG. 22 shows a user interface tab version (V) 2200. FIG. 22 displays the execution monitor in the information pane. Each execution monitor is a tab in the information pane. The execution monitor has two parts. The left part is a tree structure which displays the organization of the services in the task. Before the name of each service, there is a check box. The check box is initially unchecked. During the execution, when a service is completed, the check box will be checked. The right part is a text box which gives the status of the invocation of each service. Users may turn off the monitor by click the "X" button near the tab name.

In this particular embodiment, each tab contained only one pane and FIGS. 18-22 are executed in sequence as discussed herein above. It can be made so that a tab contains more than one panes related closely each other.

Flow Version

FIGS. 23-33 display an alternative User Interface for Task Computing that provides an intuitive way of creating relatively complex service compositions easily. Also, this more compact User Interface is better suited for devices with a smaller display, such as PDAs and mobile phones (FIGS. 27-33, display a similarly functioning User Interface intended for a mobile phone).

We next describe the user experience for the User Interface of FIGS. 23-26 and for the User Interface of FIGS. 27-33).

There are two panes in this UI. The left pane contains a listing of all the services (functionality) that can be combined with the services (functionality) that appear in the right pane. The user may double-click a service (or click it a second time after it has been selected) in order to move it from the left pane to the right pane. To remove a service from the right pane the user can double-click it, or she can select it (by clicking on it) and then click the remove button at the top-right corner. Adding to, or removing a service from the right pane automatically updates the listing of services on the left pane. When a service is moved from left pane to right pane the TCC automatically arranges it in the correct position among the services of the left pane. If there are more than one correct position for the selected services, the user will be asked to choose one correct position to insert the service.

The sequence of services in the right pane should be read as an English sentence from top to bottom. When the sequence is "complete", meaning it represents a composition that can be executed, as determined by the TCC, the execution button on the top-right corner will become active. Sometimes, as services are added onto the right pane, a "+" might appear between services; this means that one or more services will have to be added at the position of the "+" for the composition to be completed.

Whenever possible, i.e., the remaining service or services on the left panel can only be used in one composition in combination with the services on the right panel, the system will automatically complete the composition on the right pane.

While the user creates a composition, she may use the left and right arrows (on the top) to move back and forth in the composition creation process. The user can always start anew by pressing the restart button at the top-left corner.

The bottom of the UI window displays information about the current selected service on the left pane or, if no service is selected, information about the current state of the composition, such as the number of possible compositions ("possibilities"). The bottom line of the UI window can be disabled by pressing on the help button; the bottom line will disappear and then the user can add and remove service by single-clicking on them (instead of double-clicking).

We next describe sample screenshots of the creation of a composition using the User Interface of FIGS. 23-26, by elaborating on each of the Figures.

FIG. 23 shows a first user interface flow version 2300. FIG. 23 displays all the available service at the start-up of the User Interface. A similar display will be the result of pressing at the restart button.

FIG. 24 shows a second user interface flow version 2400. FIG. 24 displays the User Interface after 2 services have been successively selected by the user.

FIG. 25 shows a third user interface flow version 2500. FIG. 25 displays the User Interface after the user has selected enough services to reach an executable service composition.

FIG. 26 shows a fourth user interface flow version 2600. FIG. 26 displays another executable service composition but with the bottom information line disabled.

The User Interface of FIGS. 27-33 operates in the same way as the one previously described, except that the icons have been replaced by buttons; the forward (right) arrow (and its functionality) and the help function (with the associated explanation at the bottom of the User Interface) have been omitted.

We next describe sample screenshots of the creation of a composition using the User Interface of FIGS. 27-33, by elaborating on each of the Figures.

FIG. 27 shows Task Computing at the start 2700. FIG. 27 displays the User interface at the start FIG. 28 shows Task Computing after user selection 2800. FIG. 28 displays the User Interface after a service selection FIG. 29 shows Task Computing after refreshing of left panel 2900. FIG. 29 displays the User Interface after the left panel has been refreshed following the user selection of FIG. 28.

FIG. 30 shows another view of Task Computing after user selection 3000. FIG. 30 displays the User Interface after a second service selection.

FIG. 31 shows another view of Task Computing after refreshing of left panel 3100. FIG. 31 displays the User Interface after the left panel has been refreshed following the user selection of FIG. 30.

FIG. 32 shows Task Computing auto-complete information 3200. FIG. 32 displays the User Interface after following the refresh of FIG. 31 which has enabled the auto-complete functionality.

FIG. 33 shows user selecting auto-complete in Task Computing with automatic auto-complete optional 3300. FIG. 33 displays the User Interface after the user has invoked the auto-complete functionality. The service on the right is no executable.

Web-based Version

FIGS. 34-38 show a web based User Interface for Task Computing. It is intended for use with a Task Computing Client 1602 that except for the User Interface is running on a device different than the one the user is using for Task Computing, without requiring the installation of special software on the user's device in order for the user to engage in Task Computing. Although any of the User Interfaces discussed can be run on the user's device, while the rest of the TCC is executing on one or more other devices, this particular user-interface is unique in that it does not require software to be installed on the device. It should be noted though, that this User Interface does not preclude the installation of software on the user's device; the user might do so, in order to add functionality to her Task Computing experience, namely access to other applications running on her device.

The device (such as a computer) that is executing (running) the Task Computing Client 1602 also hosts a web server. Users can use PDA or Mobile Phone to talk to the web server to discover and filter services and to construct and execute tasks. The User Interface is designed in HTML, or any other web page designing language, so that it can be viewed with any web client application (such as INTERNET EXPLORER, NETSCAPE NAVIGATOR, OPERA BROWSER, MOSAIC, etc.).

FIG. 34 shows a user interface web version (I) 3400. FIG. 34 displays the discovery page. The page includes a combo box, a list and several buttons. The list shows all services. Users can sort the list by selecting an order from the combo box and click the "Sort" button. The buttons below the list allows users to browse other pages. For instance, to view the detailed information of a service, users may select the service from the list and click the "Detail" button to visit the detail page.

FIG. 35 shows a user interface web version (II) 3500. FIG. 35 displays the composition page. At the top of the page, the number of services is given. Below that, there are two buttons. Users can click the "Update" button the download the latest version of the composition page or click the "Discovery" button to visit the discovery page. Next, there are several groups that comprise two drop down lists and two buttons. The services in the top drop down list are called consumers and the services in the bottom one are called producers. In each group, any consumer can be combined with any producer. This enables for this UI to present more combinations in a compact display area. When the consumer/producer pairs are seen from top to bottom, they are in the reverse order of the actual executions of the pairs. This is made intentionally so that the pair can be read as an English sentence (for example, "Weather Info of" "Contact from Outlook") as the producer can be easily perceived as a noun phrase while the consumer can be perceived as a verb or adjective phrase that acts on it. This allows the users perceive what kinds of tasks are available more quickly. For other languages such as Japanese that has the reverse order of verb and its objective noun, it should be presented in the order of their executions. Two buttons are "Execute" and "Construct". When users click "Execute" the current selected consumer and producer will be combined as a task and executed. Or when users click "Construct", the current consumer and producer becomes the base for further construction and are shown in the construction pane.

FIG. 36 shows a user interface web version (III) 3600. FIG. 36 displays the construction page. There are two combo boxes in the page, which means that the current task comprises two services. Users can add a new service to the top/bottom of the list or remove the first/last service in the list by clicking the add/remove button above/below the list.

FIG. 37 shows a user interface web version (IV) 3700. FIG. 37 displays the construction page after users click the "Add" button below the list. Then a new combo box is added to the construction page. Users can stop construction and move to other pages by clicking the "Discovery" and the "Composition" buttons, or click the "Execute" button to execute the task, or save the current task as a new service by clicking the "Save" button.

FIG. 38 shows a user interface web version (V) 3800. FIG. 38 displays the execution monitoring page. After users issue a command to execute a task, this page is shown. In the middle of the page, the services that are in the task are listed. Before one service, there is an arrow which indicates that it is the service that is currently being executed. User can stop monitoring by clicking the "Composition" or the "Discovery" button to move to other pages or click the link "View Execution Detail" to see more about the execution. After a service invocation is completed, the arrow moves to the next service and a red "Done" message will be shown before the service. During the task execution, the monitor page will refresh itself in a pre-defined frequency to reflect the latest status until the task is completed or stopped by exceptions.

FIGS. 33-38 are executed in combination as discussed herein above.

Menu-based Version

The user uses nested menus to compose/construct/execute tasks. It can be part of TCC, OSs, and applications. The nested menu is constructed dynamically from the available services to Task Computing Environment at that time. This nested menu is especially useful when they are used for the context menus for objects in OSs and applications. The nested menu is constructed for the semantic objects that particular object can be mapped into.

FIG. 39 shows a user interface nested menu version (I) 3900. FIG. 39 shows the way to construct the composition from no object. The menu can start from some icon in the OS such as an icon on the task bar in Windows XP. The menu starts with no input service 3910 and it shows another menu 3912 of the services that can be composed with that first service when 3910 (for example) the user's cursor hovers over the service for certain duration of time. If the user decided to go with the current composition of the services, the user can (for example) right-click the menu item (that is the last service chosen) to execute the composition or construct the composition 3912 further starting from the current choice or to show the properties of the chosen service. FIG. 39 shows an example composition of "Ryu's Contact" in the menu 3910, "Business Address of" in the menu 3912, "Aerial Photo of" in the menu 3914, "View on Projector" in the menu 3916.

If the composition ends with some output, the system can be set up so that either (1) the system does not show the "Execute" item in the right-click menu or (2) the system executes the composition anyway and ignore the output or (3)

the system tries to compose automatically the services at the end of the given composition and then execute it.

The system can also be set up so that the Execute/Construct/Properties menu items 3918 show up in the menu when (for example) the user's cursor hovers over the service for certain duration of time.

In the above description, we described the way to extend the composition starting from no-input services. We can also start, for example, no-output service and extend the composition in the other direction. Or we can start any service (that might or might not have input/output), and let the user extend the composition both ways.

FIG. 40 shows a user interface nested menu version (II) 4000. FIG. 40 shows an example of essentially the same nested menu interface starting from some object in OSs or applications. When the user right-clicks the object 3908, the corresponding semantic object is determined for the object and then the services consume the semantic object is shown. The rest is the same as the "Nested Menu (From No Object)." When the composition is invoked, the object is parsed to create the semantic object, (in some implementation for the internal consistency) creates the semantic object providing service and executes the service, and hands the semantic object to the rest of the composition of the services.

In case of OSs currently widely available (Windows, Unix OSs, etc.), the file extension can be used to determine the semantic object into which the object is mapped into. For example, .jpg/"Image File", .mpg/"Video File", .vcf (vCard)/"Contact", .ics (iCalendar)/"Schedule" and so on. In case of the file itself is already contains the semantic objects, one or plural of the semantic objects contained in the file are used for the services to composed. For example, owl file in OWL (Web Ontology Language) can contain semantic objects.

We can extend this approach to OWL-S files that describe the semantic services. When the user right-clicks an OWL-S file, it is going to show the services composable to the service the OWL-S file describes.

In case of applications, one can start the composition, for example, a contact or schedule item in personal information management (PIM) software. Or one can start the composition from the attachments in an email in email software. Web browser software can create icons or menus dynamically for the semantic or non-semantic objects it finds in the page or linked from the page, and let the user start the composition from there.

Command-line Version

FIG. 41 shows a command line interface 4100. The user interacts with the TCC through a keyboard or similar input devices. The TCC will use the already-typed characters to display, on command (for example by pressing a special key such as the TAB key), a completed phrase that corresponds to a name of a discovered service. If there are more candidates than one for the completion, this interface presents the user with those candidates and waits for further user input. When the user has already input a complete service name, the auto-completion is based on the semantics of the services and the composition logic of the TCC. In other words the auto-completed service is a service that can be safely composed given the prior services entered. For example, the user already typed in "View on Projector" and hit the TAB key to complete. Then the system shows as the potential completions, only the services that can be matched with "View on Projector" (i.e. the services that produce "File" or its subclass objects). When the user hits the return, it executes the composition (or the composition is not complete, it will show the potential completions). This simulates the user's process of completing the sentences, which the users are often accustomed to, so that it provides the user quick and easy ways to compose and execute services.

It does not have to be always in the order of consumer to producer. The user can move the cursor to in front of some service and hit, for example, Shift-TAB to complete toward the left-side. It can be made so that the cursor jumps to only the service boundaries for the efficiency.

Detailed Description of Task Computing Clients (TCC's)

We next describe two Task Computing Clients in more detail. We will refer to them as TCC I and TCC II respectively.

These two make non-essential assumptions about the TCE, with respect to the technologies used by the Semantically Described Services (SDS's). Other technologies can be used interchangeably. Those assumptions are:

SOAP/WSDL and UPnP for service invocation interfaces

DAML-S or OWL-S for semantic service descriptions

UPnP for service discovery of services in the same subnet as the TCC. Listening to a pre-assigned socket for service discovery of services running on the same device as the TCC.

The services available in this TCE consume and generate data that are semantically described in an ontology that is illustrated in FIG. 42.

FIG. 42 shows a relationship between semantic instance types 4200. Broadly speaking, an ontology is a machine-readable representation of knowledge in a domain; an ontology ascribes meaning to entities in the domain that it describes, by, among other things, describing the properties (attributes) of such entities and the he relationships among entities in the domain. Such entities are referred to as semantic classes and semantic instances. A class is a collection of entities that have the same properties and relationships to other entities and an instance is a specific member of a semantic class. The representation language for this ontology is OWL-S.

In FIG. 42, "Thing" is a class defined in RDF namespace, which is the root of all semantic instance classes. "Contact", "Schedule", "Address" and "File" are four classes directly inherited from "Thing". "FLA Location", which indicates the address within the FLA office, is a subclass of "Address". "Media File", which has three subclasses: "Audio File", "Video File" and "Image File", is a subclass of "File". And "Web Page" is another subclass of "File" as well. Finally, "Address" is a property of "Contact".

Task Computing Client I

FIG. 43 shows TCE Embodiment architecture 4300. That is, FIG. 43 shows TCC I 4400 in the TCE we described (under the mentioned assumptions). In FIG. 43, "User" 4302 is the client who uses the TCE; "Local Services" 4304 are services that are running at the same device as "TCC I" 4400; "Local Service Manager" 4306 is a management module that controls local services 4304; "Pervasive Services" 4308 are services that are running within the same network as "TCC I" 4400; "UPnP Device +Web server" 4310 is a module to publish pervasive services; "E-services" 4312 are other services and they are also using "UPnP Device+Web server" to publish themselves.

When a local service 4304 is added to or removed from the TCE framework, a register or deregister message is sent to the local service manager 4306. The local service manager 4306 relays it to "TCC I" 4400. For register message, the local service manager 4306 also tells "TCC I" 4400 where to find the SSD 1604. For a pervasive service 4308 and an e-service 4312, the UPnP device module 4310 is in charge of sending add or remove messages to the network environment, which is discovered by "TCC I" 4400. For an add message, a UPnP call is provided. When "TCC I" 4400 discovers the message, it will use the call to find the SSD 1604 of the service. Normally, the SSD1604 is in a web server module. Next "TCC I" 4400 connects to the web server and retrieves the SSD 1604.

From the SSD 1604, "TCC I" 4400 finds out the necessary information to invoke services. To invoke them, TCC I 1604 directly submits local web service calls to local services, UPnP or WSDUSOAP service calls to pervasive services, and WSDUSOAP service calls to e-services.

TCC I 4400 Components

Basically, TCC I 4400 comprises five parts: Main logic with user interface, discovery and filtering engine, composition engine, execution monitor, and execution engine.

FIG. 44 shows the internal mechanism of TCC I 4400. We will describe below how each TCC I component works to provide the user a task computing environment.

Main Logic with User Interface 4402

"Main Logic" 4402 is the central part of TCC I 4400 for two reasons.

Firstly, it provides a (G)UI module which manages the interactions with the user in the task computing environment and supports the workflows of Task Computing. Any of the user interfaces described earlier can be used as the medium for the TCC to interact with the user.

Secondly, the main logic relays messages for other modules and glues them into a complete system. It receives the discovery results and use composition engine's interface to register and deregister services; it queries the composition engine to get necessary service-related information and shows it to users; it helps users to design a task; it passes the task to the execution monitor to execute it; and it displays the monitor information and gives user a clear view about the execution.

Discovery and Filtering Engine 4404

"Discovery and Filtering Engine (DE)" discovers services and retrieves the SSD's of services. The DE contains UPnP control points, which monitor the network and accept add/remove messages issued by pervasive services and a local port listener, which monitors a pre-defined socket and accepts add/remove messages from local services. When a new service is discovered, the DE also retrieves the SSD. For pervasive services, the DE makes a "getDescriptionURL" call to get the URI of the SSD; for local services, the URI of the SSD is included in the message, therefore no further action is required. Then the DE tells the main logic about the changes along with the SSD if necessary.

Often-used remote ontology description files are installed in the ontology cache at the installation time of TCC I. In the composition engine, when a remote ontology file is required, a connection to fetch the remote version will be tried first. If the connection cannot be established successfully, the cached file is used instead; if the remote file is retrieved, the corresponding caches version is also checked to make sure that they are consistent with the latest version. If it is not, the cached version is replaced with the latest one.

Inference Engine (Composition Engine) 4406

"Inference Engine (IE)" 4406 parses the SSD of services and responds to service-related queries by other modules. It provides a standard interface for other modules to register and deregister a service. When a new service is registered, the SSD of the service is parsed and the service information is added into an internal knowledge base; when a service is deregistered, the information that is related to the service is removed from the knowledge base. The knowledge base is used to answer various queries, such as "list all available services" or "list all service compositions" or provides all pairs of matched services.

Prolog or some other languages can be used to represent the composition logic that determines how services can be matched against one another for composition (task specification) purposes. The prioritizations are also performed by the inference engine. The matches are prioritized based on such metrics as newness, exactness of match, and user preference Execution Engine 4408

"Execution Engine (EE)" 4408 parses execution plans and designs strategies to execute them. The strategies include the sequence of service invocation, parameter passing from one service to another, parameter transformation, and so on.

Then based on the strategies, it makes the appropriate calls to invoke the services, such as UPnP, WSDL/SOAP, or any other remote procedure call interfaces, depending on the invocation interface that the service implements. It needs to have a very dynamic way of invocations. Namely it needs to make a call dynamically from the name of the function and the parameter list and not by calling a pre-compiled API.

It also needs to support asynchronous calls. In order to support such calls, it may include a JavaSpace-like component for asynchronous services, which can deal with UPnP Event callback, general polling, SMTP SOAP, and other mechanisms.

Execution Monitor 4410

"Execution Monitor" 4410 is a module between the EE 4408 and the main logic 4402. It launches a monitor for each execution plan. Without a monitor, users may notice whether a task is successfully executed or not, but nothing more. With a monitor, users can check the status of a task: which service calls have been completed and which are not. If a task fails, the monitor tells user at which point error occurs.

TCC I Flow

Main Logic 4402

FIG. 45 gives the flowchart of TCC I main logic 4402. When the main logic 4402 starts, it first discovers existing local services 4402-1 by parsing OWL-S files in a pre-defined directory. Then it launches a local service socket listener 4402-2. The listener monitors a pre-defined socket and will be informed when a local service is added to or removed from the system. Since pervasive services are using UPnP to broadcast their existence, the main logic then starts UPnP control points 4402-3 to discover pervasive services. When local service socket listener or UPnP control points receive add/remove messages 4402-4, the main logic register/deregister the services to the IE 4402-5. Next, the main logic finds all service compositions 4402-6, and then starts the TCC I GUI and waits for user's requests 4402-7.

Each one of the user's request 4402-8 is handled in the main logic 4402. If user wants to view the details of a service 4402-10, the information is retrieved from the composition engine and displayed in the GUI 4402-16. If user wants to design a new task, the current construction status is evaluated 4402-11, and all possible compositions are found from the composition engine 4402-12. The compositions are displayed in the GUI 4402-16, which help user to make decisions. If user plans to execute the constructed task or a given composition, a new execution monitor is generated 4402-13 and the execution plan is sent to the monitor. It is the execution monitor that submits the plan to the EE 4402-14. The remaining work of the main logic is to display the monitor information 4402-15 and to wait for new user's requests.

Discovery

FIG. 46 shows the flowchart 4600 of service discovery and registration procedure in TCC I 4400, which are executed by the discovery engine 4404 and the composition engine 4406. When an add message is heard, TCC I 4400 extracts the discovery information from the message 4600-1. If it is about a local service, the message contains the URI of the SSD; if it is about a pervasive service, TCC I 4400 calls the UPnP getDescriptionURL method and retrieves the URI of the SSD. Next the SSD of the service is retrieved and parsed in the composition engine 4406. The parsing result is in RDF model 4600-2. After that, the RDF model is converted to the knowledge base format 4600-3. The knowledge base assertions are finally inserted into the knowledge base 4600-4 by the composition engine 4406.

TCC I 4400 uses UPnP as the main method of service discovery for services in the same subnet as the TCC.

The discovery module implements UPnP control points to send queries to the network and search pervasive services. Sometimes services are slow in reporting their existence while being queried, or in some situation, the queries are ignored or missed due to various reasons. As the result, services may not be found in a prompt manner. We introduce the idea of multiple UPnP (or other service discovery) control points in the service discovery module. We start not one, but multiple (usually five to ten for TCC I) control points. Each one independently sends queries. The discovered results of control points are summarized in the discovery module and the duplicated messages are filtered. Experiments show that in this way, with slightly more resource consumption, the pervasive service discovery performance has been significantly improved.

When some services have trouble with providing valid semantic descriptions, they will be ignored by the discovery module. However, because of the attributes of UPnP, those devices will repeatedly announce their existence and the checking procedures following each announcement in TCC I consume a lot of resources. In order to address this problem, TCC I creates a black list to remember “bad” services along with time stamps which indicate what is the last time the services are discovered. Later, if a service in the black list is discovered again, TCC I compares the stored time stamp with the current time. If the time span is within a pre-defined bound, TCC I simply ignores the discovery message; otherwise TCC I will check the description again. If the description is valid at the recheck, TCC I will remove the service from the black list; or TCC I will update the time stamp as the current time stamp for the service and block it longer.

The discovery for local services works as follows.

A pre-defined socket is defined for this purpose. TCC I listens to the socket all the time. When a service is added (removed), the SSD of the service is copied to (remove from) a pre-defined directory (e.g. C:\Program Files\tce\psmgr). Then a message is sent to the socket. The format of the message is “a<SSD filename>” (“r<SSD filename>”). When TCC I finds the message, it first knows that the SSD is at pre-defined directory+<SSD filename>. The TCC I registers the SSD for add message and deregister it for remove message.

Displaying discovered services

The discovered services may be categorized and/or explained for the user’s easier understanding and better decisions. Categorizations can be done several metrics including, but not limited to:

Input and/or Output signature

Service Category

Internal, Local, Pervasive, Remote

Distance from the user

Free or For Fee

These categorization metrics can be set by the user a priori. The results of the categorization can be presented to the user by using, but not limited to:

Fonts (typeface, size, color, . . . ), background (color, pattern), frame (weight of the stroke, . . . ), voice (male/female, pitch, speed), listing under the categories Groupings based on the categorizations can be mapped into (G)UI elements such as drop-down menu.

Explanations for the service can be given in many ways including, but not limited to:

Pop-up menu when the cursor is over it or when any action is made for the service Show it in certain fixed area such as a status bar Separate page to show the details of the services What can be in the explanations of the service include, but not limited to:

Detailed textual description of the service

Service categories

Input to the service and (the link to) its ontology

Output to the service and (the link to) its ontology

Process model of the service in text or in graphical representation

Other attributes/parameters/metric of the service

Multimedia (icon, voice, image, video, etc.) descriptions (The link to) Its OWL-S file Along with a text description, we made it possible for a service to have icon, image, video, and voice descriptions of the service in its SSD. In its SSD, the service can have links to those descriptions or descriptions themselves (maybe encoded in texts). Those descriptions support multimodal interfaces and navigate the users better. For example, we can create a voice interface for blind people or while the user is driving car. In other cases, we can use its video description as an instructional visual manual about how to use the service.

FIG. 47 shows an example of TCC I with web based user interface for discovery pane 4700.

FIG. 48 shows a discovery pane with icons for services 4800, including an full version user interface for discovery using icons found in SDS (OWL-S).

FIG. 49 shows the detail pane 4900 which shows as much information as possible for a service.

Filtering

Services are filtered based on parameters for services. Parameters in semantic service descriptions such as Service Parameters in OWL-S files are used for the filtering. Example filtering includes:

Location, especially relative to the current user location such as “in the same room,” “on the same floor,” or “in the same building.”

Distance from the user.

In case of printing service

Printer Speed, Black and white or color, Free or for a fee, Estimated time for execution Task computing environment provides the user dynamic ways and user interfaces of filtering services based on semantic service descriptions. Since the semantics of the service parameters are known, the user interface can support the user input by constraining it based on its ontology.

FIG. 50 shows an example of service filtering 5000.

Search E-Services

For e-services, the search for those services will be the major conduit through which a particular service starts being used. After its initial hit or use, its semantic service description (SSD) can be kept in SSD cache. For our purpose, we assume there is some well-known SSD Repositories on the Internet that lets the user query for services. But UDDI, DISCO and other services search mechanism can be incorporated into the task computing environment. This is not limited to web services, but also includes other service invocation mechanisms.

This "search" can be invoked mainly from Composition and Construct panes. One of the items in a pull-down menu for the services is "Search Web services". When this is chosen, it pops up a page to let the user search the e-service with the input and output fixed. In that page, the user can change, add, remove, or modify the conditions for the search if the user so wishes.

FIG. 51 shows an example of a discovery pane with "Search Web Services"

Composition

The composition engine (IE) 4406 supports the Task Specification process. The composition engine 4406 uses the SSD's of the discovered and filtered services and its composition logic, in order to determine how services can be composed. The matches are also prioritized based on such metrics as newness, exactness of match, and user preference. Other modules will query the composition engine about service matches.

FIG. 52 gives the procedure 5200 about how composition engine 4406 answers various queries 5200-1. The first step is to convert the query into a knowledge base query 5200-2. IE 4406 matches services 5200-3 using ontology reasoner 5200-4. The answer of the query is a list of pairs of matched services. Next the list is sent to "Sort results based on user context" 5200-5. The procedure checks the "User context/preferences" 5200-6 and selects a sorting order. After the list is sorted, the "Sorted composition results" 5200-7 are returned.

The prioritizations of the compositions are based on the followings, but not limited to:

Newness of service discovered

Exactness of match

Quality of ontology translation

Frequency of usage

User preference

There can be incorporated learning mechanisms on the user's preference on the composition based on the feedbacks of the user's decisions from Main Logic module. Similar learning methods used in Japanese IME (Input Method Editor) can be employed.

Compositions may be filtered again based on the features as composed sets themselves such as:

Total cost

Total time to execute

Proximity of all the services in the composition set

The information on those features can be also provided for the users, for example, through a pop-up window when the cursor is hovered over the "Execute" button.

FIG. 53 shows an example of a Composition pane 5300.

In TCC I, the compositions are grouped together based on the input/output signatures. We can also group those compositions based on the service categories in SSD's such as "Viewer" and "Print" service categories (they both have the same input/output type).

The results of compositions may be categorized for later presentation. As in the categorization for single services, categorizations can be done with several metrics including, but not limited to:

Service Category

Internal, Local, Pervasive, Remote

Distance from the user

Free or For Fee

These categorization metrics can be set by the user a priori like the case for the categorizations for single services.

In order to provide a sense of control for the user, how things are presented is very important and we take a great care in presentations and explanations.

We reverse the order of the composed services in the composition pane for easier understanding of the task. The order of execution, for example, is first "FLA, URL" and then "View on Projector". But in the composition pane, the order in which the composition is presented is first "View on Projector" and then "FLA, URL" to match the order of English sentences.

For the composition and construction pane, service groupings based on the categorizations can be mapped into (G)UI elements such as drop-down menu.

How to present the user in an interactive way, how he/she can interact with services is a crucial part of task computing. Other examples include:

Changes of prioritization based on the user's action are reflected in (G)UI. For example, if the user selects a service from the drop-down menu in the composition or construction pane, preceding or following drop-down menus change their orderings of their menu items based on prioritization We have other unobtrusive ways of presenting the users necessary information for deciding which service or composition to execute. The information box pops up showing the description of the service when you choose a service from the drop down menu in the composition pane.

This human-readable description of the service is taken from its SSD.

We can also give the user clues on the service compositions. When the mouse cursor hovers over the "Execute" button, the pop-up box appears to show the total cost, estimated time, and other metrics for the execution of the particular composition.

Ontology Translation

By filling the gap between related instances in different ontologies, the system can enhance the utility of the system greatly. The different conceptualizations in the different ontologies can provide many ways of presenting the same information. For example, different conceptualizations for the address may result in the following (but not limited to):

(address) An example instance is ("8400 Baltimore Avenue, College Park, Md., 20740-2496, USA")

(street-address, city, state, zip-code, country) An example instance of this conceptualization is ("8400 Baltimore Avenue", "College Park", "Md.", "20740-2496", "USA")

(street-address, city, state) An example instance of this conceptualization is ("8400 Baltimore Avenue", "College Park", "Md.")

(street-address, city) This conceptualization assumes that every address it deals with is in Maryland. An example instance is ("8400 Baltimore Avenue", "College Park")

(street-name, street-number, city, state) An example instance of this conceptualization is ("Baltimore Avenue", "8400", "College Park", "Md.")

In order to fill the gap, we need to, (but not limited to):

Omit some part of information

Supplement additional information

Parse the textual parts

Reorganize

Information on how those ontology translation can be done might be provided internally, by SSD's, or externally (ex. search the Web services for ontology translation). The functionality can be provided by (, but not limited to):

XSLT

Code in Scripting language

References to local executables

The knowledge whether ontology translation between two objects is possible or not also affects service composition, too. Also some metrics on ontology translation can affect prioritization. For example, the composition with more accurate ontology translation involve might be more preferred over the composition with less accurate ontology translation involved.

Construction

If the user chooses so, the user can modify the service composition by adding, removing, changing services, etc. The services that can be added are filtered and prioritized based on their SSD's. With "click and choose" operations, the user can easily modify the construction.

Services can be added not only to the beginning and the end of the composition, but between services as well. One example is the "Instance viewer service" (See "SDS Embodiments"), which always have the same input and output.

FIG. 54 shows an example of a Construction pane 5400.

Execution

Both the semantic layer and the syntactic layer are involved in task execution. Task is defined in the semantic layer and the execution goes through the syntactic layer.

FIG. 55 shows task execution in the semantic layer and syntactic layer 5500. FIG. 55 uses an example to demonstrate how tasks are executed. In the figure, a task is defined in semantic layer which is a sequence of three services. "Contact from Outlook" 5502 is a service to retrieve one contact items from user's personal outlook folder; "Business address of" 5504 is a service to extract the business address from a contact item; and "Route from FLACP" 5506 is a service to display the route from Fujitsu Laboratories of America, College Park to a given address. The semantic descriptions of three services are written in OWL-S. Each semantic description includes a part called "Grounding", which describes the details about how to map a semantic type to/from a syntactic type. In the figure, "Contact" and "Address" are two semantic types and "String" is a syntactic type. "Contact from Outlook WS" is a web service that implements "Contact from Outlook" and "Route from FLACP UPnP" is a UPnP service that implements "Route from FLACP".

The execution procedure is as follows. First TCC I 4400 analyzes the SSD 1604 of "Contact from Outlook" 5502 and knows that this service takes no input and return a contact item as output. Then TCC I 4400 sends a web service call to "Contact from Outlook WS" 5508 with no input. After the web service is executed, the result is returned. Note that the result is a syntactic string. Then the grounding part of the SSD 1604 of "Contact from Outlook" 5502 tells TCC I 4400 how to map the string to a semantic "Contact" object. TCC I 4400 follows the instruction and generates a "Contact" object and sends it to the second service, i.e. "Business address of" 5504. "Business address of" 5504 service indicates how to extract the business address from a contact item. TCC I 4400 completes the operation and generates an "Address" object from the input. The "Address" object is then sent to "Route from FLACP" 5506. Similarly, after grounding, the "Address" object is mapped to a syntactic string. TCC I then invokes a UPnP call and uses the string as the input. Finally, "Route from FLACP UPnP" 5510 completes the request.

Service Invocation

To execute a service in the task, the Main Logic module 4402 determines which interface to call using the grounding information in its SSD 1604. (There can be multiple interfaces for one service of the same type and different types. A service can have, for example, one UPnP interface and two WSDUSOAP interfaces.) Which grounding to call can depend on the followings, but not limited to:

System capability. For example, PDA might have only UPnP service invocation module and choose to use UPnP grounding.

System or user preference.

Many things can happen during the execution of the sequence of the composed services. The events include:

UPnP service became unavailable before the execution

Failed service invocation due to

Change of the location during the execution

Lost network connectivity

The user can execute the service composition without any intervention or the user can monitor the execution of the composition if the user so wishes. Through enough interactivity with the user through Monitor pane, we can make those events less painful for the user. Such interactivities include:

Notify the user if any of service yet to be executed becomes unavailable

Provide the user an easy way to reconstruct the composition as needed

After deciding which grounding to use, the system needs to unmarshall semantic instances used in the Main Logic module 4402 into the parameters for the service invocations and marshal back the result of the invocation into the semantic instances. Marshalling/Unmarshalling module does this by the ground information extracted from the SSD of the service about to be invoked.

Marshalling and Unmarshalling

Grounding information can be in (, but not limited to):

XSLT

Code in Scripting language

References to Web Services for marshalling/unmarshalling

References to local executables

For example, the "address" semantic instance with attribute/value pairs of ("street address", "8400 Baltimore Avenue"), ("city", "College Park"), ("state", "Md."), ("zip code", "20740-2496"), and ("country", "USA") might have to be unmarshalled into a set of parameters such as ("8400 Baltimore Avenue", "College Park", "Md.") for a mapping service for USA addresses. Or the same "address" semantic instance might have to be unmarshalled into another set of single parameter such as ("8400 Baltimore Avenue, College Park, Md., 20740-2496, USA") for another mapping service.

Usually the difficulty is with unmarshalling the result of service invocation into semantic objects. Those cases may include unmarshalling the textual representation of information into more structured semantic instances. For example, an address providing service might give "8400 Baltimore Avenue, College Park, Md., 20740-2496" as a result for its invocation and it needs to be unmarshalled back into the "address" semantic instance with attribute/value pairs of ("street address", "8400 Baltimore Avenue"), ("city", "College Park"), ("state", "Md."), ("zip code", "20740-2496"), and ("country", "USA"). In such cases, we need some kind of functions or services to parse the textual representation. The function or the service may be provided through the code in some scripting language in the SSD, by a web service, or by a local executable. It will be invoked with the result of the service invocation (ex. a textual representation of an address) to obtain a semantic instance (ex. an "address" semantic instance with attribute/value pairs).

With parameters obtained in the previous step, the execution module invokes the service. The result is handed to Marshalling/Unmarshalling module for marshalling into semantic instances to be consumed at the Main Logic module.

Asynchronous Service Invocation

Traditionally, the WSDL +SOAP web service invocation adopts a synchronous model, i.e. when the invocation request is sent to the web service, the results of the service are sent back as the response message. There are two drawbacks in this model. First, if the service takes very long time to be done, TCC may encounter the timeout message. Or if not, during the processing period, TCC has to wait for response, and can not do anything else. Second, during the service processing period, if more information is needed from the user, in the current model, it is very hard for the web service to get it.

In our TCE embodiment, we deal with the first problem by introducing asynchronous web service invocation. Asynchronous web service invocation works as follows. When TCC first submits a web service request, a unique id is generated by the web service and is given back to TCC as a reference. Later, TCC sends a new request to the web service with the id and checks whether or not the answer for the previous request is ready. There are three possible responses. If the processing has not been completed yet, nothing will be returned. Or if the processing has been completed, the answer will be returned. Or if there is an error during the processing, the error message will be returned. TCC may poll the web service in a given interval and handle other transactions between two consecutive poll operations.

The solution for the second drawback is as follows. In SSD of the service, we define an extra field called Service Control UI. Meanwhile, besides the web service, another web server is designed which allows the user to enter extra information and then the web server sends it to the web service.

FIG. 56 shows an example about how it works. In the figure, “Web Service” 5602 is the module that provides the service 312. “Service Control Web Page” 5604 is the web server that helps the user to enter extra information. The procedure includes several operations. First, TCC 1602 sends a request to “Web Service” 5602. Along with normal parameters, an extra TCEExecID, 1234-1 in this example, is generated by TCC 1602 and attached with the request. Same as the asynchronous model, a unique id is generated by “Web Service” 5602 and returned to TCC 1602 for poll reference. In this example, the id is 1. Next, “Web Service” 5602 does something extra. Inside “Web Service” 5602, there is an “Internal Status Table” 5606 which stores the mapping between TCEExecID and id. The table 5606 has three columns: TCEExecID, id and extra info. For such a request, a new row is inserted in the “Internal Status Table” 5606. In the previous instance, the two fields have values 1234-1 and 1. At the TCC 1602 side, when the id is returned from “Web Service” 5602, it launches a web page about “Service Control Web Page” 5604 with the TCEExecID attached. With the help of “Service Control Web Page” 5604, the user successfully submits extra information. Next, “Service Control Web Page” 5604 sends the extra information to “Web Service” 5602 and uses TCEExecID as reference. “Web Service” 5602 can find which request the extra information belongs to with no difficulty by checking “Internal Status Table” 5606 and complete the request. As for TCC 1602, after submit the information, TCC 1602 starts an asynchronous polling procedure to “Web Service” 5602 and wait for the answer.

We have synchronous and asynchronous web service invocation, and we have optional extra web server support for some web services. How could the TCC 1602 know which invocation method it should use for a given service?

One solution is to define everything in the SSD of the service. In the embodiment, we adopt another method.

FIG. 57 shows a service invocation flowchart 5700 of TCC I 4400. FIG. 57 shows the complete flowchart in the TCC embodiment. Suppose that the SSD indicates that the semantic service is implemented by a web service and the method is called “GetURL”. First, the TCC checks whether there exists a method named “start_GetURL_with_ID”. If so, it means that the web service is an asynchronous 5702 one with ServiceControlUI. The TCC invokes the call along with a unique id, 1234-1 in the example, and go to the poll procedure. If “start_GetURL_with_ID” does not exist, the TCC then checks whether “start_GetURL” exists. If so, the web service is an asynchronous one. The TCC invokes the call and go to the poll procedure. If both “start_GetURL_with_ID” and “start_GetURL” do not exist, The TCC knows that the web service must be a synchronous one 5704. Next, the TCC checks whether “GetURL_with_ID” exists or not. If so, the method is a synchronous service with ServiceControlUI. For this service type, the TCC invokes the call with a unique id, and is done with the invocation. Note that for synchronous calls, not poll procedure is required. Finally, none of three calls exist, the TCC believes that this is just a normal synchronous web service, and treats it as usual. In the above example, “GetURL” can be replaced with any functions with or without parameters.

There are two ways to determine a service is asynchronous 5702 or synchronous 5704 and with or without the user interface. The first case is described above where the TCC inspects the description file (not necessarily a semantic one. For example, its WSDL file) and determines it by the additional names of interfaces available other than the name of the original interface it is about to invoke.

Another way to determine it is to use the SSD of the service. The SSD can have the description of how the service should be invoked along with how the service control page should be accessed.

When only single page interface is available, the following integration between the execution monitor page and the Service Control UI is extremely useful. For example, when the web-based UI is used, and the client devices are small devices such as PDA or Mobile Phone that allow very limited display spaces. As we discussed, to invoke a service with Service Control UI, user must go to the web server to enter extra information or to control the services. It means that in a web-based UI, a new browser has to be launched. However, in PDA or Mobile Phone, it does not support multiple browsers.

We modify the execution monitor in web-based UI to solve the problem. FIGS. 58-60 show an example. This time, we execute a task with two services: “Jeff's File” and “View on browser”. “Jeff's File” is a server that allows user to select a file from a list and returns the file. “View on browser” is a server that display a file in a browser. Notice that user's choice is an extra input for the first service.

FIG. 58 shows a web-based user interface (UI) with service control UI (I) 5800. FIG. 58 displays the initial execution page. As we mentioned, the arrow points out that currently it is running the first service. Note that a link is under the service name, which is pointed to the web server.

FIG. 59 shows a web-based user interface (UI) with service control UI (II) 5900. FIG. 59 displays the screenshot when user follows the link. Then she is asked to select a file from the list.

FIG. 60 shows a web-based user interface (UI) with service control (III) 6000. FIG. 60 displays the screenshot when user makes the selection and comes back to the execution page. Note that both services are completed now and the link for the Service Control UI for the second service becomes available. User may follow the link of the second page to view the file in the browser.

Monitoring

Execution Monitor 4410 is a module to show the information of the invocation of execution plans. After an execution plan is decided through composition and construction, a new monitor instance is created. A standard interface is defined between services and monitors so that the implementation details of execution monitor is hidden from TCC I 4400. Service execution threads send messages to each monitor and the monitor display them in a user-understandable manner.

Many things can happen during the execution of the sequence of the composed services. The events include:

UPnP service became unavailable before the execution

Failed service invocation due to

Change of the location during the execution

Lost network connectivity

The user can execute the service composition without any intervention or the user can monitor the execution of the composition if the user so wishes. Through enough interactivity with the user through Monitor pane, we can make those events less painful for the user. Such interactivities include:

Notify the user if any of service yet to be executed becomes unavailable

Provide the user an easy way to reconstruct the composition as needed

FIG. 61 shows a Monitor Pane 6100.

Save

Composition can be saved as a macro if the user so wishes. But just saving a specific sequence of the services does not always make sense in the pervasive environment. Unlike the Internet environment where you have always connectivity to the services, you will find a different set of services in a different place. For example, "View on Projector" in one room and "View on Projector" in another room are independent services. Still it is extremely useful if we can use those services interchangeably in the sequence in the macro.

Therefore what we specify for each operation of the macro sequence is not always exactly a particular service, but the conditions for the services which are acceptable for the position. For example, instead of specifying the service exactly such as "View on Projector in the room 123" as a step in the macro sequence, we can have a condition such as "service of 'View on Projector' category with a resolution better than 1024×768" for the step. We can go a step further by generalization. By expressing the specific service for the service as the condition, "service exactly matches with that specific service (or SDS)", we can say the every step in the macro sequence is a condition that the service for the step must satisfy. The difference between a "service exactly matches with a specific service" and "service exactly matches with a specific SDS" that the former addresses the match at the service invocation level (such as UPnP, WSDUSOAP) while the latter addresses the semantic level correspondence. An SDS can have multiple groundings in one or more service invocation technologies.

Those macros can also be services discovered in discovery of task computing workflow. When in a particular environment, availability of the services are checked, which satisfy the conditions for the steps in a macro. Only when all the services that enable the macro are available, it appears as discovered or available.

The conditions can range from the exact match (i.e. specifying a particular service), input/output signatures, to the service category. The UI for specifying the conditions can be dynamically generated from the SSD's for the service in the position.

FIG. 62 shows a Save Pane 6200.

TCC II, Task Computing Client (TCC) II

TCC I, discussed herein above, is an embodiment of TCC. TCC II is another embodiment of TCC. The User Interface and other TCC modules of TCC II are running in different devices. This makes it possible for devices such as PDA (personal digital assistant), mobile phone or any device Web browser-enabled to access TCE over many kinds of communication links without installing TCC on the devices.

TCC II is designed for users who want to use task computing services but do not have TCE installed in their client-side devices. TCC II lowers the requirement of using TCE because all it needs is a web browser.

As an embodiment of TCC, TCC II has complete module of service discovery, service composition, service construction, and service execution. The most important difference is that TCC I is running on user's device and TCC II is running on a separate device, such as a FNS. TCC II has a build-in web server. Users connect to the web server to retrieve the service information and consume services.

FIG. 63 shows the role of TCC II 6300. On one side, "TCC II" 6300 discovers "Task Computing Services" 6304 and organize the SSD 1604 just like TCC I 4400; on the other side, "Web client on user's device" 6302 talks to TCC II 6300 and enjoys the full benefits of the task computing environment (TCE).

SSD Embodiments

As to the SSD (Semantic Service Description), we can rely on the standards like DAML-S and OWL-S. As to multiple natural language support in the SSD, A semantic service description can use Unicode or a particular natural language encoding to accommodate the description in one language. A semantic service description can use Unicode or some encoding that can handle multiple natural language encodings to have the descriptions in many natural languages in one SSD. In case of semantic service descriptions based on XML, one can use the "encoding" attribute for the tag you want to have in multiple natural languages. You repeat the tag with different "encoding" attributes with the corresponding natural languages.

FIG. 64 shows an example 6400 of multiple natural language support 6400 in SSD.

As to TCC, TCC can use his or her own language, typically the selected natural language of the OS of their device. This makes it possible for each user accessing the same TCE may have a different "view" of the TCE according to the selected natural language.

SSD Cache

This SSD cache keeps SSD's for well-known, remote, or macro (previously saved) services. SSD's for well-known services are the SSD's for the well-known services without support for providing their SSD's. SSD's for remote services are the SSD's for remote services once or often used by the user. SSD's for macro services are the SSD's for macros saved in Save pane or obtained from other users or repositories.

SDS Embodiments

Next, we will give Semantically Described Service (SDS) embodiments. Services are abstractions of functionality that is of interest to the user. Such functionality generally emanates from at least three different types of sources: devices, applications and over-the-web e-services. These three sources are loosely defined categories, as the boundaries between these categories are highly malleable. Broadly speaking, device-originating services are associated with the core functionality that the device is designed to deliver; for example, a phone's (device) main functionality is making phone calls (service). Similarly, application-originating functionalities are associated with a computing application that is executing on a computing device; for example a Personal Information Management (PIM) application's functionalities, includes storing and retrieving contact information of persons. Finally e-services functionality is associated with web services that are executing on some remote server and deliver the functionality through access to the web, beyond the boundaries of a user's local network. This broad categorization is only offered as rough way to distinguish between the nature of services. It will be often be the case with the services described next that they belong in multiple categories. For example a video streaming service that is associated with the user's home stereo, is typically a device service when the user uses it while at home but it can also be viewed as an e-service when the user uses it while at work to stream a song from his computer to his home stereo for his roommate to listen to.

It should be noted again how fluid these distinctions are; manufacturers offer smarter consumer devices, often with network access (for example network appliances), and software companies develop applications that attempt to deliver consumer-device type functionality (MICROSOFT's Media Player, for viewing DVD's or listening to CD's). It is worth noting that in Task Computing the origins of such functionality is irrelevant to the user as the user is only interested in combining such functionality for the purposes of defining a task.

Device-based Services

View on Display

This service displays web pages or various kinds of documents on a device such as a projector, a plasma display, an LCD display. It accepts a URL as input and provides a control panel to the user. When it is invoked with a URL pointing to a webpage or a document, the displaying device shows the web page or the document. The user can control the displaying device through the control panel. Through its control panel, she can move the page up and down, follow a link to a new the web page, load a new URL, and so on.

View on Multiple Devices

This service displays web pages or various kinds of documents on multiple devices such as a projector, a plasma display, an LCD display. The devices show exactly the same content. The devices can be dispersed geographically as long as they are connected by a network with the location where the service is running. The service accepts a URL pointing to a webpage or a document as input and provides a control panel to the user. When it is invoked with a URL, multiple devices show the web page or the document. The user can control the devices simultaneously through the control panel. Through the control panel, she can move the page up and down, follow a link to a new the web page, load a new URL, and so on.

Map Viewer (A) This service shows the map around the location specified by the user on its display with the location marked. It accepts a location or an address as input and provides a control panel to users. (B) This service shows the map around the fixed location or address on its display with the location marked. It accepts no input and provides a control panel to users.

Map Router

This service shows the route between two locations on its display. The service accepts one or two locations or addresses, or the list of locations or addresses and provides a control panel to users. The service provides the route (A) between a fixed location or an address for the service and the user-specified location or address, (B) between two user-specified locations or addresses, or (C) displays a route between all locations or addresses in a list of such (optionally using a fixed location as the starting or ending point). It is sometimes important for the service provider to limit the starting location or the goal location to a fixed location for the service since it will prohibit its unlimited use of the service as a general mapping service.

Floor/Campus/Building/Museum/Mall/Hospital Map Viewer

This service is essentially same as "map viewer" service except the map has more structure in it than a road map.

Instance Providing Service

This service provides a semantic instance. (A) It accepts no input and produces a URL as output which points to the semantic instance (which in turn is usually served by the Web server on the same machine). (B) It accepts no input and produces a semantic instance (such as OWUDAML instance) as output. The service can be used to provide semantic instances pertinent to the pervasive environment such as the contacts of the people on the floor or schedules for the particular room. This service can also be used to provide the list of semantic instances of the same kind such as a list of contacts or schedules.

Print

This service prints the file specified by a URL. (A) It accepts a URL and has no output. When it is invoked with a URL, it prints out the fixed number of copies of the file specified by the given URL in a fixed format. (B) It accepts a URL and has no output. When it is invoked with a URL, the display shows a print option box to let users set the printing parameters and then to print out the file specified by the given URL. (C) It accepts a URL and produces a control panel as output. When it is invoked with a URL, it returns a control panel to let users set the printing parameters and then print out the file specified by the given URL.

Print Name Card

This service prints one or more name cards from a given contact. (A) It accepts a contact and has no output. When it is invoked with a contact, it prints out a fixed number of name cards for the contact in a fixed format. (B) It accepts a contact and has no output. When it is invoked with a contact, the display shows a option box to let users set the parameters for name card printing and then to print out the name cards accordingly. (C) It accepts a contact and produces a control panel as output. When it is invoked with a contact, it returns a control panel to let users set the parameters and then print out the name cards for the contact accordingly.

Fax

This service faxes the file specified by a URL to a specified telephone number. It accepts one or multiple URL's and one telephone number as input and produces no output or a control panel for the user to control the service as output. When it is invoked with one or more URL's and a telephone number, it faxes the printout image(s) to the specified telephone number. When the control panel is returned, the user can control how the faxes are sent or specify the cover pages for the faxes.

Play Video Service

This service lets the user play videos. It accepts one URL as input and either it produces no output or it produces a control panel for the user to control the service as its output. When it is invoked, it plays the video file indicated by the URL. When the control panel is returned, the user can control how it is played on the device.

Play Audio Service

This service lets the user play audios. It accepts one URL as input and either it produces no output or it produces a control panel for the user to control the service as its output When it is invoked, it plays the audio file at the URL. When the control panel is returned, the user can control how it is played on the device.

Digital Photo Frame

Digital Photo Frame accepts an image file as input and returns a control panel as output. It shows the image file in its display (often in a photo frame form) and lets the user control the orientation, zoom level, print the image, etc. through its control panel.

Location Determination

This service provides the current location of the device (therefore of the user who uses it). It accepts service-specific parameters and produces a location. Parameters can be the MAC address of the WLAN card or the list of pairs of access point MAC address and its signal strength. When it is invoked, it produces a location, such as a link into a location ontology.

Directory Publisher

This service publishes a set of objects: files, contacts, schedules, addresses, and so on. As a semantic service, it requires no input and returns an object (such as a file, a contact, a schedule, an address, and so on) as its output accordingly. When invoked, it lets the user select a single object from the object set and then returns user's selection.

Bank (Thing/Service)

This service lets users dynamically create a SDS from an object or the SSD given as its input to share with other TCE users or for later use themselves. While the service is invoked, users may use the control panel to set the password, expiration, limit on invocation count, discovery mechanism to use, and other properties of the SDS, to be newly created by this Bank service.

Normally, Bank service is helpful in three different ways.

Firstly, Bank for services is very useful when the user creates a particular task pertinent to the pervasive environment and then wants to use the task represented by the semantic service composition in the environment later. A task itself is a service. This scenario can be easily realized by using Local Service Selector and Copy Service Locally along with the Service Bank. Service Bank can be specialized by making the service accept only services with certain characteristics such as free/for a fee, estimated time for execution, and providers of the service.

The second way of using Bank service is to create a SDS by providing the SSD given as its input through the selected or default service discovery mechanism.

Finally, the user can leave files, URL's, contacts, schedules, services, and other semantic instances pertinent to the environment through Bank service. Bank can be made to provide each instance by an individual service or to provide all the instances of the same kind in one or more lists. When the service can have multiple lists, the user can create a list for the instance the user adds or the user can add the instance to one of the existing lists. By using this type of services, for example, the user can leave a presentation file in the conference room, which is often used in the room. Or after setting up the next meeting in the same room at the end of a meeting and inserting the schedule for the next meeting in the calendar program, the user can leave the schedule in the room for other users who come to the room. (In this case, the utility would be higher if the Schedule Bank used is hooked up with schedule management system for the room, which has remotely accessible interface.)

When the input is a "File" object, Bank service can be set up so that it copies the file locally and provides the file from the same machine the Bank service is running.

The Banks can be combined with some relevant back-end systems for more utility. For example, file system for a file bank and contact/schedule management software for contact/schedule banks.

This service is also an SDSCM. Refer to the descriptions of Bank in "SDSCM Embodiments" for SDSCM aspect of Bank services.

FIG. 65 shows an example of a bank service 6500.

Telephone Dialer Service

It accepts a telephone number as its input and returns nothing. When invoked, it will dial the number on the phone device (can be analog/digitalNoiP) for the user.

Wireless/Wired TC Storage

This is best implemented in the current small USB storage form factor, but it can be in any form factor. It comes with (1) network interface (2) [Optionally] Folder Publishing Service (3) [Optionally] Save in Folder Service (Maybe of a specific file type such as image or audio) (4) [Optionally] Bank Service. The services, (1) to (3) may be of a specific file type such as image or audio or can provide the separate services for the different file types.

The network interface can be Ethernet (wired), wireless LAN, Bluetooth, or InfraRed. In cases of wireless LAN network interface, it might be acting as an access point or can be in ad-hoc mode so that other devices can get on the network (in the infrastructure mode or the ad-hoc mode) to connect to the device). In other cases of wireless LAN network interface, it may try to get on the network it finds or have simple interface (on the device itself or over the wireless) to configure the SSID and/or WEP key of the network the device is supposed to connect.

Copy to Removable Storage

This service lets the user copy files onto removable storage such as Floppy disk, CD-R/CD-RW, DVD-R/-RW/-RAM/+RW, memory cards, USB storage (usually for a fee). It accepts one or multiple URL's as input and produces no output or a control panel for the user to control the service as output. When it is invoked, it copies the files specified by URL's to the removable storage. When the control panel is returned, the user can control how the copies are done. (such as to make the Audio CD, Photo CD, simple data disk)

Emailer (Pervasive)

This service lets the user send an email to a specified email address. It accepts an email address as input and has no output. When it is invoked with an email address, it pops up a dialog box to let the user input/edit messages and send it to that email address.

Other two possible embodiments for Emailer (Pervasive) is as follows: (A) It accepts an email address as input and produces a URL as output. When it is invoked with an email address, it returns a URL to a Web page that let the user edit and send an email. (B) The service has its own display and user input devices such as keyboard and mouse. It accepts an email address as input and has no output. When it is invoked with an email address, the display shows a window in its display that lets the user edit and send an email.

Application-based Services

Internal Services

The following services are implemented internally for TCC I for maximum efficiency.

List Chooser

This service lets the user choose an item from the list of instances of the same kind. The service might also let the user sort the instances based on one or more of its attributes.

Property Chooser

This service lets the user choose one of the attributes (or properties) from the instance. This service can also be invoked with an attribute to choose from. In the latter case, it will be executed without any user intervention.

Your Input

Based on the ontology of any object, this service lets the user input the values for the attributes of the object and produces the instance with those values. This service can be made so that it usually appears along with other instance providing services as a service that provides the same kind of instance.

Instance Viewer

This service lets users check and modify the instance. It can also be used as a debugging tool. Since it has the same signature for input and output, the service can be inserted between any services or appended at the end.

Local Services

The following services are applications running at the same machine as TCC I for maximum efficiency. Everything that appears as an item in the context menus, task menus in Windows OS's can be made into a local service in the Task Computing Environment. Some of the local services are listed below.

Local Instance Selector

Local Instance Selectors are the services that let the user select one or more instances local to the computing devices and make those instances available as semantically described instances. Local Instance Selectors include, but not limited to, Generic Local Instance Selector, Local File Selector, Favorite URL Selector, Contact Selector, Schedule Selector, Address Selector, and Local Service Selector.

Generic Local Instance Selector

Generic Local Instance Selector lets the user choose any semantic instance available locally for the computing device. This service can be realized by combining all other available Local Instance Selectors local on the computing device.

Local File Selector

This service lets the user choose a local file and expose it globally through the local web server. It accepts no input and produces a URL as output. When it is invoked, it pops up a dialog box to let the user choose a local file, copies the file to the Web folder, and returns the URL to the file.

Favorite URL Selector

This service lets the user choose a URL from Favorites folder (or any folder) and provides the URL. It accepts no input and produces a URL as output. When it is invoked, it will pop up a dialog box to let the user choose a URL from Favorites folder (or any folder) and returns the URL.

Address Selector

This service lets the user choose an address and expose it globally through the local web server. It accepts no input and produces a URL as output. When it is invoked, it pops up a dialog box to let the user choose an address from, for example, your contact management system, copies the information as a semantic instance to the Web folder, and returns the URL to the semantic instance or the instance directly.

Contact Selector

This service lets the user choose a contact and expose it globally through the local web server. It accepts no input and produces a URL as output. When it is invoked, it pops up a dialog box to let the user choose a contact from, for example, your contact management system, copies the information as a semantic instance to the Web folder, and returns the URL to the semantic instance or the instance directly.

Schedule Selector

This service lets the user choose a scheduled event and expose it globally through the local web server. It accepts no input and produces a URL as output. When it is invoked, it pops up a dialog box to let the user choose a schedule from, for example, your schedule management system, copies the information as a semantic instance to the Web folder, and returns the URL to the semantic instance or the instance directly.

Local Service Selector

This service lets the user choose SSD's from caches, local databases, file systems or anywhere local to the computing devices and make the services described by the SSD's available as semantic instances.

Semantic Instance Copier

Semantic Instance Copiers get the semantic instances produced by other services and copy them locally into the applications appropriate for the type of the semantic instances. It can execute its function with or without user intervention. In the former case, a pop-up window or some other user interface lets the user modify the object, decide how and where the instance is copied, or cancel the copy procedure. Semantic Instance Copiers include, but not limited to, Generic Semantic Instance Copier, Copy Locally, Add URL to Favorites, Insert into Contact List, Insert into Schedule List, and Copy Service Locally.

Generic Semantic Instance Copier

Generic Semantic Instance Copier lets the user copy any semantic instances into appropriate applications. This service can be realized by combining all other available Semantic Instance Copiers local on the computing device.

Copy Locally

This service lets the user save the file specified by a URL. It accepts an URL as input and has no output. When it is invoked, it pops up a dialog box to let the user choose where to save the file specified by the URL.

Add URL to Favorites

This service lets the user save a URL in Favorites folder (or any folder). It accepts a URL as input and has no output. When it is invoked, it pops up a dialog box to let the user save the URL with the user-specified name in Favorites folder (or any folder).

Insert into Contact List

This service lets the user insert a contact into the contact management software (for instance, MICROSOFT OUTLOOK). It accepts a contact as input and has no output. When it is invoked with a contact, it will insert the contact into the contact management software. Optionally it might pop up a dialog box to let the user check and modify the contact information.

Insert into Schedule List

This service lets the user insert a schedule into the schedule management software (for instance, MICROSOFT OUTLOOK). It accepts a schedule as input and has no output. When it is invoked with a schedule, it will insert the schedule into the schedule management software. Optionally it might pop up a dialog box to let the user check and modify the schedule information.

Copy Service Locally

This service lets the user copy SSD's provided by other services as semantic instances into caches, databases, file systems or anywhere local to the computing device.

Emailer (Local)

This service lets the user send an email to the specified email address. It accepts an email address as input and has no output. When it is invoked with an email address, it pops up a dialog box to let the user edit and send an email.

URL Viewer (Local)

This service lets the user browse the Web page specified by a URL. It accepts a URL as input and has no output. When it is invoked with a URL, it pops up a browser set to the Web page and lets the user browse it locally. Currently we invoke MICROSOFT INTERNET EXPLORER with the URL specified for this service.

Location Determination (Local)

This service provides the current location of the computing device (therefore the user who uses it). It accepts no input and produces a location. When it is invoked, it produces a location, which is a link into a location ontology based on Mini-beacon, GPS, etc. (Client-side location determination technologies). Location determination service based on user input, pops up a dialog box or a map to let the user specify the location when it is invoked.

Database Publisher (from Table, Item)

By specifying a whole of or part of a table from a database, the database publisher automatically creates an ontology based on the schema of the table and publishes a semantic service that lets the user choose an object from the whole or the part of the table in the database and output the selected object as its output.

Or by specifying an item out of a table from a database, the database publisher automatically creates an ontology based on the schema of the table and publishes a semantic object providing service that produces the selected object as its output when it is executed.

Web-based Services (E-services)

Place Information

This service provides information related to a given location, such as devices in the room, closest bathroom, who occupied the room. It accepts a location as input and produces a URL to the Web page with the information as output.

Hosted Services

Hosted services are services specially designed for TCC II. They include "Upload File," its variant such as "Upload Audio File," "URL to input," "View on Browser" and its variants such as "Play on Browser". "Upload File" and "URL to input" let the user upload a file from the user's device and an URL and return them respectively as their output. Hosted services use the service control UI to accomplish their functionalities.

"View on Browser" receives a "File" and returns nothing. "View on Browser" simply lets the user view the file on the same browser as TCC II. "View on Browser" is implemented as a synchronous Web Service with UI. It redirects the service control UI access to the input URL.

Remote Services

Remote services (here by this we mean Web services realized by WSDUSOAP interface) are usually introduced into the Task Computing Environment through the semantic service search. But on some occasions, remote services might be suggested without any semantic service descriptions (SSD's). In these cases, TCC I attempts to get their SSD's by trying to download them by changing the extension of their WSDL URL's or searching well-known sites for their SSD's.

Well-known Services

For well-known services, we can keep their semantic service descriptions locally or at some known sites. When we come across such services (UPnP, WSDUSOAP, etc.), we can use those SSD's to incorporate those services in our Task Computing Environment.

The TCC I might have SSD's for well-known remote services such as AMAZON.COM or GOOGLE in its cache and let the user use those services as other SDS's. Or if the TCC I comes across a WSDUSOAP service without any SSD, it can still use the service as a SDS by dynamically creating a SSD.

SDSCM Embodiments

In this chapter, we will give Semantically Described Service Control Mechanism (SDSCM) embodiments. A Semantically Described Service Control Mechanism (SDSCM) is a mechanism to let some entity (which can be a user of TCC or any software) manage the services by including, but not limited to:

Create services

Change discovery mechanism for the service to use

Hold services

Remove services

Modify parameters for services including:

Set the timeout for services

Set the access controls for services

Set the availability for services (local, global, authenticated user, etc.)

SDSCM's can be accessed in many ways including, but not limited to, through user interaction with user interfaces SDSCM's provide, through local API's, and through service invocation mechanisms. The last method of interaction with SDSCM's (i.e. through service invocation mechanisms) enables SDSCM's to be treated as SDS's with appropriate SSD's.

We list below some of the embodiments of SDSCM's.

PIPE (Pervasive Instance Provision Environment)

PIPE is a tool to publish and manage semantic instances and semantic services. PIPE itself can be considered as an SDSCM since it is providing a Web Service API to create and manage SDS's. It has two major functions.

Firstly, as a management tool, PIPE gives users sophisticated control over instances and services.

FIG. 66 shows a screenshot of PIPE's management interface 6600. Users can change services/instances from pervasive to local or vice versa. Or hold some services/instances. If a service/instance is on hold, no users can discover it unless the service/instance is restored later. In PIPE, an optional expiration time can be assigned to instances/services. Periodically, PIPE deletes the instances/services that are expired. Finally, an optional invocation limit can be defined for instances. If the limit is given for an instance, every time the instance is retrieved by other services, the number decreases by 1. When the number reaches to 0, PIPE will delete the instance.

Secondly, it works as the core of other SDSCM's. A web service interface is defined in PIPE and other applications, such as White Hole or Image Service, publish services/instances through the interface.

In many services, it needs to dynamically change the IP addresses in their SSD's. On the other hand, the user can have zero-configuration TCE if TCE components can accommodate IP address changes automatically.

It is a very important issue for PIPE which provides many semantic object providing services. PIPE runs a separate thread which monitors the possible IP address change. If the IP address change happens, the applications will do the corresponding changes. For example, SSD's are represented by template files in which any occurrence of IP address in the file is represented by a token. When the PIPE is initialized, the token is replaced by the real IP address. After the IP address change is detected, the templates are loaded again and the new IP address is used to generate the latest version of SSD's.

Another way (though slow) is to have only templates. Only when the request for the SSD's is received, it checks the IP address and uses the IP address to generate new SSD's.

Semantic Instance Scraper for Applications

The service scrapes semantic instances found in the application the user is currently using and makes them available locally and globally (or for restricted people/devices). Semantic instances can be scraped including, but not limited to, from some semantic descriptions or from syntactical analyses of texts and objects. It can be made so that it will cache the semantic instances for a while (for example, a day) even after the user goes on to other activities. Some of the applications the scraper will be implemented for, include, but not limited to:

Web Browser
Emailer
Spreadsheet
Word Processor
Database
Presentation

The scrapers will invoke an API of PIPE to publish the scraped semantic instances.

White hole (Thing, Service)

White hole service uses a drag-and-drop interface to publish objects and services. The objects from OS's and applications, such as files, URL's, contact items from contact management software, schedule items from schedule management software, can be dropped into the White hole dynamically. The White hole will analyze the dropped object type and generate the corresponding semantic instance accordingly. In case the dropped object is a SSD file or an URL to an SSD, it will use the SSD respectively.

It has its Management Interface (basically PIPE) to publish and manage the services. It also enables the user to set, along with other parameters, the default time to make the items unavailable and/or removed. White hole is very useful in the P2P (Peer-to-peer) environment where this service enables the users to exchange the information dynamically.

FIG. 67 shows a White hole drag and drop interface 6700.

Public Contact/Schedule/File Directory

This SDSCM lets the user make a contact or schedule or file directory available globally through the display for the service. The SDSCM is a special use of the white hole SCSCM along with Contact/Schedule/File Management Software in a public space. By default, the service disappears after a certain period of time. This service is best fit to the public spaces such as malls, tall buildings, and campuses.

Semantic Instance Bank Service
File Bank
URL Bank
Contact Bank
Schedule Bank
Address Bank
Service Bank This category of services let the user to deposit one or more files, URL's, contacts, schedules, addresses, services, or any other semantic instances in the environment. It accepts one or more URL's, URL's, contacts, schedules, addresses, services or other semantic instances as input and produces no output or a control panel for the user to control the service as output. When it is invoked, it copies the instances and creates a service providing the instances. It uses PIPE to publish those instance providing services and let other people use the PIPE to manage those newly created services.

This service is also an SDS. Refer to the descriptions of Bank in "SDS Embodiments" for SDS aspect of Bank services.

Universal Bank

This Universal Bank service is the most general of all Semantic Instance Bank Services. This service matches any service producing any semantic instances. (The service accepts "Thing" which is the super class of all objects.) When it is invoked it copies the instance and provides the instance along with an SDS for the instance providing service. When it is running as an internal or local service, it can act as a semantic instance cache.

This Universal Bank does not eliminate the needs for more specialized Banks such as banks for file, schedules, because in some environments, it is not always desirable to let the user leave any kind of object in the environment.

Image/AudioNideo Service Control

This type of SDSCM lets the user create multimedia contents and the SDSCM automatically makes the multimedia contents available as semantic objects providing services for those multimedia contents. Or the SDSCM lets the user make the multimedia contents available and control how they are made available.

For example, Scan SDSCM lets the user scan his or her material and expose the scanned data as Image Instance providing service. The display lets the user set the scanning parameters and try scanning until he or she is satisfied. When the result is satisfactory, the user can make the data available pervasively, for example, to copy the data locally (by combining with it "copy locally" service). The user can set the temporary password on the display. The service can charge the user based on the number of page or amount of the data.

Digital cameras and video camera SDSCMs can create Image and Video Instance providing services as Scan SDSCMs. Or digital audio recorder SDSCM can create Audio Instance providing services.

Removable Media Publisher

When the user inserts or connects a removable media into the computing device, this removable media publisher asks the user if the user wants to publish the files on the removable media. For example, the user inserts an audio CD into a computer, and then the removable media publisher asks the user if she wants to publish the audio files on the audio CD as an audio file providing service that lets others choose the audio file from the audio CD and produces the selected audio file as its output. Other possibilities include: (1) the removable media publisher to publish an image providing service when the user plugs in a USB digital camera into the computer (2) the removable media publisher to publish a certain type of file providing service when the user connects a storage card to the computer. In case (2), you can make it so that the removable media publisher publishes multiple types of file providing services if it finds multiple types of files in the storage card.

The removable media publisher can be made so that it launches a publishing service(s) automatically when it detects some removable media is inserted or connected to the computer.

Fax Receiver

Fax SDSCM creates Image, File, or Fax Data instance providing service when it receives a fax. It creates multiple image instance providing services for multiple pages or creates a file instance providing service for such as a PDF file to include all the fax pages, or Fax Data instance providing service specialized for fax data. It can be combined with OCR (optical character recognition) service to produce more structured object for the fax data including sender's information, title, memo, etc.

Control Panel Handover

Control Panel Handover is an SDSCM to hand over the service control user interface from one user to another. This is applicable to any SDS with a control panel, such as "View on Display," "Map Viewer," "Map Router". The service provides a "Handover" button on its control panel. When the user clicks the button, a new service (or new services) is created that provides the URL to the control panel. Other user(s) can check the newly created service and combine it with some viewing services to display the control panel and then control the original SDS.

The newly created service can be designed so that it disappears after a certain number of invocations to limit the number of people that get the access to the control panel. (Usually set to one). The service can also be set to expire after certain period of time so that it is only valid for a given time period. It can be made so that the control panel that the original user was using closes automatically or asks the user if she wants to close it and closes it if the answer is yes or keeps it if the answer is no.

Walkthroughs of Use Cases

Next we will describe Task Computing use cases, using TCC I.

In the walkthrough, there are file, schedule, and contact providing services. Those are the local or pervasive Instance Providing Services, which provide file, schedule, and contact respectively.

Office

Let us assume that the reader is a salesperson and meet Bob and his group for the first time in their conference room. You are allowed to connect to the wireless network provided for visitors. Your TCC I finds many services in the room. You go to "Composition Pane."

Business Card Exchange

Business Card Exchange=Contact Providing Service+Insert into Contact List

TCC I finds a composition of "Contact Providing Service" for Bob running on his PDA and "Insert into Contact List" on your PDA. You think Bob is going to be very important for your business, so you just hit the "Execute" button to execute the composition. "Contact Providing Service" for Bob will be executed and TCC I gets his contact. Then TCC I executes "Insert into Contact List" running locally on your PDA with his contact. Just before "Insert into Contact List" inserts Bob's contact, the service pops up a confirmation dialog box for you to check the information the service is going to insert into your contact management software. You hit "OK" button for the service to go ahead and insert it into your contact management software.

Presentation

Project the presentation=Local File Selector+View on Projector (URL Viewer)

You start your presentation of your product. You have your presentation file on your PDA. You use the composition of "Local File Selector" and "View on Project (URL Viewer)" services in the conference room. As a result, you have your presentation projected on the screen projected and the control page on your PDA. Using the control page, you control your presentation wirelessly. No hustle connecting the VGA cable and hitting the right function keys.

Leave the presentation=Local File Selector+File Bank

Bob asks you to leave your presentation file if there is no problem. Of course there is no problem. You just think that you should have created the "File Providing Service" for the presentation file when you executed "Local File Selector" last time. Anyway, you execute the composition of "Local File Selector" and "File Bank" service in the conference room. Now the presentation file is available from the File Providing Service provided by the File Bank.

Print the Manual

Print the manual=Favorite URL+Print (Pervasive)

Bob asks you for more detailed materials on your product. You remember that there is the product manual on your company Web site and that you have the URL to the manual in your Favorites folder. You execute the composition of local "Favorite URL" and "Print (Pervasive)" in the conference room. You pick up the printout at the printer in the conference room and give it to Bob.

Buy a Book by the Member

Buy a Book=Book Providing Service+AMAZON.COM (as a Well-known Service)

During the meeting, you are introduced to a new book by Bob. You find the conference room the "Book Providing Service" which provides the book semantic instance for the Bob's book. You execute the composition of the "Book Providing Service" and AMAZON.COM Web Service. Even though AMAZON.COM Web Service does not provide its SSD, the TCC I has an SSD for this well-known service and the TCC I can use AMAZON.COM Web Service as one of SDS's. By executing the composition, you can check the information on the book and buy it.

Schedule for the Meeting Held in the Room

Bob and you schedule a next meeting in the same room. Bob creates the schedule item in his schedule management system on his PDA. He then drags the item in the "White Hole Service."

Schedule Providing Service (White Hole Service)+Insert into Schedule List

You execute the composition of the "Schedule Providing Service" provided by "White Hole Service" on Bob's PDA and your local "Insert into Schedule List" service.

Schedule Providing Service (White Hole Service)+Schedule Bank

In the meanwhile, Bob executes the composition of the "Schedule Providing Service" provided by "White Hole Service" and the "Schedule Bank" in the conference room for other people to use the "Schedule Providing Service" for the next meeting in the conference room, which will be provided by the "Schedule Bank" after the execution.

Bob stops the "Schedule Providing Service" on his PDA using White Hole Service Management Window.

Get the Direction to the Airport Nearby

Address providing service (Pervasive)+Map Router

Now you are ready to go. Bob suggests that you execute the composition of the "Address Providing Service" for the airport you are going to use and the "Map Router" service. The conference room provides the "Address Providing Services" for the points of interest in the area for visitor's convenience. You see the route from Bob's office to the airport on one of LCD's in the room that provides the Map Router service. You control the Map Router service from its control page in your browser on your PDA.

Presentation Later

Presentation by Bob=File Providing Service (File Bank)+View on Projector (URL Viewer)

When Bob later explains your product to other members of his company, he uses the presentation file you left in the conference room. He executes the composition of "File Providing Service" for your presentation file provided by the File Bank and "View on Project (URL Viewer)" services in the conference room to give the presentation.

Public Spaces

The following scenarios are applicable to public spaces such as malls, airports, and train stations. Here we pick up scenarios at a mall.

You plan to get together with your friend for holiday shopping.

Leave a Memo

Location Determination (Local/Pervasive)+L-Note

You have been waiting for your friend for fifteen minutes. You are sure your friend will come eventually, but you want have a seat and a cup of coffee. So you execute the "Location Determination" service provided by the mall and the "L-Note" service also provided by the mall to leave a note for your friend. The "Location Determination" provides your current location, which is fed into the "L-Note" service to produce an URL for you to leave a memo at your current location.

You leave a memo telling your friend you will be waiting at a coffee shop nearby.

Find the Memo

Location Determination (Local/Pervasive)+L-Note

Your friend comes in late. But your friend does not find you there. Your friend executes the "Location Determination" service and the "L-Note" service to find your message and read it.

Internet Kiosk

Read the news=Favorite URL+View on Kiosk (URL Viewer)

You arrive at the coffee shop nearby in the mall, get your cup of coffee and sit at a table. You find an Internet Kiosk on your desk. An Internet Kiosk is essentially a LCD with a computer. The computer is hidden and in order to avoid people messing with it, it provides neither keyboard nor mouse. It should be used through the control page which "View on Kiosk (URL Viewer)" provides.

You decide to read the news on the Internet Kiosk to kill your time. You execute the combination of your local "Favorite URL" and the "View on Kiosk (URL Viewer)" provided at the coffee shop. You choose your favorite news site from the dialog box which "Favorite URL" pops up. Then the news site appears on the Internet Kiosk. You control the Kiosk from the control page in your browser on your PDA.

Share the photos=Local File Selector/White Hole Service+View on Kiosk (URL Viewer)

After a while your friend appears with apologies. You accept the apologies. Then you and your friend start to talk about your last trip. You show a couple of your best shots on the Kiosk by executing the composition of the "Local File Selector" and the "View on Kiosk (URL Viewer)." You choose the photo file in the dialog box and the photo is shown on the Kiosk.

Public Directory

Then you and your friend wander off into the mall.

Public Contact/Schedule Directory+Insert into Contact/Schedule List

You find a public contact/schedule directory. You find the contact of the store you want to go in the directory. You drag and drop it into the white hole. Then the Contact Providing Service appears on the TCC I. You execute the service and "Insert into Contact List" service to insert the store contact into your contact management system on your PDA.

You also find an interesting event on the directory. With similar steps, you insert the event schedule into your schedule management system on your PDA.

After ten minutes (the mall manager has set the default timeout period), the services will disappear.

List of Store Contact Providing Service+List Chooser+Insert into Contact List

Another possible scenario is something like the following. The TCC I finds the "List of Store Contact Providing Service". The TCC I shows the composition of "List of Store Contact Providing Service", "List Chooser" and "Insert into Contact List" as "'Insert into Contact List' 'One of' 'Store Contacts'". Executing the composition, you get a pop-up dialog box for you to choose one of the store contacts from the list. After your choice, you have the contact inserted into your contact management system on your PDA.

Floor Map

Location Determination (Local/Pervasive)+Floor Map

You find your location in the mall by executing the composition of the "Location Determination" service and the "Floor Map" service. You get the floor map of the mall with your location high-lighted.

Filtering Services Based on Location

Based on the floor, or area you are in, you can filter the services. The TCC I uses one of "Location Determinations" to filter the services. The TCC I uses the ontology of "Location", which the "Location Determination" produces, for the level (such as floor or area) used in the filter. You can choose the level on which the Services are filtered on the TCC I. With this filtering you can have reasonable number of the services on the TCC I. If you choose the area-level filtering, you get only the services in the area or local on your PDA.

Get the Direction

Address Selector+Map Router

After the shopping, you and your friend decide to go to the restaurant you found a few months ago. You have the address of the restaurant in your contact management system, but you do not know how to get there from the mall. Luckily you find a kiosk with "Map Router" on it, provided by the mall for the visitor's convenience. You find the way on the kiosk by executing the composition of "Address Selector" and "Map Router" and choosing the address of the restaurant in the "Address Selector" dialog popup.

P2P

In this section, we pick up some of P2P scenarios. The following scenarios do not necessarily need the Internet connection. They should work over the ad-hoc mode of WLAN or Bluetooth without any problem. One of the possible limitations of having no access to ontologies is that the compositions of services are limited to exact matches of input and output signatures. They can be circumvented by having once-used, often-used, and/or well-known ontologies kept locally on the computing device.

Share Restaurant Information

White Hole Service+Insert into Contact List

You want to share with your friend the information on the restaurant you found recently. You drag and drop the contact item from your contact management system into the White Hole Service on your PDA. Then your friend executes the composition of the Contact Providing Service on your PDA and the "Insert into Contact List" on your friend's PDA to insert the contact into his or her contact management system.

Share the Photo from the Last Trip

White Hole Service+Copy Locally

You want to share with your friend the photo from the last trip. You drag and drop the photo file from your file management system into the White Hole Service on your PDA. Then your friend executes the composition of the File Providing Service on your PDA and the "Copy Locally" on your friend's PDA to copy the photo file into his or her file system.

Share the Favorite Music

White Hole Service+Copy Locally

You want to share with your friend the newly released music you like. You drag and drop the music file from your file management system into the White Hole Service on your PDA. Then your friend executes the composition of the File Providing Service on your PDA and the "Copy Locally" on your friend's PDA to copy the music file into his or her file system.

Benefits

Task Computing presents substantial benefits for both end-users and the developers.

End-users

A primary beneficiary of task computing is the end user. End users stand to benefit from task computing because: (a) task computing lessens the required expertise for taking advantage of today's complex environment, (b) they can save time when performing complex tasks, and (c) task computing is a more natural and efficient way for users to interact with pervasive computing environments.

Task computing seeks to redefine how users interact with and use computing environments. The fundamental premise of task computing is to present to the user the tasks that are possible in the user's current context, to assist the user in creating more complex tasks by using simpler tasks as building blocks and to guide the user through the execution of the complex tasks. Once complex tasks are defined by the user (or perhaps by other users) such tasks can be re-used, very much like macros in popular applications today. Unlike macros (at least the ones that MICROSOFT OFFICE users are familiar with), the building block tasks and the resulting complex tasks may span multiple applications and multiple computing platforms (not a single device). In fact, one of the goals of task computing is that the user does not need to know or care about how the actual constituent tasks are executed or where (on which machine) they might be executed on. The ultimate objective of task computing is to present to the user an abstract view of resources (devices and services) that can be used in an ad hoc manner by the user, in order to execute tasks of arbitrary complexity.

We can sum up the advantages of task computing for end users as follows:

Computing for the everyday user Task computing does not require from the user a deep understanding of her computer environment and the available resources in it. Task computing presents to the user the possibilities (things to do) that are possible and feasible in the user's current context and guides the user though the process of creating and executing more complex (and re-usable) tasks A Time Saver for All Users For both the novice, and the advanced user, task computing offers time savings because the system (and not the user) manages the workflow and the transfer of data between applications in a manner consistent with the user's context and objectives. Moreover, since tasks, once created, are reusable, the user only has to define a complex task once.

Pervasive Environment Solution

Emerging computing environments are pervasive computing environments, full of devices and services that are not a priori known to the end users. Moreover, user devices (the devices that users use to access the functionalities of pervasive environments, e.g., PDA's, mobile phones, etc.) in such environments have physically and functionally limited user interfaces, which means that the personal computing environment practice of the users as "programmers" is infeasible. By presenting to the users a view of only those functionalities that are feasible and by partially automating the execution of complex tasks in such environment, while relegating the users to monitoring the task execution and providing input on a need basis, task computing addresses the idiosyncrasies of pervasive computing environments in a way that personal computing practices can not do. In addition, task computing, due to its real-time nature, meaning that the users can "see" what is feasible at the time they choose to specify and execute a task, addresses the dynamism of pervasive computing environment, where devices and services can come and go at any time and typically the end users know little about them in advance.

Developers and Businesses

End users though, are not the only affected parties that stand to benefit from task computing. Businesses and developers that develop applications for them are the other beneficiaries. Over the last 10 years we have been experiencing a revolution affected by the advent of the web. The web has made a wealth of systems and applications available to individual users; at the same time the businesses that own and control such systems have had to "bring" these (typically back-end) systems to the web through the labors of developers. This revolution changes the way users interact with computing systems but as revolutions go, this is an incomplete one. Users are the ones interacting with the applications, doing the searching, typing, cutting and pasting, processing and understanding whatever output these applications offer. Savvy users understand how to use a particular application (web site) for a particular task or goal, or, as it often happens, how to interact with multiple web sites in order to accomplish a single goal. There are two fundamental shortcomings with this approach: (a) Users are too involved and are relied upon in order to execute complex tasks, as described earlier in this document, and (b) Businesses are not getting their money's worth out of the investment of bringing their applications onto the web. Making an application or a system into a web application results into a static system, in the sense that all functionality presented to the user is carefully, but also inflexibly, exposed into the web application (the user-facing view of the application). Moreover, this functionality can not be easily combined with the functionality of other web applications (perhaps owned by other businesses) in order to create new interesting applications. Finally, this design-time construction is time-consuming, error-prone and as a result very expensive.

The latter point is an important one and needs to be further elaborated upon. The widespread efforts to deploy web services are partially motivated by the limitations of the current web applications. A success of web services will make it easier to develop new applications by using existing web applications, specifically by exposing functionalities of existing web applications as web services, and then employing them as building blocks for the new applications. Still, web services are a design-time technology, in the sense that these new "meta"-applications are still going to be static applications with the functionality and flexibility that their designers designed into their implementations.

Task Computing aims at dissociating functionality from the systems that provide them and enriching them so that users can combine them for more complex tasks in whatever way they wish. This new paradigm has a profound effect and benefit for the process of providing end-user functionality in the computer industry.

FIG. 68 shows a Capability Pyramid prior to Task Computing. Typically as illustrated in the pyramid of FIG. 68, end-user capabilities are provided by applications that are built on top of computer (hardware and software) platforms. Because each application is designed for a particular purpose and because it offers to the user functionality that it has been programmed by design to offer, extending the end-user capabilities requires either new applications (or devices) or custom connections between such applications and devices. As a result, providing a small increment of end-user capabilities requires substantial investment (labor, money, time) in the layers below, due to the tight coupling between the functionality offered to the user and the applications and platforms that such applications run.

The Task Computing paradigm enables the delivery of a lot more additional capabilities (things that the user can do) to the user with a lot less investment at the layers below, i.e., functionality provided by devices and applications and the platforms that support them.

FIG. 69 shows an Inversed Capability Paradigm after Task Computing. The effect of inverting the traditional pyramid is that the cost of multiplying a user's capabilities with a given set of devices and applications is much lower thanks to Task Computing.

Yet another benefit of Task Computing is that it greatly enhances the value of e-services, such as Web Services and UPnP services because it multiplies their user base and their potential usage. Web services are built by programmers/developers and they are intended to be used by developers. This constraint has to do with the complexity of their programmatic interfaces that require a substantial know-how in order for them to be used in creating an application and also because the lack of deeper semantics associated with the functionalities of these e-services and their inner workings require a human inspection. Moreover, even simply discovering (or just becoming aware) of these e-services is a developer-driven process due to the lack of semantics. Because Task Computing makes these e-services available to the very broad user base of all people with web access (and a Task Computing client), and because each such user can combine each of these e-services in a variety of ways, often for tasks that are different than the tasks that the e-service was designed for, developers of such e-services receive both more users and uses for the e-services they develop.

Referring again to FIGS. 13 and 14, because of the introduction of the semantic layer abstraction of a web service, on top of an existing web service and due to the fact that the user's tasks are conceived, defined and as far as the user is concerned, executed at this semantic layer, upgrading the actual service (web service) that provides the service, or modifying it, or replacing is only a matter of changing the grounding of the semantic description of the web service to the new service at hand, in a way that is unnoticeable to the user; this way there is no cost associated with the process of changing a deployed web service.

This is the appeal of task computing. As opposed to static meta-applications, the user can create in real-time their own "applications", by creating and executing, in real-time their own tasks. The benefit for developers and businesses is that the functionality that businesses make available as web services can be exploited (used) in a variety of unplanned ways at the whim of individual users.

Applications

Task computing relies on the ability to semantically describe services and information content. Based on the semantic descriptions of services, the system enables users to do tasks through intensive interactivity. In that sense, task computing can be thought of as a semantics-enabled application that is broadly related to the next iteration of the Web, referred to as the Semantic Web. Even though the broad success of the Semantic Web will rely on the broad adoption of ontologies about everything "out there", task computing has more modest requirements because it is not intended to be a fully automated system.

In addition, task computing is a way to address the complexity (from the user's point of view) of the new pervasive (or ubiquitous) computing environment which is populated by a plethora of devices that make available their functionality as services.

Even though Internet connectivity of a user's client device would exploit task computing to its fullest, full-time Internet connectivity is not a requirement for task computing. Limited connectivity leads to the limited availability of ontologies to the system and the limited capabilities of the system consequently. But even if ontologies are unavailable, the system still provides some functionality; often-used ontologies can be cached or stored in the user's device and used by the TCC whenever network connectivity is unavailable.

A large class of uses of task computing will be in pervasive environments, so network connectivity by wireless means will be highly beneficial (Wireless LAN ad-hoc mode, Wireless LAN infrastructure mode, Bluetooth (PAN), IR, etc.)

We next provide some examples of task computing in use. We assume that the user is using a computing device that runs a Task Computing Client such as TCC I, or is using a web browser that can interact with a Task Computing Client such as TCC II. We will describe examples of Task Computing in use in different contexts and spaces.

Home Environment

Many home appliances offer functionality that can be described with relatively clear and simple semantics because of the well-defined domain and limited scope of such functionalities. As a result, the home environment is a good application area for task computing. As home appliances are getting smaller, more connected, and more pervasive (in another word, "more invisible") and the number of those appliances is growing, it becomes very important for the user in home environment to find (or discover) the devices (or the services those devices provide), present them in easily understandable ways to the user, and let the user control the devices (or execute the services) with less effort; these are the goals of task computing.

FIG. 70 demonstrates an example of Application eHome 7000. Besides traditional computing devices that typically might exist in a home 7002, such as PC with TCE 7004, Home Gateway Router (HGR)) and PDA 7006, other multi-functional devices are connected into the wired or the wireless network. "Home surveillance" 7008, "Video adapter" 7010 and "Audio adapter" 7012 are three such devices. Task computing service modules are installed in them which transform the devices into semantic service providers. The modules can be either a software package or a hardware attachment. An HGR can be a shared file server which allows home users to share files with each other and with external users under owners' permission. The PC, a PDA, or a Mobile Phone 7014 can be used to perform Task Computing in this environment.

Outside the firewall 7016, there exist pervasive services 7016 and dynamic service portal 7020, which provide additional services that can be combined with the eHome services for Task Computing purposes.

Home users can use this Task Computing environment, to perform a variety of tasks. They may use Directory Publisher to publish video, audio, and image directories on their PC upstairs and play them in traditional devices, such as TV and stereo. At home, they may remotely control the devices using their PDA or Mobile Phone. If they are not at home, they may still do it through the SSL reverse proxy in order to remotely control their devices using their PDA or mobile phone. They may store the home surveillance video as a video file in their PC and review it later, while at home or away. They may store appointments or contacts to the dynamic service portal and use them later from anywhere. They may share pictures with their friends by using any of the previously discussed Task Computing publishing mechanisms. These are only a few examples of the things that home users can. It is important to note that none of these tasks has been programmed in the environment. Once the functionality has become available as services, it is the Task Computing environment that enables all of these tasks. From a user's perspective, all of these tasks are available through the user interface of the Task Computing Client that the user uses, be it on a desktop, laptop, PDA or mobile, whether located at home or being away from home.

Office Environment

The office environment is another interesting application for Task Computing. Imagine a visitor (or an employee) in an office setting. We assume that the visitor carries some computing device (or a variety of them for that matter), such as a laptop or a PDA. As the visitor moves about the office space, her task computing environment will present her a list of things she could do depending on her context and the real-time availability of other devices and services.

The office environment itself might be "equipped" with a variety of services, many of them originating in devices in the office.

FIG. 71 shows an example of an eOffice 7100. Within a conference room 7102, "View on Projector", "Audio Player", "Digital Phone Frame", "Directory Publisher", "Dialer", "View on Kiosk", "Map Viewer and Router", "Pervasive Print", "Video Player", "Image Service Control" and many "Other pervasive services" are running. On user's personal device, TCE along with some "Local Services" are installed. With the help of S-Memos and White Hole, remote services are incorporated into the environment.

Referring again to FIG. 71, the conference room 7102 interconnects through a network 7104, map view and router 7106, view on a kiosk service 7108, dialer 7110, directory publisher service 7112, digital photo frame 7114, audio player service 7116, view on projector service 7118, local services 7120, image service control 7122, video player service 7124, pervasive print service 7126, and other pervasive services 7128. Local services 7120 also interface to remote services 7130.

From the user's point of view, it is important to note that the user does not know in advance of the availability of all those services, nor does she know about how to access them and use them. The user's task computing environment is responsible for automatically identifying these services, understanding the functions that they provide, and is solely responsible for accessing them and using them. The user is responsible for defining her task given the available resources. To the user, resources are related to actions that she can perform in a particular environment. Examples of such (atomic) actions (implemented as services) in an office setting could include:

Use a viewing service

On a public display

On a projector

See scheduled meeting for a room

Add a meeting to a room's schedule

Leave a note for future visitors to a particular room

Add contact info of other employees or visitors to a PIM application on user's device See listing of hotels close to current location See listing of restaurants close to current location View a chosen location on a map View a listing of local airports Select a file or URL from user's device in order to perform some action on it View a route between any two locations Although some of these actions (functionalities or services) might be interesting in their own right, the true value of task computing is that a user can combine the inputs and outputs of these services in order to define and execute more complex actions (tasks). The task computing environment running on the user's device is responsible for presenting to the user the possible ways that the available actions (services) can be combined (consider a "building blocks" metaphor) and carries out the execution of the composite task, once the user is ready to do so. Examples of such composite actions (tasks) include:

View on a public display the location on the map of a particular restaurant, or the route from the current location to that restaurant or to an airport Select a URL or a file from the user's local device to be displayed on a publicly-accessible display or a projector (for example to use a projector to make a presentation, without having to connect cables or wires to that projector)

Insert the contact info of fellow participants in a meeting into the user's PIM running on her PDA, in a manner similar to exchanging business cards.

Leave the schedule for the next meeting in the room.

It is important to note that none of these more complex tasks has been designed into the system. The user is responsible for "creating" these complex tasks using a user interface on her own device, while interacting with the task computing environment running on her device. That environment is responsible for the execution of the user-defined tasks. The providers (or programmers) of the available services in this pervasive environment, did not have in mind a particular usage of the services they made available. In real-time (execution time) depending on the user's wishes and context, these services are used as building blocks to carry out more complex tasks, without the user ever having to directly interact with these services.

Public Facilities (Airports, Train Stations, etc.)

In another example of task computing in pervasive environments we discuss the task computing experience of a traveler that wanders around an airport with her PDA or mobile phone. As shown in FIG. 72, some "Pervasive services" are setup within the airport, and the services are connected to the "Network". Let us assume that the following services are available in this space.

Use a viewing service on a public display

See listings of events that take place in the airport or in the surrounding area See listings of facilities (restrooms, restaurants, coffee shops, smoking areas) in the airport Purchase a newspaper or a magazine Post a classified add Select a file or URL from user's device in order to perform some action on it View a chosen location on a map View a route between an two locations View flight information (departures, arrivals, gates)

Information on ground transportation

As shown in FIG. 72, pervasive services 7018 interfaced with a network 7204, which also interfaces with a PDA 7206 (or mobile phone).

Once the user connects to the network, either over a web connection or using a local network connection such as Bluetooth or WLN, she may perform any of the following tasks:

View on a public display (selected by the traveler or by her task computing system based on her location) directions to the traveler's connecting gate (using the traveler's flight information from the Personal Information Management application, or PIM, such as MICROSOFT OUTLOOK, on her PDA), Similarly, view directions to the closest smoking area, or a restroom, or a coffee shop, or a restaurant, View on a public display directions from the airport to the location of an event taking place in the vicinity to the airport and add an appropriate entry to the traveler's PIM application on her PDA.

FIG. 72 shows an example of an Application Airport 7200. FIG. 72 shows a screenshot 7208 of the client device. If the client devices contain a TCE module, they may combine their local services with the pervasive ones. However, that is not mandatory.

It should be noted again that none of these complex tasks have been pre-compiled, but they are constructed by the user in real-time (using the available resources) with the available service in the environment as well as services dynamically created by the user and executed by the task computing environment of the user.

Retail Areas (Coffee Shops, Malls, etc.)

FIG. 73 shows a screen shot 7308 of the client device. In addition, FIG. 73 shows pervasive services 7108 interfaced with a network 7304, which also interfaces with a PDA 7306 (or mobile phone).

In a similar manner to airports, task computing can help end users accomplish complex tasks in pervasive computing environments such as coffee shops, malls, etc., using the same concepts described in the previous example. For instance, the same settings can also be applied in a coffee shop (FIG. 73). The providers of the individual, constituent services, still only provide their services to be used as building blocks for the users to construct and execute complex tasks.

A customer carrying a PDA (or Mobile Phone) enters a coffee shop. Some of the services offered in the coffee shop could include:

Use a viewing service on a display mounted on a sit-down table, or on a public plasma display, See listings of events that take place in that particular coffee shop or in the surrounding area, Leave a private note for friends that might visit the store, View the menu, Purchase a newspaper or a magazine, Post a classified add, Select a file or URL from user's device in order to perform some action on it, View a chosen location on a map, View a route between any two locations.

Using her task computing environment running on her PDA the customer might try any of the following:

Browse the menu and place an order, which is delivered at the table she sits down (as the TCE determines her location), order a carry-out order, make the payment and be notified when the order is ready for picks up, browse available offerings and select an electronic paper to buy which will then be displayed on a table-mounted LCD wherever the user eventually sits down, discover an announcement for some event, and upon deciding to attend the event, have the event checked against her schedule along with directions, and finally add the event to her schedule and sends a note to a friend to join her, leave a note for a friend that might visit the coffee shop after she has left, e.g., "I will be at "United Artists" movie theater to watch "Minority Report"; please join me if you like". She might include directions to the movie theater and the schedule for the movie "Minority Report", might share photos (stored on customer's PDA) with friends, while viewing them on a table-mounted display, leave photos at the coffee shop for other friends who plan to come in the shop later. In the last example, the user creates a new service providing the photo files on his or her PDA, which in turn his or her friends will execute to copy them into their PDA's.

In order to achieve some of these tasks, the consumer might have to access services offered in the broader Internet but still accessible from the location of the coffee shop. As before, the user is using the available services as building blocks for complex tasks in a way that has not been a priori designed into the system.

Desktop/Laptop Environment

Pervasive computing environments is not the only application area for task computing. Task computing also transforms the way users eventually carry out complex tasks in today's personal computing environments as is the case when a user uses her laptop or desktop.

Let us consider the following scenario. A user while browsing the Internet comes across an interesting event, say a talk that she might be interested in attending. Following this discovery the user might manually go through the following operations:

Type the name of the location (in this case a hotel) at a search engine in order to find where exactly this event will take place. One example of a search engine is GOOGLE™.

Upon browsing the returned results the user will come across a webpage with further information about this hotel and upon visiting the hotel's webpage she will probably find the exact street address of the hotel.

Armed with the address she might type the address in the search window of an Internet mapping service in order to see the location on the map.

If the user decides that the location is convenient for attending, she might check for conflicts with the schedule in her PIM application on her desktop and upon deciding to attend this event she might go back to the mapping service, type the address of her home or work and get detailed directions to the event's location.

Following that step she will probably add the event in her PIM application, typing again the event information and perhaps attaching the URL with the driving directions and/or the talk announcement.

Finally she might wish to bring this event to the attention of a colleague who might be also interested in attending this event and send an e-mail to him, attaching again the event description and directions or map to that event.

Even for a proficient user, who knows how to perform this series of steps, performing the above task requires a considerable amount of time (perhaps 15-20 minutes), spent on invoking applications on her machine and transferring information from one application to the other. In addition, the next time that the user comes across an event of interest she will have to go through the same (or similar) steps and spend an equally unnecessary length of time executing the complex task. Finally, this manual process is error-prone, which by itself can cause additional time delays and user frustration.

Let us consider how the user experience might differ using task computing (see also FIGS. 74 to 76). The user's task computing client (TCC) is passively operating while the user goes about her daily tasks.

The user comes across the web page of an interesting talk.

When the user comes across a webpage of an event, the TCC identifies the nature (meaning or semantics) of the information on the page, i.e., that this is an event of a particular type, identifying the author, location, time, etc., of the event, and presents the user with possible and feasible actions that the TCC can execute on the user's behalf 7400, as shown in FIG. 74.

FIG. 75 shows the TCC identifies what has been described at the web page and suggests to the user some possible actions given the current content and context.

The user might select the action of finding the address of this location that will prompt the TCC to search the internet for a webpage that contains the address of this location (hotel name).

The TCC then updates the list of actions available to the user given the new information and the revised list of actions given the new information obtained 7500, as shown in FIG. 75.

FIG. 75 shows after the user chose to find the address of the location of the talk first, TCC finds the address and presents the user with a new list of possible actions.

The user then selects the action of seeing directions to this location from her home; the TCC actually displays a list of relevant locations, for the user to choose from, such as home address, work address, or current location of the user if available If the user decides that the location is convenient, the user might select at this point to add the event to her PIM (if no conflicts with other scheduled activities exist) at the revised screen displayed by the TCC. In addition, she might choose to include the action of sending an e-mail to a colleague (again selected from a list presented by the user) and attach all relevant information to that e-mail 7600, as shown in FIG. 76.

FIG. 76 shows after the user selected to check the location of the address of the location of the talk on the map, TCC presents a revised list of actions with the options to save the user's actions up to this point as a new task for future (re-)use.

During any part of this process the user might choose to save the sequence of steps and actions as a task for future use, so that next time that the user finds herself in the same or a similar context, the combined task (sequence of actions) can become an available action at the listing of possible and feasible actions presented by the TCC.

The TCC is still responsible for executing each of this actions and presenting to the user the updated view of possible and feasible actions at any point of the user-guided workflow. The resulting process is much faster than the manually executed workflow thanks to the ability of the TCC to "understand" the information of web pages and the meaning of the possible actions and their input and output.

Note that in this case the environment is automatically and dynamically changed by user's actions. (New semantic objects become available because of the user navigating Web.) Those environment changes have triggered the sequence described above.

Virtual Community

Using Task Computing, individuals can form virtual communities whose members of can share services related to the community and personally-owned services, such as services associated with devices owned and or operated by each individual between them and each member can compose those services for themselves or for the community with any other generally available services.

A "Community Service Discovery" directory is prepared (either by a member of the community or by an entity that provides or supports the virtual community function) for the community and its members are provided interfaces for registering or unregistering the services related to the community and personally-owned services or for discovering community services. The previously discussed publishing and management Task Computing Environment mechanisms (SDSCMs) can be used for sharing services within the community. Especially a white hole can be used as a graphical user interface to register services such as instance providing services for the community.

The user can compose and execute any composition involving the community services and other services available to each individual user Enterprise Application Integration (EAI)

Even though it may take a while, we believe task computing will gradually find its way into Enterprise Application Integration (EAI) application area. One of the potential applications of task computing to EAI is support for the developers of EAI applications through its interactivity and its use of service semantics. The developers will have shorter time for development and maintenance of EAI applications for task computing supports less error-prone processes of service integration and efficient trial-error process.

Dynamic Service Portal

A "Dynamic Service Portal" is basically a Semantic Web Services hosting. This can be a for-fee service, provided for free as an additional value to other businesses, or an in-house service for some organization, etc.

The provider of a Dynamic Service Portal prepares a set of Web Services (can be provided by a third-party, not necessarily by themselves) accessible from some areas of the network on some occasions with some access controls if necessary. Of course, the more areas and occasions the user can access those services, the more useful the services would be to the users.

For example, a personal version of Dynamic Service Portal can be a semantic web service version of "MY YAHOO!" providing the functionalities of such a portal site, exposed as semantic Web Services. In such an example, the services provided by the Dynamic Service Portal can include:

- Remote folder service for generic document files
- Remote folder services specialized for certain types of files such as music, pictures, videos, etc.
- Personal Information Management (PIM) services for contacts, schedules, etc.
- Information providing services such as weather, maps, financial info, news, etc.

Multimedia remote folder services can be combined with online purchase of digital contents. For example, when the user purchases a piece of music, the music file appears in the remote folder for music files.

The provider of the Dynamic Service Portal lets its users have semantic service descriptions (SDSs) of those Web Services. The provider can send those SDSs attached to emails to the users or notify the users of the URLs to those SDSs by emails or through Web pages.

The user can use those Web Services in Task Computing Environment (TCE) by making those SDSs available locally or pervasively through SDSCMs such as the White Hole. When the user makes an SDS available locally, the corresponding service becomes available only for the user. When the user makes an SDS available pervasively, the corresponding service becomes available not only for the user, but also for others in the same environment as the user. In one of the embodiments of TCE, the user can drag & drop the SDS file itself or the URL to the SDS file into the White Hole to make it available locally or pervasively. Using PIPE, the user can change the availability of the service to local or pervasive or can hold the SDS temporarily.

When the user makes the SDS for a certain Web Service from the Dynamic Service Portal available for herself, the user can use the Web Service within TCE. That means the user can use the Web Service combined with local, pervasive, or other remote services. This is an advantage of this Dynamic Service Portal over portal sites such as "MY YAHOO!" The interoperation of the services for one portal site can go as far as within the portal site. Even though some portal site provides synchronization software for the data at the portal site and the data in the applications on the user's computing devices, the software is proprietary and the interoperation ends there. If you go beyond that, you have to do cut and paste between Web pages and applications. Semantic Web Services from a Dynamic Service Portal can be made in TCE to interoperate with the services not only within the portal site, but also with services local on the computing devices, devices in the pervasive environment, and remote services (some may be from other dynamic service portals). This increases the utility of such services tremendously and enhances the user's capability as to what the user can do easily.

The user can use any device compatible with Task Computing anywhere to access those services. The user can also use any device with Web browsers to access those services through TCC II.

The user can use those services anywhere (home, at office, on the move, etc.), combined with local/pervasive/(other) remote services A corporate or in-house Dynamic Service Portal can be thought as a new way of ASP (Application Service Provider). In addition to the services mentioned above for the personal version, it can provide corporate, group, employee Web services.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer-based system capable of communication with a plurality of different types of computing sources of functionality, each computing source of functionality being a service to a user, comprising:

non-transitory computer readable medium that stores a semantic service description (SSD) that is associated with a service and, each SSD based upon one or more ontologies for filtering, composing and executing the service, and is discoverable as an available service according to one or more discovery protocols, wherein an SSD further comprises:

a semantic description of the service, including a semantic description of input/output parameters of the service as semantic input/output parameters, based upon the one or more ontologies, a semantic filter parameter specifying relevance of the service, based upon the one or more ontologies, and a grounding including:

a service invocation interface to the service; and an input/output parameter mapping between the semantic input/output parameters and syntactic input/output interface parameters of the service and/or an input/output parameter transformation function between the semantic input/output parameters and syntactic input/output interface parameters of the service;

a computer processor capable of executing:

dynamically discovering any available SSDs as available services through the one or more discovery protocols to discover the SSDs;

supporting real-time composition by a user of a current executable task that is a combination of two or more of the available services by dynamically presenting to the user possible services by filtering the discovered available services according to a context of the user in a computing environment for a service selection from the available services and/or according to the current composed executable task, based upon the semantic filter parameters in the SSDs of the discovered available services; and executing a task by invoking the two or more available services that comprise the task, including enabling the user to interact with an invoked available service, based upon the grounding in the associated SSDs including the service invocation interface, and the input/output mapping and/or the transformation function between the semantic input/output parameters and the syntactic input/output parameters.

2. The computer-based system of claim 1, wherein the computing sources of functionality originate in devices, computing applications, electronic services and/or previously defined tasks.

3. The computer-based system of claim 1, wherein the SSD is expressed in a service description language.

4. The computer-based system of claim 1, wherein each SSD is provided by any combination of a creator or owner of the computing source of functionality or some other third party and the computer processor further executes making available or unavailable a service by making available or unavailable discovery of one or more of SSDs associated with the service.

5. The computer-based system of claim 1 wherein the processor further executes saving composed executable tasks automatically, or as instructed by the user, as new available services.

6. The computer-based system of claim 5, wherein the composed executable tasks saved as services are available to the user who created them, to all other users, or to any user-defined, or pre-defined group of users.

7. The computer-based system of claim 1, wherein the one or more discovery protocols include one or any combination of the following: UPnP, UDDI, Local Service Repository, Jini, Bluetooth SDP, Rendezvous, and InfraRed (IR).

8. The computer-based system of claim 1, wherein the filtering of the discovered available services according to the context of the user include any one or any combination of the following:

User profile, Task at hand, User device characteristics, User location, User motion status, User network connectivity, User specified keywords, features of a set of the available services when considered as a whole, individual available service features.

9. The computer-based system of claim 1, wherein the real-time composing by the user of the executable task includes any one or any combination of the following:

a planning-based, automated system, or an interactive user interface that supports any one or any combination of the following elements: visual, voice, text, Braille, tactile.

10. The computer-based system of claim 1, wherein the SSD service invocation interface is according to one or more of a remote procedure call including Web Services, SOAP, UPnP actions, JINI, CORBA, RMI, RPC, DCE, DCOM, KQML, FIPA-ACL, or InfraRed (IR), or local function call, or local object call, or code described directly in the SSD.

11. The computer-based system of claim 1, wherein the computer rocessor further executes managing a computing source of functionality as an available service through the associated SSD by any one or any combination of the following: a graphical user interface controlling creation, provision, holding, and/or removal of the associated SSD, executing or interacting with the computing source of functionality, or processing events from an operating system of a user-operated device and applications executing on the user-operated device.

12. The computer-based system of claim 1, wherein the computer processor executes:

a module to publish the SSD as the available service by making the SSD discoverable through one of the plurality of discovery protocols;

a module to discover the SSDs as the available services as a Service Discoverer;

a module to filter the SSDs as filtered available services as a Service Filter;

a module to automatically specify a task of two or more available services or to assist the user in specifying the task of two or more available services to comprise the task, as a Task Specifier;

a module to assist the user with executing the task by invoking the available services that comprise the task, including enabling the user to interact with an invoked service as the available services are executed, as a Task Executer, and a User Interface to the Service Discoverer, the Service Filter, the Task Specifier, and the Task Executer.

13. The computer-based system of claim 12, further comprising a single computing device or a distributed networked computer system, wherein the modules execute on the single computing device, or wherein the modules, or subcomponents of the modules, execute as distributed across multiple networked computing devices in the distributed networked computer system, and the modules are accessible by programmatic interfaces accessible to the User Interface invoked at a relevant computing device operated by the user.

14. The computer-based system of claim 12, wherein the User Interface enables an executable workflow composition of the task according to a sequence of invoking the Service Discovery, followed by the Service Filter, followed by the Task Specifier, followed by the Task Executer, or any combinations thereof.

15. The computer-based system of claim 14, wherein the User Interface is graphical and comprises any combination of:

a Discovery Pane for displaying selectable discovered and filtered services;

a Details Pane for displaying additional information of a selected service from the Discovery Pane;

a Composition Pane for displaying listings of compatible services, according to the filtering, from the Discovery Pane;

a Construction Pane for interactively specifying a workflow composition of selected compatible services as the task;

an Information Pane for displaying status information;

a Save Pane for saving a composition of services;

wherein the User Interface displays all or a subset of the panes simultaneously to the user, and wherein the User Interface real-time updates information in each pane according to a result of an action in another pane.

16. The computer-based system of claim 15, wherein the User Interface enables navigating to the Construction pane by either selecting a service from the Discovery Pane and selecting a displayed construct function, or by selecting a pair of compatible services and selecting the displayed construct function.

17. The computer-based system of claim 15, wherein the User Interface enables adding and/or removing services from a currently composed executable task in the Construction Pane by choosing a plus or minus function for each possible workflow position that an insertion or deletion is possible, according to the discovering and the filtering.

18. The computer-based system of claim 15, wherein the User Interface enables the user to execute a specified task by choosing an execution function when the task becomes executable, as automatically determined according to the executing, while either at the Construction Pane or the Composition pane.

19. The computer-based system of claim 15, wherein the executing further comprises automatically completing a composition of services as a task by appending any, pre-defined or user-defined, compatible composition of available services before or after a partially specified composition of services by the user, and executing the complete composition in response to a user input.

20. The computer-based system of claim 15, wherein a saved composition of services as the task is extendable with other available discovered and filtered services.

21. The computer-based system of claim 12, wherein the User Interface is graphical and comprises selectable tab window panes including any combination of:

a Discovery Pane for displaying selectable discovered and filtered services;

a Details Pane for displaying additional information of a selected service from the Discovery Pane;

a Composition Pane for Displaying listings of compatible services, according to the filtering, from the Discovery Pane;

a Construction Pane for interactively specifying a workflow composition of services as the task;

an Information Pane for displaying status information; and a Save Pane for saving a composition of services, wherein the User Interface visibly displays at any given time only one of window pane tabs to the user, and wherein the User Interface real-time updates information in each pane according to a result of an action in another pane.

22. The computer-based system of claim 14, wherein the User Interface is graphical and comprises a first window pane to display discovered and filtered services, a second window pane to display a current task composition by the user, controls to navigate a displayed history of the task composition, and a control execute the task composition.

23. The computer-based system of claim 22, wherein the User Interface automatically places a selected service to a proper place in the workflow composition of the task.

24. The computer-based system of claim 23, wherein the User Interface automatically completes the task composition upon an available filtered compatible service.

25. The computer-based system of claim 14, wherein the User Interface is a web client.

26. The computer-based system of claim 25, wherein the web client comprise a browser to pop-up a new window or re-direct the browser to a new link enabling the user to enter information related to the Task Execution or enter feedback regarding the executed task.

27. The computer-based system of claim 14, wherein the User Interface is a command line interface, wherein each time the user types text compatible with a discovered and/or a filtered service, the User Interface inserts in the workflow composition of the task the compatible service or, if multiple compatible services exist the User Interface provides a selectable listing thereof.

28. The computer-based system of claim 27, wherein a displayed sequence of user selected services corresponds to the task, and a single user input executes the task.

29. The computer-based system of claim 12, wherein the Service Discovery, the Service Filter, the Task Specifier, the Task Executer, and the User Interface execute on same computing device.

30. The computer-based system of claim 12, wherein the Task Specifier comprises an Inference Engine presenting to the user the feasible possible executable tasks by identifying all possible pair wise combinations of the available services for an executable workflow composition of the task.

31. The computer-based system of claim 29, wherein the Task Specifier comprises an Inference Engine presenting to the user the feasible possible executable tasks by identifying all possible compositions of the available services as possible executable tasks.

32. The computer-based system according to any one of claims 30 and 31, wherein the Inference Engine returns a number of the possible pair-wise combinations of the available services or executable task compositions according to criteria that include an upper bound on computational resources, an upper bound on computing time, a number of the available services in a composition, or by a pre-determined total number of the possible pair-wise combination of services or task compositions to be computed.

33. The computer-based system of claim 32, wherein the Inference Engine includes a rule, or a set of rules, or a set of logic statements, as a task composition logic.

34. The computer-based system of claim 12, further comprising one or more local and/or remote databases to store one or more SSDs, wherein the Service Discoverer uses a local SSD database or accesses a remote SSD to retrieve a corresponding associated SSD of a source of functionality presenting a service, according to an identifier (ID) specific to a discovery mechanism used to discover the source of functionality presenting the service.

35. The computer-based system of claim 34, wherein one of the plurality of the discovery mechanisms is UPnP and the ID is Unique Device Name (UDN) of UPnP.

36. The computer-based system of claim 29, wherein one of the discovery mechanisms is UPnP discovery.

37. The computer-based system of claim 13, wherein the User Interface executes on a computing device different than computing devices executing the Service Discoverer, the Service Filter, the Service Specifier, or the Task Executer.

38. The computer-based system of claim 37, wherein the User Interface is a web client (browser) that communicates by HTTP with the Service Discoverer, the Service Filter, the Task Specifier, or the Task Executer.

39. The computer-based system of claim 37, wherein the User Interface is an application that executes on a user computing device and communicates by an application programming interface with Service Discoverer, the Service Filter, the Task Specifier, or the Task Executer.

40. The computer-based system of claim 13, wherein the single computing device is any of a desktop, laptop, pen computer, PDA or a mobile phone.

41. The computer-based system of claim 12, wherein a service may have one or more interfaces for the user to interact with the service prior and during execution of the service.

42. The computer-based system of claim 12, wherein the SSDs as the available services comprise any one of:

"View on Display" to view a user-specified document on a display and optionally control how the document is displayed;

"View on Multiple Displays" to view a user-specified document on more than one display and optionally control how the document is displayed;

"Map Viewer" to view a map of a user-specified location and optionally control how the map is displayed;

"Map Router" to view a map or textual description of a route from/to a user-specified location from/to a predefined or by a user-specified location optionally control how the map or textual description is displayed;

"Instance Providing Service" to provide a semantic instance of a class described in an ontology;

"Print" to print a user-specified document or a semantic instance in a specific format on a printer in a pre-defined way or optionally control how the document or the semantic instance is printed;

"Fax" to send a fax of a user-specified document to a user-specified fax number and optionally control how the document is faxed;

"Play Video" to play a user-specified video content and optionally control how the video is played;

"Play Audio" to play a user-specified audio content and optionally control how the audio is played;

"Digital Photo Frame" to display a user-specified image content and optionally control how the image is displayed;

"Location Determination" to automatically determine a location of a user-operated device;

"Directory Publisher" to choose one instance out of a set of instances of the same type;

"Telephone Dialer" to dial a user-specified phone number;

"Storage" to store or retrieve files;

"Copy to Removable Storage" to store one or a set of files into predefined removable storage media and optionally control how the files are saved;

"Emailer" to send email to a user-specified email address optionally with attached user-specified documents and optionally control how the email is sent;

"List chooser" to choose an semantic instance from a list of semantic instances of the same type;

"Property chooser" to choose one of properties from a semantic instance;

"Your input" to input values for attributes of a semantic object;

"Instance viewer" to check and modify a semantic instance;

"Local Instance Selector" to select one or more local semantic instances;

"Semantic Instance Copier" to copy a semantic instance;

"L-Note" to read and leave notes pertinent to a location;

"Database publisher" to publish a whole of or a part of a table from a database;

"Place information" to provide information related to a place; and

"Hosted Services" to use a browser to execute functions, including "Upload File" to let the user to upload a file, "URL to input" to let the user to input an URL, and "View on Browser" to let the user view a file.

43. The computer-based system of claim 11, wherein the graphical user interface for managing the computing source of functionality as an available service through the associated SSD is capable of any one or combination of the following:

making the SSD available through one or more of the discovery mechanisms, changing the SSD discovery mechanism to use, holding the SSD, recovering the SSD to one of the discovery mechanisms, removing the SSD from discovery mechanisms, and changing the SSD publishing parameters including expiration, invocation limit, and access control.

44. The computer-based system of claim 43, wherein the graphical user interface comprises any one or a combination of:

a Pervasive Instance Provision Environment ("PIPE") to provide local or remote APIs to publish and optionally manage services, and optionally provide the user with user interfaces to publish and manage the services;

a "Semantic Instance Scrapers for Applications" to publish available instances and to optionally enable the user to manage the service provisions based upon the publication;

an "Instance Selector with Instance Providing Service Creation" to enable the user publish an instance the user selects for the instance selector service and optionally lets the user manage the service provisions;

a publisher ("White hole") to publish objects as semantic instances through its user interface and optionally lets the user manage the service provisions;

a "Public Directory" to publish instances on a device and optionally lets the user manage the service provisions;

a "Bank" to publish instances through its service invocation and optionally lets the user manage the service provisions;

an "Image/Audio/Video Service Control" to publish instances created by or from the devices and optionally lets the user manage the service provisions;

a "Removable Media Publisher" to publish instances on the removable media inserted into a computing device and optionally lets the user manage the service provisions; and a "Fax" to publish the documents received and optionally lets the user manage the service provisions.

45. A computer implemented method comprising:

using a computer enabling a user to compose a task that comprises a plurality of different types of computing sources of functionality, each computing source of functionality being a service to the user, by:

associating each service with a semantic service description (SSD), which is based upon one or more ontologies for filtering, composing and executing the service, and is discoverable as an available service according to one or more discovery protocols, wherein an SSD further comprises:

a semantic description of the service, including a semantic description of input/output parameters of the service as semantic input/output parameters, based upon the one or more ontologies, a semantic filter parameter specifying relevance of the service, based upon the one or more ontologies, and a grounding including:

a service invocation interface to the service; and an input/output parameter mapping between the semantic input/output parameters and syntactic input/output interface parameters of the service and/or an input/output parameter transformation function between the semantic input/output parameters and syntactic input/output interface parameters of the service;

dynamically discovering any available SSDs as available services through the one or more discovery protocols to discover the SSDs;

supporting interfacing with the user for composition of a current executable task that is a combination of two or more of the available services by dynamically presenting to the user possible services by filtering the discovered available services according to a context of the user in a computing environment for a service selection from the available services and/or according to the current composed executable task, based upon the semantic filter parameters in the SSDs of the discovered available services; and executing a task by invoking the two or more available services that comprise the task, including enabling the user to interact with an invoked available service, based upon the grounding in the associated SSDs including the service invocation interface, and the input/output mapping and/or the transformation function between the semantic input/output parameters and the syntactic input/output parameters.

46. The computer-based method of claim 45, wherein the computing sources of functionality originate in devices, computing applications, electronic services available and/or previously defined tasks.

47. The computer-based method of claim 45, wherein the SSD is expressed in a service description language.

48. The computer-based method of claim 45 wherein:

each SSD is provided by any combination of a creator or owner of the computing sources of functionality or some other third party, and making available or unavailable the service by making available or unavailable discovery of one or more of SSDs associated with the service.

49. The computer-based method of claim 45, further comprising saving composed executable tasks automatically, or as instructed by the user, as new available services.

50. The computer-based method of claim 49, further comprising making available the saved composed executable tasks to the user who created them, to all other users, or to any user-defined, or pre-defined group of users.

51. The computer-based method of claim 45, wherein the one or more discovery protocols include any one or any combination of the following:

UPnP discovery, UDDI, Local Service Repository, Jini, Bluetooth SDP, Rendezvous, and InfraRed (IR) discovery.

52. The computer-based method of claim 45, wherein the filtering of the discovered available services according to a context of the user include any one or any combination of the following:

User profile, Task at hand, User device characteristics, User location, User motion status, User network connectivity, User specified keywords, features of a set of the available services when considered as a whole, or individual available service features.

53. The computer-based method of claim 45, wherein the real-time composing by the user of the executable task includes any one or any combination of the following:

a planning-based, automated system, or an interactive user interface that supports any one or any combination of the following elements: visual, voice, text, Braille, tactile.

54. The computer-based method of claim 45, wherein the SSD service invocation interface is according to one or more of a remote procedure call including Web Services, SOAP, UPnP actions, JINI, CORBA, RMI, RPC, DCE, DCOM, KQML, FIPA-ACL, or InfraRed (IR), or local function call, or local object call, or code described directly in the SSD.

55. The computer-based method of claim 54, further comprising managing a computing source of functionality as an available service through the associated SSD by any one or any combination of the following: a graphical user interface controlling creation, provision, holding and/or removal of the associated SSD, executing or interacting with the computing source of functionality, or processing events from an operating system of a user-operated device, and applications executing on the user-operated device.

56. A non-transitory computer-readable medium storing a program which when executed by a computer causes the computer to execute functions comprising:

enabling a user to compose a task that comprises a plurality of different types of computing sources of functionality, each computing source of functionality being a service to the user, by:

associating each service with a semantic service description (SSD), which is based upon one or more ontologies for filtering, composing and executing the service, and is discoverable as an available service according to one or more discovery protocols, wherein an SSD further comprises:

a semantic description of the service, including a semantic description of input/output parameters of the service as semantic input/output parameters, based upon the one or more ontologies, a filter parameter specifying relevance of the service, based upon the one or more ontologies, and a grounding including:

a service invocation interface to the service; and an input/output parameter mapping between the semantic input/output parameters and syntactic input/output interface parameters of the service and/or an input/output parameter transformation function between the semantic input/output parameters and syntactic input/output interface parameters of the service;

dynamically discovering any available SSDs as available services through the one or more discovery protocols to discover the SSDs;

interfacing with the user for composing a current executable task that is a combination of two or more of the available services by dynamically presenting to the user possible services by filtering the discovered available services according to a context of the user in a computing environment for a service selection from the available services and/or according to the current composed executable task, based upon the semantic filter parameters in the SSDs of the discovered available services; and executing a task by invoking the two or more available services that comprise the task, including enabling the user to interact with an invoked available service, based upon the grounding in the associated SSDs including the service invocation interface, and the input/output mapping and/or the transformation function between the semantic input/output parameters and the syntactic input/output parameters.

57. The computer-readable medium of claim 56, wherein the computing sources of functionality originate in devices, computing applications, electronic services available and/or previously defined tasks.

58. The computer-readable medium of claim 56, wherein the SSD is expressed in a service description language.

59. The computer-readable medium of claim 56, wherein:

each SSD is provided by any combination of a creator or owner of the computing sources of functionality or some other third party, and making available or unavailable the service by making available or unavailable discovery of one or more of SSDs associated with the service.

60. The computer-readable medium of claim 56, further comprising saving composed executable tasks automatically, or as instructed by the user, as new available services.

61. The computer-readable medium of claim 60, further comprising making available the saved composed executable tasks to the user who created them, to all other users, or to any user-defined, or pre-defined group of users.

62. The computer-readable medium of claim 56, wherein the one or more discovery protocols include any one or any combination of the following:

UPnP discovery, UDDI, Local Service Repository, Jini, Bluetooth SDP, Rendezvous, and InfraRed (IR) discovery.

63. The computer-readable medium of claim 56, wherein the filtering of the discovered available services according to a context of the user include any one or any combination of the following:

User profile, Task at hand, User device characteristics, User location, User motion status, User network connectivity, User specified keywords, features of a set of the available services when considered as a whole, or individual available service features.

64. The computer-readable medium of claim 56, wherein the real-time composing by the user of the executable task includes any one or any combination of the following:

a planning-based, automated system, or an interactive user interface that supports any one or any combination of the following elements: visual, voice, text, Braille, tactile.

65. The computer-readable medium of claim 45, wherein the SSD service invocation interface is according to one or more of a remote procedure call including Web Services , SOAP, UPnP actions, JINI, CORBA, RMI, RPC, DCE, DCOM, KQML, FIPA-ACL, or InfraRed (IR), or local function call, or local object call, or code described directly in the SSD.

66. The computer-readable medium of claim 56, further comprising managing a computing source of functionality as an available service through the associated SSD by any one or any combination of the following: a graphical user interface controlling creation, provision, holding and/or removal of the associated SSD, executing or interacting with the computing source of functionality, or processing events from an operating system of a user-operated device, and applications executing on the user-operated device.

67. A method of providing a computer system capable of communication with a plurality of different types of computing sources of functionality, each computing source of functionality being a service to a user, comprising:

configuring one or more computing devices to:

have each service associated with a semantic service description (SSD), which is based upon one or more ontologies and discoverable as an available service according to one or more discovery protocols, each SSD including:

a semantic description of the service, based upon the one or more ontologies, a semantic filter parameter specifying relevance of the service, based upon the one or more ontologies; and a grounding including:

a service invocation interface to the service; and an input/output parameter mapping between the semantic input/output parameters and syntactic input/output interface parameters of the service and/or an input/output parameter transformation function between the semantic input/output parameters and syntactic input/output interface parameters of the service;

dynamically discover any available SSDs as available services through the one or more discovery protocols to discover the SSDs; and support composition by a user of a current executable task that is a combination of two or more of the available services by dynamically presenting to the user possible services by filtering of the discovered available services according to a context of the user in a computing environment for a service selection from the available services and/or according to the current composed executable task, based upon the semantic filter parameters in the SSDs of the discovered available services, the task is executable by invoking the two or more available services that comprise the task, including enabling the user to interact with an invoked available service, based upon the grounding in the associated SSDs including the service invocation interface, and the input/output mapping and/or the transformation function between the semantic input/output parameters and syntactic input/output interface parameters of the service.

* * * * *

UNITED STATES PATENT AND TRADEMARK OFFICE

CERTIFICATE OF CORRECTION

PATENT NO. : 8,561,069 B2
APPLICATION NO. : 10/733328
DATED : October 15, 2013
INVENTOR(S) : Ryusuke Masuoka et al.

It is certified that error appears in the above-identified patent and that said Letters Patent is hereby corrected as shown below:

In the Claims

In Column 66, Line 65, In Claim 11, delete “rocessor” and insert -- processor --, therefor.

Signed and Sealed this
Eighteenth Day of February, 2014

Michelle K. Lee

Michelle K. Lee
*Deputy Director of the United States Patent and Trademark Office*